US009184632B2

(12) United States Patent
Kirby et al.

(10) Patent No.: US 9,184,632 B2
(45) Date of Patent: *Nov. 10, 2015

(54) WIRELESS POWER TRANSFER FOR FURNISHINGS AND BUILDING ELEMENTS

(75) Inventors: Miles A Kirby, San Diego, CA (US); Rinat Burdo, San Diego, CA (US); Virginia W Keating, San Diego, CA (US); Ernest T Ozaki, Poway, CA (US); Michael J Mangan, San Diego, CA (US); William H Von Novak, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/572,411

(22) Filed: Oct. 2, 2009

(65) Prior Publication Data

US 2010/0201202 A1 Aug. 12, 2010
US 2012/0153731 A9 Jun. 21, 2012

Related U.S. Application Data

(63) Continuation-in-part of application No. 12/267,041, filed on Nov. 7, 2008.

(60) Provisional application No. 61/152,088, filed on Feb. 12, 2009, provisional application No. 61/164,411, (Continued)

(51) Int. Cl.
*H01F 27/42* (2006.01)
*H01F 37/00* (2006.01)
(Continued)

(52) U.S. Cl.
CPC .............. *H02J 17/00* (2013.01); *G06K 7/0008* (2013.01); *G06K 7/10178* (2013.01); (Continued)

(58) Field of Classification Search
CPC ................................. H02J 5/005; H02J 17/00
USPC ........................................................ 307/104
See application file for complete search history.

(56) References Cited

U.S. PATENT DOCUMENTS 3,633,109 A 1/1972 Schulz
4,684,869 A 8/1987 Kobayashi et al.
(Continued)

FOREIGN PATENT DOCUMENTS

CN 1119774 A 4/1996
CN 1202754 A 12/1998
(Continued)

OTHER PUBLICATIONS

International Search Report/Written Opinion—PCT/US2010/023790—International Search Authority EPO—Jun. 8, 2010.
(Continued)

*Primary Examiner* — Carlos Amaya
(74) *Attorney, Agent, or Firm* — Knobbe Martens Olson & Bear, LLP

(57) ABSTRACT

Exemplary embodiments are directed to wireless power transfer. A power transmitting device is attached to an existing furniture item or is embedded in a host furnishing. The power transmitting device includes a transmit antenna to wirelessly transfer power to a receive antenna by generating a near field radiation within a coupling-mode region. An amplifier applies a driving signal to the transmit antenna. A presence detector detects a presence of a receiver device within the coupling-mode region. The presence detector may also detect a human presence. An enclosed furnishing detector detects when the furnishing item is in a closed state. A power output may be adjusted in response to the closed state, the presence of a receiver device, and the presence of a human.

34 Claims, 24 Drawing Sheets

Related U.S. Application Data filed on Mar. 28, 2009, provisional application No. 61/163,376, filed on Mar. 25, 2009, provisional application No. 61/151,290, filed on Feb. 10, 2009, provisional application No. 61/060,735, filed on Jun. 11, 2008, provisional application No. 61/060,738, filed on Jun. 11, 2008, provisional application No. 61/053,008, filed on May 13, 2008, provisional application No. 61/060,741, filed on Jun. 11, 2008, provisional application No. 61/053,000, filed on May 13, 2008, provisional application No. 61/081,332, filed on Jul. 16, 2008, provisional application No. 61/053,012, filed on May 13, 2008, provisional application No. 61/053,015, filed on May 13, 2008, provisional application No. 61/053,010, filed on May 13, 2008, provisional application No. 61/053,004, filed on May 13, 2008.

(51) Int. Cl.

| | | |
|---|---|---|
| *H01F 38/00* | (2006.01) | |
| *H02J 17/00* | (2006.01) | |
| *G06K 7/00* | (2006.01) | |
| *G06K 7/10* | (2006.01) | |
| *G06K 19/07* | (2006.01) | |
| *H01Q 1/38* | (2006.01) | |
| *H01Q 7/00* | (2006.01) | |
| *H02J 5/00* | (2006.01) | |
| *H02J 7/02* | (2006.01) | |
| *H04B 5/02* | (2006.01) | |
| *H01Q 1/22* | (2006.01) | |
| *H01F 38/14* | (2006.01) | |
| *H04B 5/00* | (2006.01) | |

(52) U.S. Cl.
CPC ....... *G06K 19/0701* (2013.01); *G06K 19/0715* (2013.01); *G06K 19/0723* (2013.01); *H01F 38/14* (2013.01); *H01Q 1/2225* (2013.01); *H01Q 1/38* (2013.01); *H01Q 7/00* (2013.01); *H02J 5/005* (2013.01); *H02J 7/025* (2013.01); *H04B 5/0037* (2013.01); *H04B 5/02* (2013.01); *H04B 5/0031* (2013.01)

(56) References Cited

U.S. PATENT DOCUMENTS

| | | |
|---|---|---|
| 4,802,080 A | 1/1989 | Bossi et al. |
| 5,201,066 A | 4/1993 | Kim |
| 5,287,112 A | 2/1994 | Schuermann |
| 5,311,198 A | 5/1994 | Sutton |
| 5,520,892 A | 5/1996 | Bowen |
| 5,539,394 A | 7/1996 | Cato et al. |
| 5,619,530 A | 4/1997 | Cadd et al. |
| 5,790,080 A | 8/1998 | Apostolos |
| 5,956,626 A | 9/1999 | Kaschke et al. |
| 5,963,144 A | 10/1999 | Kruest |
| 6,151,500 A | 11/2000 | Cardina et al. |
| 6,195,562 B1 | 2/2001 | Pirhonen et al. |
| 6,263,247 B1 | 7/2001 | Mueller et al. |
| 6,344,828 B1 | 2/2002 | Grantz et al. |
| 6,489,745 B1 | 12/2002 | Koreis |
| 6,600,931 B2 | 7/2003 | Sutton et al. |
| 6,608,550 B2 | 8/2003 | Hayashi et al. |
| 6,664,770 B1 | 12/2003 | Bartels |
| 6,683,438 B2 | 1/2004 | Park et al. |
| 6,690,264 B2 | 2/2004 | Dalglish |
| 6,760,578 B2 | 7/2004 | Rotzoll |
| 6,809,498 B2 | 10/2004 | Nakamura et al. |
| 6,839,035 B1 | 1/2005 | Addonisio et al. |
| 6,853,629 B2 | 2/2005 | Alamouti et al. |
| 6,906,495 B2 | 6/2005 | Cheng et al. |
| 6,967,462 B1 | 11/2005 | Landis |
| 6,970,142 B1 | 11/2005 | Pleva et al. |
| 6,975,198 B2 | 12/2005 | Baarman et al. |
| 7,069,086 B2 | 6/2006 | Von Arx |
| 7,142,811 B2 | 11/2006 | Terranova et al. |
| 7,146,139 B2 | 12/2006 | Nevermann |
| 7,164,255 B2 | 1/2007 | Hui et al. |
| 7,193,578 B1 | 3/2007 | Harris et al. |
| 7,239,110 B2 | 7/2007 | Cheng et al. |
| 7,243,855 B2 | 7/2007 | Matsumoto et al. |
| 7,248,841 B2 | 7/2007 | Agee et al. |
| 7,356,588 B2 | 4/2008 | Stineman, Jr. et al. |
| 7,375,492 B2 | 5/2008 | Calhoon et al. |
| 7,378,817 B2 | 5/2008 | Calhoon et al. |
| 7,382,260 B2 | 6/2008 | Agarwal et al. |
| 7,382,636 B2 | 6/2008 | Baarman et al. |
| 7,428,438 B2 | 9/2008 | Parramon et al. |
| 7,478,108 B2 | 1/2009 | Townsend et al. |
| 7,480,907 B1 | 1/2009 | Marolia et al. |
| 7,499,722 B2 | 3/2009 | McDowell et al. |
| 7,521,890 B2 | 4/2009 | Lee et al. |
| 7,522,878 B2 | 4/2009 | Baarman |
| 7,538,666 B2 | 5/2009 | Campman |
| 7,539,465 B2 | 5/2009 | Quan |
| 7,554,316 B2 | 6/2009 | Stevens et al. |
| 7,561,050 B2 | 7/2009 | Bhogal et al. |
| 7,565,108 B2 | 7/2009 | Kotola et al. |
| 7,576,657 B2 | 8/2009 | Duron et al. |
| 7,579,913 B1 | 8/2009 | Cheng et al. |
| 7,598,704 B2 | 10/2009 | Taniguchi et al. |
| 7,605,496 B2 | 10/2009 | Stevens et al. |
| 7,609,157 B2 | 10/2009 | McFarland |
| 7,626,544 B2 | 12/2009 | Smith et al. |
| 7,629,886 B2 | 12/2009 | Steeves |
| 7,642,918 B2 | 1/2010 | Kippelen et al. |
| 7,646,343 B2 | 1/2010 | Shtrom et al. |
| 7,663,490 B2 | 2/2010 | Dishongh |
| 7,675,403 B2 | 3/2010 | Quan et al. |
| 7,741,734 B2 | 6/2010 | Joannopoulos et al. |
| 7,778,224 B2 | 8/2010 | Hayashi et al. |
| 7,792,553 B2 | 9/2010 | Fukui et al. |
| 7,793,121 B2 | 9/2010 | Lawther et al. |
| 7,812,481 B2 | 10/2010 | Iisaka et al. |
| 7,831,757 B2 | 11/2010 | Habuto et al. |
| 7,844,306 B2 | 11/2010 | Shearer et al. |
| 7,868,837 B2 | 1/2011 | Yun et al. |
| 7,924,751 B2 | 4/2011 | Dean |
| 7,952,322 B2 | 5/2011 | Partovi et al. |
| 7,994,880 B2 | 8/2011 | Chen et al. |
| 8,004,118 B2 | 8/2011 | Kamijo et al. |
| 8,073,387 B2 | 12/2011 | Maslennikov et al. |
| 8,115,448 B2 | 2/2012 | John |
| 8,169,185 B2 | 5/2012 | Partovi et al. |
| 8,301,080 B2 | 10/2012 | Baarman |
| 8,432,293 B2 | 4/2013 | Symons |
| 8,487,478 B2 | 7/2013 | Kirby et al. |
| 8,611,815 B2 | 12/2013 | Mohammadian et al. |
| 8,614,526 B2 | 12/2013 | Cook et al. |
| 8,629,650 B2 | 1/2014 | Mohammadian et al. |
| 2001/0000960 A1 | 5/2001 | Dettloff |
| 2001/0046205 A1 | 11/2001 | Easton et al. |
| 2002/0041624 A1 | 4/2002 | Kim et al. |
| 2002/0154705 A1 | 10/2002 | Walton et al. |
| 2002/0158512 A1 | 10/2002 | Mizutani et al. |
| 2003/0048254 A1 | 3/2003 | Huang |
| 2003/0078634 A1 | 4/2003 | Schulman et al. |
| 2004/0002835 A1 | 1/2004 | Nelson |
| 2004/0041669 A1 | 3/2004 | Kawai |
| 2004/0116952 A1 | 6/2004 | Sakurai et al. |
| 2004/0130425 A1* | 7/2004 | Dayan et al. ............ 336/200 |
| 2004/0130916 A1 | 7/2004 | Baarman |
| 2004/0145342 A1 | 7/2004 | Lyon |
| 2004/0154652 A1 | 8/2004 | Karapetyan |
| 2004/0166869 A1 | 8/2004 | Laroia et al. |
| 2004/0180637 A1 | 9/2004 | Nagai et al. |
| 2004/0227057 A1 | 11/2004 | Tuominen et al. |
| 2004/0245473 A1 | 12/2004 | Takayama et al. |
| 2004/0248523 A1 | 12/2004 | Nishimura et al. |
| 2005/0068009 A1 | 3/2005 | Aoki |
| 2005/0068019 A1* | 3/2005 | Nakamura et al. ........ 323/355 |

(56) References Cited

U.S. PATENT DOCUMENTS

| | | |
|---|---|---|
| 2005/0083881 A1 | 4/2005 | Ohwada |
| 2005/0110641 A1 | 5/2005 | Mendolia et al. |
| 2005/0116683 A1 | 6/2005 | Cheng et al. |
| 2005/0151511 A1 | 7/2005 | Chary |
| 2005/0156560 A1 | 7/2005 | Shimaoka et al. |
| 2005/0205679 A1 | 9/2005 | Alihodzic |
| 2005/0219132 A1 | 10/2005 | Charrat |
| 2005/0220057 A1 | 10/2005 | Monsen |
| 2005/0225437 A1 | 10/2005 | Shiotsu et al. |
| 2005/0239018 A1 | 10/2005 | Green et al. |
| 2005/0242183 A1 | 11/2005 | Bremer |
| 2006/0084392 A1 | 4/2006 | Marholev et al. |
| 2006/0113955 A1 | 6/2006 | Nunally |
| 2006/0114102 A1 | 6/2006 | Chang et al. |
| 2006/0131193 A1 | 6/2006 | Sherman |
| 2006/0184705 A1 | 8/2006 | Nakajima |
| 2006/0197652 A1 | 9/2006 | Hild et al. |
| 2006/0202665 A1 | 9/2006 | Hsu |
| 2006/0220863 A1 | 10/2006 | Koyama |
| 2006/0238365 A1 | 10/2006 | Vecchione et al. |
| 2006/0244568 A1 | 11/2006 | Tong et al. |
| 2007/0001816 A1 | 1/2007 | Lindley et al. |
| 2007/0004456 A1 | 1/2007 | Shimada |
| 2007/0004466 A1 | 1/2007 | Haartsen et al. |
| 2007/0017804 A1 | 1/2007 | Myrtveit et al. |
| 2007/0021140 A1 | 1/2007 | Keyes et al. |
| 2007/0026799 A1 | 2/2007 | Wang et al. |
| 2007/0029965 A1 | 2/2007 | Hui |
| 2007/0072474 A1 | 3/2007 | Beasley et al. |
| 2007/0080804 A1 | 4/2007 | Hirahara et al. |
| 2007/0090790 A1 | 4/2007 | Hui |
| 2007/0091006 A1 | 4/2007 | Thober et al. |
| 2007/0109708 A1 | 5/2007 | Hussman et al. |
| 2007/0158438 A1 | 7/2007 | Fukuda et al. |
| 2007/0165475 A1 | 7/2007 | Choi et al. |
| 2007/0171811 A1 | 7/2007 | Lee et al. |
| 2007/0182367 A1* | 8/2007 | Partovi .......................... 320/108 |
| 2007/0222681 A1 | 9/2007 | Greene et al. |
| 2007/0279002 A1 | 12/2007 | Partovi |
| 2007/0287508 A1 | 12/2007 | Telefus |
| 2007/0290654 A1 | 12/2007 | Govari et al. |
| 2007/0296393 A1 | 12/2007 | Malpas et al. |
| 2008/0014897 A1 | 1/2008 | Cook et al. |
| 2008/0030324 A1 | 2/2008 | Bekritsky et al. |
| 2008/0049372 A1 | 2/2008 | Loke |
| 2008/0054638 A1 | 3/2008 | Greene et al. |
| 2008/0058029 A1 | 3/2008 | Sato et al. |
| 2008/0066979 A1 | 3/2008 | Carter |
| 2008/0067874 A1 | 3/2008 | Tseng |
| 2008/0079396 A1 | 4/2008 | Yamazaki et al. |
| 2008/0091350 A1 | 4/2008 | Smith et al. |
| 2008/0114255 A1 | 5/2008 | Schwartz et al. |
| 2008/0116847 A1 | 5/2008 | Loke et al. |
| 2008/0122297 A1 | 5/2008 | Arai |
| 2008/0157711 A1 | 7/2008 | Chiang et al. |
| 2008/0165074 A1 | 7/2008 | Terry |
| 2008/0174266 A1 | 7/2008 | Tamura |
| 2008/0174267 A1 | 7/2008 | Onishi et al. |
| 2008/0203815 A1* | 8/2008 | Ozawa et al. ................ 307/10.2 |
| 2008/0211320 A1 | 9/2008 | Cook et al. |
| 2008/0242337 A1 | 10/2008 | Sampath et al. |
| 2008/0252254 A1 | 10/2008 | Osada |
| 2008/0258679 A1 | 10/2008 | Manico et al. |
| 2008/0261519 A1 | 10/2008 | DeMarco et al. |
| 2008/0266748 A1 | 10/2008 | Lee |
| 2008/0278264 A1* | 11/2008 | Karalis et al. ................ 333/219 |
| 2008/0315826 A1 | 12/2008 | Alberth, Jr. et al. |
| 2009/0015075 A1 | 1/2009 | Cook et al. |
| 2009/0021374 A1 | 1/2009 | Stagg |
| 2009/0031069 A1 | 1/2009 | Habuto et al. |
| 2009/0045772 A1 | 2/2009 | Cook et al. |
| 2009/0058189 A1 | 3/2009 | Cook et al. |
| 2009/0061784 A1 | 3/2009 | Cordeiro |
| 2009/0072629 A1* | 3/2009 | Cook et al. .................... 307/104 |
| 2009/0072782 A1 | 3/2009 | Randall |
| 2009/0075704 A1 | 3/2009 | Wang |
| 2009/0127937 A1 | 5/2009 | Widmer et al. |
| 2009/0134712 A1 | 5/2009 | Cook et al. |
| 2009/0174258 A1 | 7/2009 | Liu et al. |
| 2009/0212636 A1 | 8/2009 | Cook et al. |
| 2009/0224609 A1 | 9/2009 | Cook et al. |
| 2009/0243397 A1* | 10/2009 | Cook et al. .................... 307/104 |
| 2009/0284082 A1 | 11/2009 | Mohammadian |
| 2009/0284220 A1 | 11/2009 | Toncich et al. |
| 2009/0284227 A1 | 11/2009 | Mohammadian et al. |
| 2009/0284245 A1* | 11/2009 | Kirby et al. ................... 323/318 |
| 2009/0284369 A1 | 11/2009 | Toncich et al. |
| 2009/0286475 A1 | 11/2009 | Toncich et al. |
| 2009/0286476 A1 | 11/2009 | Toncich et al. |
| 2010/0023092 A1 | 1/2010 | Govari et al. |
| 2010/0033021 A1 | 2/2010 | Bennett |
| 2010/0038970 A1 | 2/2010 | Cook et al. |
| 2010/0039066 A1 | 2/2010 | Yuan et al. |
| 2010/0081378 A1 | 4/2010 | Kawamura |
| 2010/0109445 A1* | 5/2010 | Kurs et al. .................... 307/104 |
| 2010/0148939 A1 | 6/2010 | Yamada et al. |
| 2010/0181841 A1 | 7/2010 | Azancot et al. |
| 2010/0201189 A1 | 8/2010 | Kirby et al. |
| 2010/0201201 A1 | 8/2010 | Mobarhan et al. |
| 2010/0201310 A1 | 8/2010 | Vorenkamp et al. |
| 2010/0201311 A1 | 8/2010 | Lyell Kirby et al. |
| 2010/0201312 A1 | 8/2010 | Kirby et al. |
| 2010/0201533 A1 | 8/2010 | Kirby et al. |
| 2010/0213896 A1* | 8/2010 | Ishii et al. .................... 320/109 |
| 2010/0219693 A1 | 9/2010 | Azancot et al. |
| 2010/0289341 A1 | 11/2010 | Ozaki et al. |
| 2010/0323642 A1 | 12/2010 | Morita |
| 2010/0328044 A1 | 12/2010 | Waffenschmidt et al. |
| 2011/0057606 A1 | 3/2011 | Saunamaki |
| 2011/0074347 A1 | 3/2011 | Karalis et al. |
| 2011/0133569 A1 | 6/2011 | Cheon et al. |
| 2011/0176251 A1 | 7/2011 | Lee |
| 2012/0007437 A1 | 1/2012 | Fells et al. |
| 2013/0147428 A1 | 6/2013 | Kirby et al. |
| 2013/0147429 A1 | 6/2013 | Kirby et al. |
| 2013/0300358 A1 | 11/2013 | Kirby et al. |
| 2014/0103881 A1 | 4/2014 | Mohammadian et al. |
| 2015/0171636 A1 | 6/2015 | Toncich et al. |

FOREIGN PATENT DOCUMENTS

| | | |
|---|---|---|
| CN | 1242092 A | 1/2000 |
| CN | 1426170 A | 6/2003 |
| CN | 1460226 A | 12/2003 |
| CN | 2681368 Y | 2/2005 |
| CN | 1604426 A | 4/2005 |
| CN | 1717879 A | 1/2006 |
| CN | 1722521 A | 1/2006 |
| CN | 1723643 A | 1/2006 |
| CN | 1726656 A | 1/2006 |
| CN | 1768462 A | 5/2006 |
| CN | 1768467 A | 5/2006 |
| CN | 1808473 A | 7/2006 |
| CN | 1829037 A | 9/2006 |
| CN | 1836953 A | 9/2006 |
| CN | 1881733 A | 12/2006 |
| CN | 1906863 A | 1/2007 |
| CN | 1912786 A | 2/2007 |
| CN | 1941541 A | 4/2007 |
| CN | 1965324 A | 5/2007 |
| CN | 1977294 A | 6/2007 |
| CN | 1996352 A | 7/2007 |
| CN | 101023600 A | 8/2007 |
| CN | 101123318 A | 2/2008 |
| CN | 101136561 A | 3/2008 |
| CN | 101154823 A | 4/2008 |
| CN | 201044047 Y | 4/2008 |
| CN | 101233666 A | 7/2008 |
| CN | 101291268 A | 10/2008 |
| DE | 4004196 | 4/1991 |
| DE | 29710675 U1 | 8/1997 |
| DE | 10104019 | 1/2002 |
| EP | 0444416 A1 | 9/1991 |
| EP | 0689149 | 12/1995 |

(56) References Cited

FOREIGN PATENT DOCUMENTS

| | | |
|---|---|---|
| EP | 0831411 | 3/1998 |
| EP | 0878891 A2 | 11/1998 |
| EP | 0962407 A1 | 12/1999 |
| EP | 0977304 A1 | 2/2000 |
| EP | 1022677 A1 | 7/2000 |
| EP | 1050839 | 11/2000 |
| EP | 1298578 A1 | 4/2003 |
| EP | 1420357 A1 | 5/2004 |
| EP | 1454769 A1 | 9/2004 |
| EP | 1502543 A1 | 2/2005 |
| EP | 1538726 A1 | 6/2005 |
| EP | 1575184 A1 | 9/2005 |
| EP | 1585268 A2 | 10/2005 |
| EP | 1602160 A1 | 12/2005 |
| EP | 1703435 | 9/2006 |
| EP | 1713145 | 10/2006 |
| EP | 1914663 A1 | 4/2008 |
| EP | 1919091 | 5/2008 |
| EP | 2093860 A1 | 8/2009 |
| GB | 2307379 | 5/1997 |
| GB | 2380359 | 4/2003 |
| GB | 2394843 A | 5/2004 |
| GB | 2395627 | 5/2004 |
| GB | 2416633 | 2/2006 |
| GB | 2433178 | 6/2007 |
| GB | 2440571 A | 2/2008 |
| JP | 59031054 U | 2/1984 |
| JP | S62203526 A | 9/1987 |
| JP | H05291991 A | 11/1993 |
| JP | 6112720 A | 4/1994 |
| JP | H06133476 A | 5/1994 |
| JP | H0711035 U | 2/1995 |
| JP | H0739077 A | 2/1995 |
| JP | H0771769 A | 3/1995 |
| JP | H07131376 A | 5/1995 |
| JP | 9103037 A | 4/1997 |
| JP | 9147070 A | 6/1997 |
| JP | H09172743 A | 6/1997 |
| JP | 10145987 A | 5/1998 |
| JP | H10210751 A | 8/1998 |
| JP | H10225020 A | 8/1998 |
| JP | 10240880 A | 9/1998 |
| JP | 10295043 A | 11/1998 |
| JP | H10293826 A | 11/1998 |
| JP | 11025238 A | 1/1999 |
| JP | 11069640 | 3/1999 |
| JP | 11098706 | 4/1999 |
| JP | 11122832 | 4/1999 |
| JP | H11134566 A | 5/1999 |
| JP | H11155245 A | 6/1999 |
| JP | 11188113 A | 7/1999 |
| JP | 11338983 | 12/1999 |
| JP | H11341711 A | 12/1999 |
| JP | 2000037046 A | 2/2000 |
| JP | 2000050534 A | 2/2000 |
| JP | 2000057450 A | 2/2000 |
| JP | 2000501263 A | 2/2000 |
| JP | 2000067195 A | 3/2000 |
| JP | 2000076008 A | 3/2000 |
| JP | 2000113127 A | 4/2000 |
| JP | 2000138621 A | 5/2000 |
| JP | 2000172795 A | 6/2000 |
| JP | 2001238372 A | 8/2001 |
| JP | 2001511574 A | 8/2001 |
| JP | 2001291080 A | 10/2001 |
| JP | 2001309579 A | 11/2001 |
| JP | 2001339327 A | 12/2001 |
| JP | 2002034169 A | 1/2002 |
| JP | 2002050534 A | 2/2002 |
| JP | 2002506259 A | 2/2002 |
| JP | 2002513490 A | 5/2002 |
| JP | 2002529982 A | 9/2002 |
| JP | 2003011734 A | 1/2003 |
| JP | 2003047178 A | 2/2003 |
| JP | 2003224937 A | 8/2003 |
| JP | 2004007851 A | 1/2004 |
| JP | 2004096589 A | 3/2004 |
| JP | 2004135455 A | 4/2004 |
| JP | 2004159456 A | 6/2004 |
| JP | 2004166384 A | 6/2004 |
| JP | 2004526236 A | 8/2004 |
| JP | 2004274972 A | 9/2004 |
| JP | 2004297779 A | 10/2004 |
| JP | 2004306558 A | 11/2004 |
| JP | 2004336742 A | 11/2004 |
| JP | 2004355212 A | 12/2004 |
| JP | 2005110399 A | 4/2005 |
| JP | 2005110412 A | 4/2005 |
| JP | 2005135455 A | 5/2005 |
| JP | 2005159607 A | 6/2005 |
| JP | 2005204493 A | 7/2005 |
| JP | 2005520428 A | 7/2005 |
| JP | 2005208754 A | 8/2005 |
| JP | 2005224045 A | 8/2005 |
| JP | 2005525705 A | 8/2005 |
| JP | 2005261187 A | 9/2005 |
| JP | 2005267643 A | 9/2005 |
| JP | 2005303697 A | 10/2005 |
| JP | 2006060909 A | 3/2006 |
| JP | 2006081249 A | 3/2006 |
| JP | 2006510101 A | 3/2006 |
| JP | 2006141170 A | 6/2006 |
| JP | 2006149168 A | 6/2006 |
| JP | 2006174676 A | 6/2006 |
| JP | 2006517378 A | 7/2006 |
| JP | 2006217731 A | 8/2006 |
| JP | 2006230129 A | 8/2006 |
| JP | 2006238548 A | 9/2006 |
| JP | 2006254678 A | 9/2006 |
| JP | 2006295905 A | 10/2006 |
| JP | 2006296123 A | 10/2006 |
| JP | 2006314181 A | 11/2006 |
| JP | 2007006029 A | 1/2007 |
| JP | 2007043773 A | 2/2007 |
| JP | 2007089341 A | 4/2007 |
| JP | 2007104868 A | 4/2007 |
| JP | 2007109301 A | 4/2007 |
| JP | 2007514400 A | 5/2007 |
| JP | 2007166379 A | 6/2007 |
| JP | 2007221584 A | 8/2007 |
| JP | 3995724 B2 | 10/2007 |
| JP | 2007336717 A | 12/2007 |
| JP | 2007537688 A | 12/2007 |
| JP | 2008054424 A | 3/2008 |
| JP | 2008508842 A | 3/2008 |
| JP | 2008104295 A | 5/2008 |
| JP | 2008109646 A | 5/2008 |
| JP | 2008120357 A | 5/2008 |
| JP | 2008199857 A | 8/2008 |
| JP | 2008199882 A | 8/2008 |
| JP | 2008283789 A | 11/2008 |
| JP | 2008543255 A | 11/2008 |
| JP | 2008295191 A | 12/2008 |
| JP | 2009523402 A | 6/2009 |
| JP | 2009527147 A | 7/2009 |
| JP | 2010508007 A | 3/2010 |
| JP | 2010508008 A | 3/2010 |
| JP | 2010527226 A | 8/2010 |
| JP | 2011030418 A | 2/2011 |
| KR | 101998002439 | 7/1998 |
| KR | 20000011967 A | 2/2000 |
| KR | 20040026318 A | 3/2004 |
| KR | 20040072581 A | 8/2004 |
| KR | 20050105200 A | 11/2005 |
| KR | 20070017804 A | 2/2007 |
| KR | 20070032271 A | 3/2007 |
| KR | 20080036702 A | 4/2008 |
| TW | 546960 B | 8/2003 |
| TW | 200306048 A | 11/2003 |
| TW | 200512964 | 4/2005 |
| TW | 200614626 | 5/2006 |
| TW | M294779 U | 7/2006 |
| TW | 200717963 A | 5/2007 |
| TW | M317367 U | 8/2007 |

(56) References Cited

FOREIGN PATENT DOCUMENTS

| | | |
|---|---|---|
| TW | 200820537 A | 5/2008 |
| TW | 200824215 A | 6/2008 |
| TW | M334559 U | 6/2008 |
| TW | 200830663 A | 7/2008 |
| TW | M336621 U | 7/2008 |
| TW | 200843282 A | 11/2008 |
| TW | 200901597 A | 1/2009 |
| TW | M349639 U | 1/2009 |
| TW | I347724 | 8/2011 |
| TW | I366320 | 6/2012 |
| WO | WO-9829969 | 7/1998 |
| WO | WO-9854912 | 12/1998 |
| WO | WO-9905658 A1 | 2/1999 |
| WO | WO-0027137 A1 | 5/2000 |
| WO | WO0227682 | 4/2002 |
| WO | WO-02062077 A1 | 8/2002 |
| WO | WO-03044970 A2 | 5/2003 |
| WO | WO-03079524 A2 | 9/2003 |
| WO | 2004025805 A1 | 3/2004 |
| WO | WO-2004032349 | 4/2004 |
| WO | WO-2004055654 A2 | 7/2004 |
| WO | WO-2004068726 A2 | 8/2004 |
| WO | WO-2004073150 A1 | 8/2004 |
| WO | WO-2004073166 A2 | 8/2004 |
| WO | WO-2004096023 A1 | 11/2004 |
| WO | WO-2005104022 | 11/2005 |
| WO | 2006011769 A1 | 2/2006 |
| WO | 2006031133 A1 | 3/2006 |
| WO | WO-2006068416 A1 | 6/2006 |
| WO | WO-2006101285 A1 | 9/2006 |
| WO | WO-2006127624 A2 | 11/2006 |
| WO | WO2007000055 | 1/2007 |
| WO | WO-2007015599 | 2/2007 |
| WO | WO-2007044144 | 4/2007 |
| WO | WO-2007068974 A2 | 6/2007 |
| WO | WO-2007081971 A2 | 7/2007 |
| WO | WO-2007084717 A2 | 7/2007 |
| WO | 2007095267 A2 | 8/2007 |
| WO | WO-2007089086 A1 | 8/2007 |
| WO | WO-2007138690 A1 | 12/2007 |
| WO | WO-2008011769 A1 | 1/2008 |
| WO | WO-2008050260 A1 | 5/2008 |
| WO | WO-2008050292 A2 | 5/2008 |
| WO | WO2008072628 A1 | 6/2008 |
| WO | WO2008109691 A2 | 9/2008 |
| WO | WO2009140221 | 11/2009 |
| WO | WO-2009140222 A1 | 11/2009 |
| WO | WO-2009140223 | 11/2009 |

OTHER PUBLICATIONS

Fan et al: "Bandwidth allocation in UWB WPANs with ECMA-368 MAC", Computer Communications, Elsevier Science Publishers BV, Amsterdam, NL, vol. 32, No. 5, Mar. 27, 2009, pp. 954-960, XP026001994, ISSN: 0140-3664, DOI: DOI:10.1016/J.COMCOM.2008.12.024 [retrieved on Dec. 30, 2008].

Nikitin P.V., et al., "Theory and Measurement of Backscattering from RFID Tags", Antennas and Propagation Magazine, Dec. 2006, pp. 8. URL: http://www.ee.washington.edu/people/faculty/nikitin_pavel/papers/APmag_2006.pdf.

Turner C., et al., "Backscatter modulation of Impedance Modulated RFID tags", Feb. 2003, pp. 5. URL: http://www.rfip.eu/downloads/backscatter_tag_link_budget_and_modulation_at_reader_receiver.pdf.

Yates et al., "Optimal transmission frequency for ultralow-power short-range radio links", Source: IEEE Transactions on Circuits and Systems I: Fundamental Theory and Applications,, vol. 51, No. 7, Jul. 2004, pp. 1405-1413, ISSN: 1057-7122; DOI: 10.1109/TCSI.2004.830696; Publisher: IEEE, USA Author affiliation: Dept. of Electr. & Electron. Eng., Imperial Coll. London, UK.

Want R. "The Magic of RFID"QUEUE, vol. 2, No. 7, Oct. 2004, pp. 41-48, XP002585314Internet ISSN: 1542-7730 DOI: http://doi.acm.org/10.1145/1035594.1035619.

Want R. "An introduction to RFID technology" IEEE Pervasive Computing, IEEE Service Center, Los Alamitos, CA, US LNKD—DOI:10.1109/MPRV.2006.2. vol. 5, No. 1, Jan. 1, 2006, pp. 25-33, XP002510139ISSN: 1536-1268.

* cited by examiner

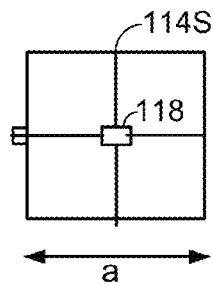 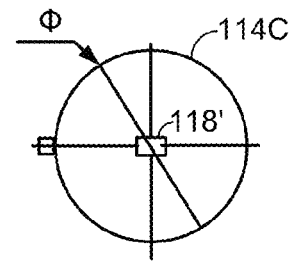
FIG. 5A  FIG. 5B
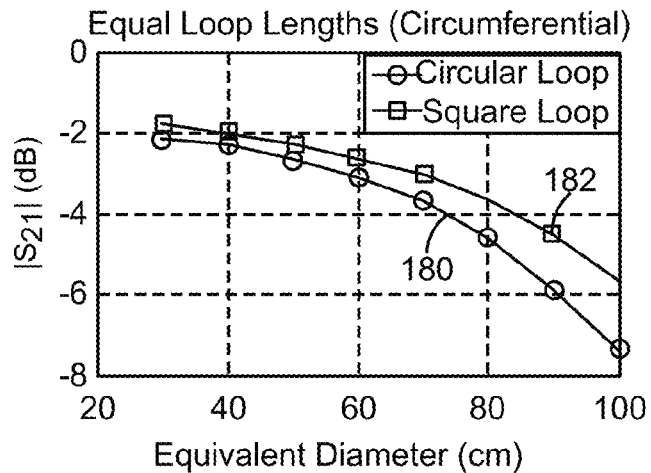
FIG. 6
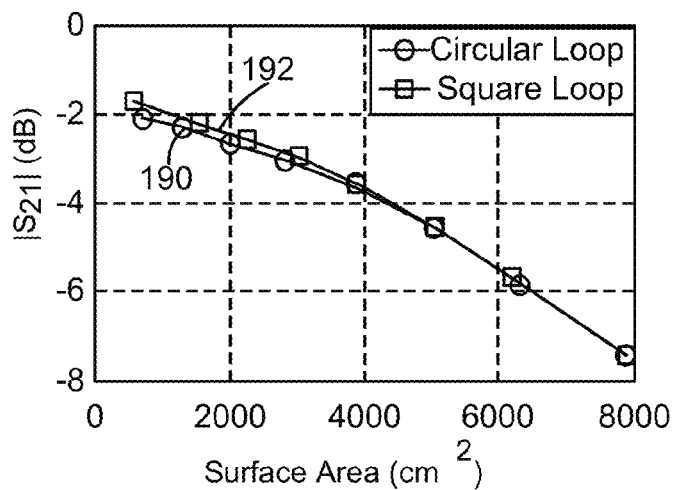
FIG. 7

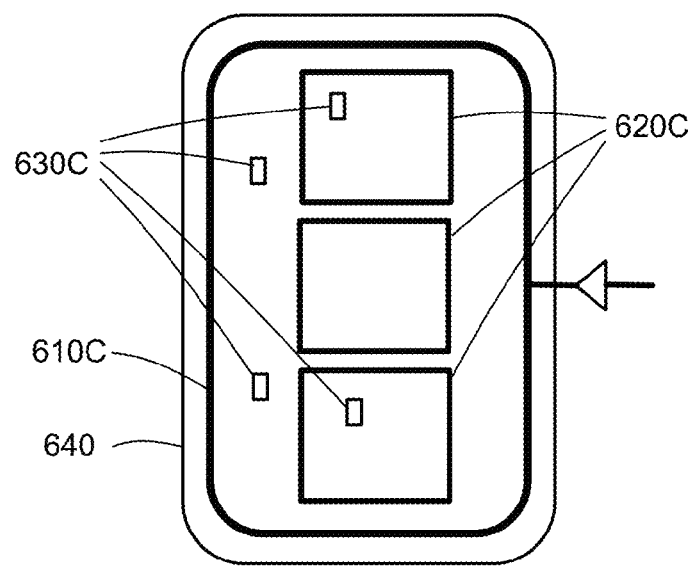
FIG. 17A
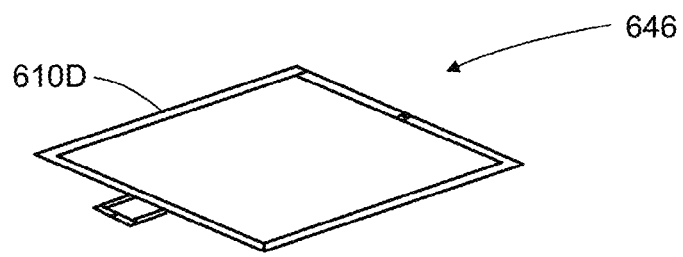
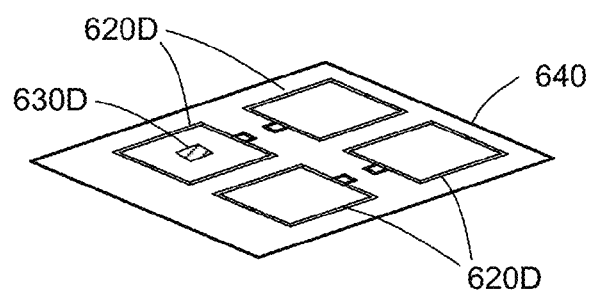
FIG. 17B

WIRELESS POWER TRANSFER FOR FURNISHINGS AND BUILDING ELEMENTS

This application claims priority under 35 U.S.C. §119(e) to:

U.S. Provisional Patent Application 61/152,088 entitled "WIRELESS POWER CHARGERS IN FURNITURE" filed on Feb. 12, 2009, and assigned to the assignee hereof and hereby expressly incorporated by reference herein;

U.S. Provisional Patent Application 61/164,411 entitled "WIRELESS POWER CHARGERS IN FURNITURE" filed on Mar. 28, 2009, and assigned to the assignee hereof and hereby expressly incorporated by reference herein;

U.S. Provisional Patent Application 61/163,376 entitled "WALL-MOUNTED WIRELESS CHARGING" filed on Mar. 25, 2009, and assigned to the assignee hereof and hereby expressly incorporated by reference herein; and U.S. Provisional Patent Application 61/151,290, entitled "MULTI DIMENSIONAL WIRELESS CHARGER" filed on Feb. 10, 2009, and assigned to the assignee hereof and hereby expressly incorporated by reference herein.

This application is a continuation-in-part of U.S. patent application Ser. No. 12/267,041, filed Nov. 07, 2008, which claims the benefit under 35 U.S.C. §119(e) of:

U.S. Provisional Patent Application 61/060,735 entitled "REVERSE LINK SIGNALING VIA RECEIVE ANTENNA IMPEDANCE MODULATION" filed on Jun. 11, 2008;

U.S. Provisional Patent Application 61/060,738 entitled "SIGNALING CHARGING IN WIRELESS POWER ENVIRONMENT" filed on Jun. 11, 2008;

U.S. Provisional Patent Application 61/053,008 entitled "ADAPTIVE TUNING MECHANISM FOR WIRELESS POWER TRANSFER" filed on May 13, 2008;

U.S. Provisional Patent Application 61/053,010 entitled "EFFICIENT POWER MANAGEMENT SCHEME FOR WIRELESS POWER CHARGING SYSTEMS" filed on May 13, 2008;

U.S. Provisional Patent Application 61/060,741 entitled "TRANSMIT POWER CONTROL FOR A WIRELESS CHARGING SYSTEM" filed on Jun. 11, 2008;

U.S. Provisional Patent Application 61/053,000 entitled "REPEATERS FOR ENHANCEMENT OF WIRELESS POWER TRANSFER" filed on May 13, 2008;

U.S. Provisional Patent Application 61/053,004 entitled "WIRELESS POWER TRANSFER FOR APPLIANCES AND EQUIPMENTS" filed on May 13, 2008;

U.S. Provisional Patent Application 61/081,332 entitled "WIRELESS POWER TRANSFER USING NEGATIVE RESISTANCE" filed on Jul. 16, 2008;

U.S. Provisional Patent Application 61/053,012 entitled "EMBEDDED RECEIVE ANTENNA FOR WIRELESS POWER TRANSFER" filed on May 13, 2008; and U.S. Provisional Patent Application 61/053,015 entitled "PLANAR LARGE AREA WIRELESS CHARGING SYSTEM" filed on May 13, 2008.

BACKGROUND

Typically, each battery powered device such as a wireless electronic device requires its own charger and power source, which is usually an alternating current (AC) power outlet. Such a wired configuration becomes unwieldy when many devices need charging.

Approaches are being developed that use over-the-air or wireless power transmission between a transmitter and a receiver coupled to the electronic device to be charged. Such approaches generally fall into two categories. One is based on the coupling of plane wave radiation (also called far-field radiation) between a transmit antenna and a receive antenna on the device to be charged. The receive antenna collects the radiated power and rectifies it for charging the battery. Antennas are generally of resonant length in order to improve the coupling efficiency. This approach suffers from the fact that the power coupling falls off quickly with distance between the antennas, so charging over reasonable distances (e.g., less than 1 to 2 meters) becomes difficult. Additionally, since the transmitting system radiates plane waves, unintentional radiation can interfere with other systems if not properly controlled through filtering.

Other approaches to wireless energy transmission techniques are based on inductive coupling between a transmit antenna embedded, for example, in a "charging" mat or surface and a receive antenna (plus a rectifying circuit) embedded in the host electronic device to be charged. This approach has the disadvantage that the spacing between transmit and receive antennas must be very close (e.g., within thousandths of meters). Though this approach does have the capability to simultaneously charge multiple devices in the same area, this area is typically very small and requires the user to accurately locate the devices to a specific area. Therefore, there is a need to provide a wireless charging arrangement that accommodates flexible placement and orientation of transmit and receive antennas.

With wireless power transmission there is a need for systems and methods for disposing the transmit antennas in furniture or buildings to convenient and unobtrusive wireless power transmission. There is also a need for adjusting the operating characteristics of the antennas to adapt to different circumstances and optimize power transfer characteristics.

BRIEF DESCRIPTION OF THE DRAWINGS

FIGS. 5A and 5B show layouts of loop antennas for transmit and receive antennas according to exemplary embodiments of the present invention.

FIG. 6 shows simulation results indicating coupling strength between transmit and receive antennas relative to various circumference sizes for the square and circular transmit antennas illustrated in FIGS. 5A and 5B.

FIG. 7 shows simulation results indicating coupling strength between transmit and receive antennas relative to various surface areas for the square and circular transmit antennas illustrated in FIGS. 5A and 5B.

FIG. 17A illustrates a large transmit antenna with a three different smaller repeater antennas disposed coplanar with, and within a perimeter of, the transmit antenna.

FIG. 17B illustrates a large transmit antenna with smaller repeater antennas with offset coaxial placements and offset coplanar placements relative to the transmit antenna.

DETAILED DESCRIPTION

The word "exemplary" is used herein to mean "serving as an example, instance, or illustration." Any embodiment described herein as "exemplary" is not necessarily to be construed as preferred or advantageous over other embodiments.

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well-known structures and devices are shown in block diagram form in order to avoid obscuring the novelty of the exemplary embodiments presented herein.

The words "wireless power" is used herein to mean any form of energy associated with electric fields, magnetic fields, electromagnetic fields, or otherwise that is transmitted between from a transmitter to a receiver without the use of physical electromagnetic conductors.

Figure 1:
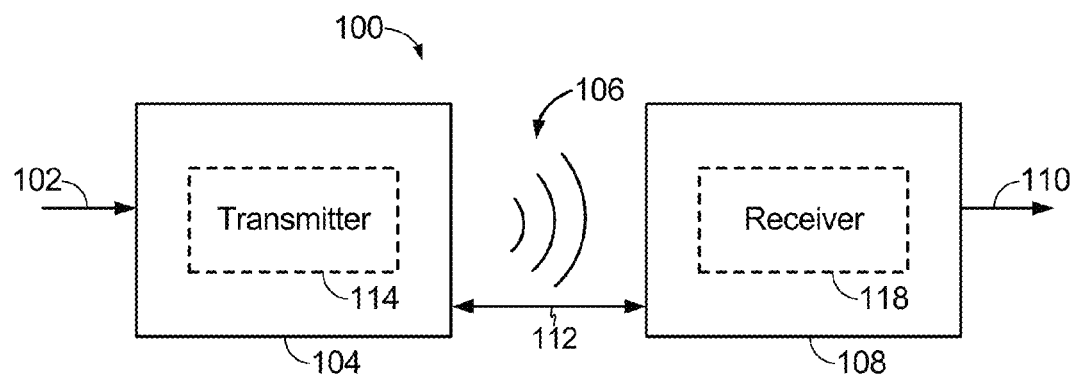
FIG. 1 shows a simplified block diagram of a wireless power transfer system.

FIG. 1 illustrates wireless transmission or charging system 100, in accordance with various exemplary embodiments of the present invention. Input power 102 is provided to a transmitter 104 for generating a radiated field 106 for providing energy transfer. A receiver 108 couples to the radiated field 106 and generates an output power 110 for storing or consumption by a device (not shown) coupled to the output power 110. Both the transmitter 104 and the receiver 108 are separated by a distance 112. In one exemplary embodiment, transmitter 104 and receiver 108 are configured according to a mutual resonant relationship and when the resonant frequency of receiver 108 and the resonant frequency of transmitter 104 are exactly identical, transmission losses between the transmitter 104 and the receiver 108 are minimal when the receiver 108 is located in the "near-field" of the radiated field 106.

Transmitter 104 further includes a transmit antenna 114 for providing a means for energy transmission and receiver 108 further includes a receive antenna 118 for providing a means for energy reception. The transmit and receive antennas are sized according to applications and devices to be associated therewith. As stated, an efficient energy transfer occurs by coupling a large portion of the energy in the near-field of the transmitting antenna to a receiving antenna rather than propagating most of the energy in an electromagnetic wave to the far field. When in this near-field a coupling mode may be developed between the transmit antenna 114 and the receive antenna 118. The area around the antennas 114 and 118 where this near-field coupling may occur is referred to herein as a coupling-mode region.

Figure 2:
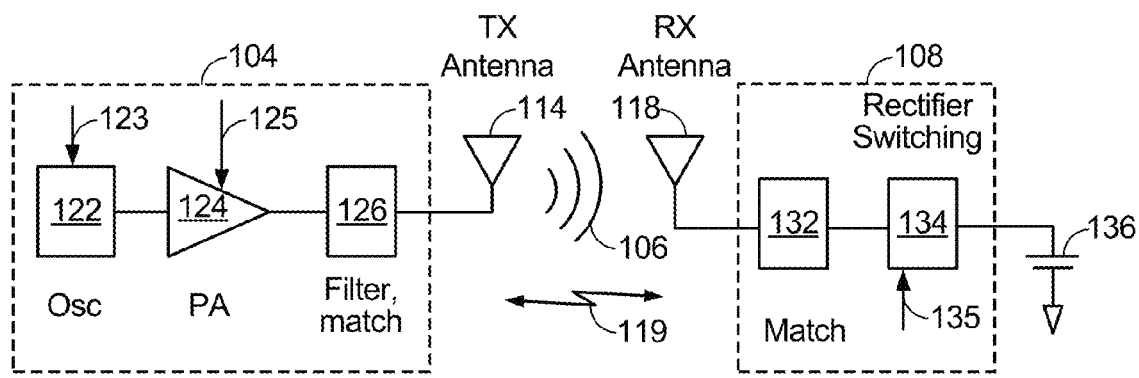
FIG. 2 shows a simplified schematic diagram of a wireless power transfer system.

FIG. 2 shows a simplified schematic diagram of a wireless power transfer system. The transmitter 104 includes an oscillator 122, a power amplifier 124 and a filter and matching circuit 126. The oscillator is configured to generate at a desired frequency, which may be adjusted in response to adjustment signal 123. The oscillator signal may be amplified by the power amplifier 124 with an amplification amount responsive to control signal 125. The filter and matching circuit 126 may be included to filter out harmonics or other unwanted frequencies and match the impedance of the transmitter 104 to the transmit antenna 114.

The receiver may include a matching circuit 132 and a rectifier and switching circuit to generate a DC power output to charge a battery 136 as shown in FIG. 2 or power a device coupled to the receiver (not shown). The matching circuit 132 may be included to match the impedance of the receiver 108 to the receive antenna 118.

Figure 3:
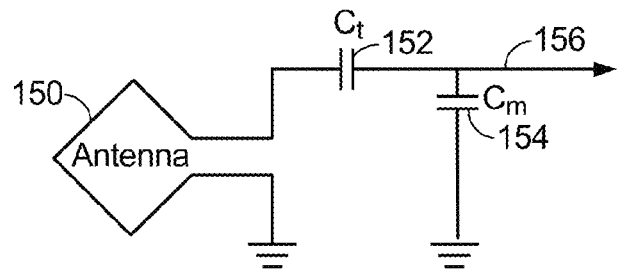
FIG. 3 shows a schematic diagram of a loop antenna for use in exemplary embodiments of the present invention.

As illustrated in FIG. 3, antennas used in exemplary embodiments may be configured as a "loop" antenna 150, which may also be referred to herein as a "magnetic" antenna. Loop antennas may be configured to include an air core or a physical core such as a ferrite core. Air core loop antennas may be more tolerable to extraneous physical devices placed in the vicinity of the core. Furthermore, an air core loop antenna allows the placement of other components within the core area. In addition, an air core loop may more readily enable placement of the receive antenna 118 (FIG. 2) within a plane of the transmit antenna 114 (FIG. 2) where the coupled-mode region of the transmit antenna 114 (FIG. 2) may be more powerful.

As stated, efficient transfer of energy between the transmitter 104 and receiver 108 occurs during matched or nearly matched resonance between the transmitter 104 and the receiver 108. However, even when resonance between the transmitter 104 and receiver 108 are not matched, energy may be transferred at a lower efficiency. Transfer of energy occurs by coupling energy from the near-field of the transmitting antenna to the receiving antenna residing in the neighborhood where this near-field is established rather than propagating the energy from the transmitting antenna into free space.

The resonant frequency of the loop or magnetic antennas is based on the inductance and capacitance. Inductance in a loop antenna is generally simply the inductance created by the loop, whereas, capacitance is generally added to the loop antenna's inductance to create a resonant structure at a desired resonant frequency. As a non-limiting example, capacitor 152 and capacitor 154 may be added to the antenna to create a resonant circuit that generates resonant signal 156. Accordingly, for larger diameter loop antennas, the size of capacitance needed to induce resonance decreases as the diameter or inductance of the loop increases. Furthermore, as the diameter of the loop or magnetic antenna increases, the efficient energy transfer area of the near-field increases. Of course, other resonant circuits are possible. As another non-limiting example, a capacitor may be placed in parallel between the two terminals of the loop antenna. In addition, those of ordinary skill in the art will recognize that for transmit antennas the resonant signal 156 may be an input to the loop antenna 150.

Exemplary embodiments of the invention include coupling power between two antennas that are in the near-fields of each other. As stated, the near-field is an area around the antenna in which electromagnetic fields exist but may not propagate or radiate away from the antenna. They are typically confined to a volume that is near the physical volume of the antenna. In the exemplary embodiments of the invention, magnetic type antennas such as single and multi-turn loop antennas are used for both transmit (Tx) and receive (Rx) antenna systems since magnetic near-field amplitudes tend to be higher for magnetic type antennas in comparison to the electric near-fields of an electric-type antenna (e.g., a small dipole). This allows for potentially higher coupling between the pair. Furthermore, "electric" antennas (e.g., dipoles and monopoles) or a combination of magnetic and electric antennas is also contemplated.

The Tx antenna can be operated at a frequency that is low enough and with an antenna size that is large enough to achieve good coupling (e.g., >−4 dB) to a small Rx antenna at significantly larger distances than allowed by far field and inductive approaches mentioned earlier. If the Tx antenna is sized correctly, high coupling levels (e.g., −2 to −4 dB) can be achieved when the Rx antenna on a host device is placed within a coupling-mode region (i.e., in the near-field) of the driven Tx loop antenna.

Figure 4:
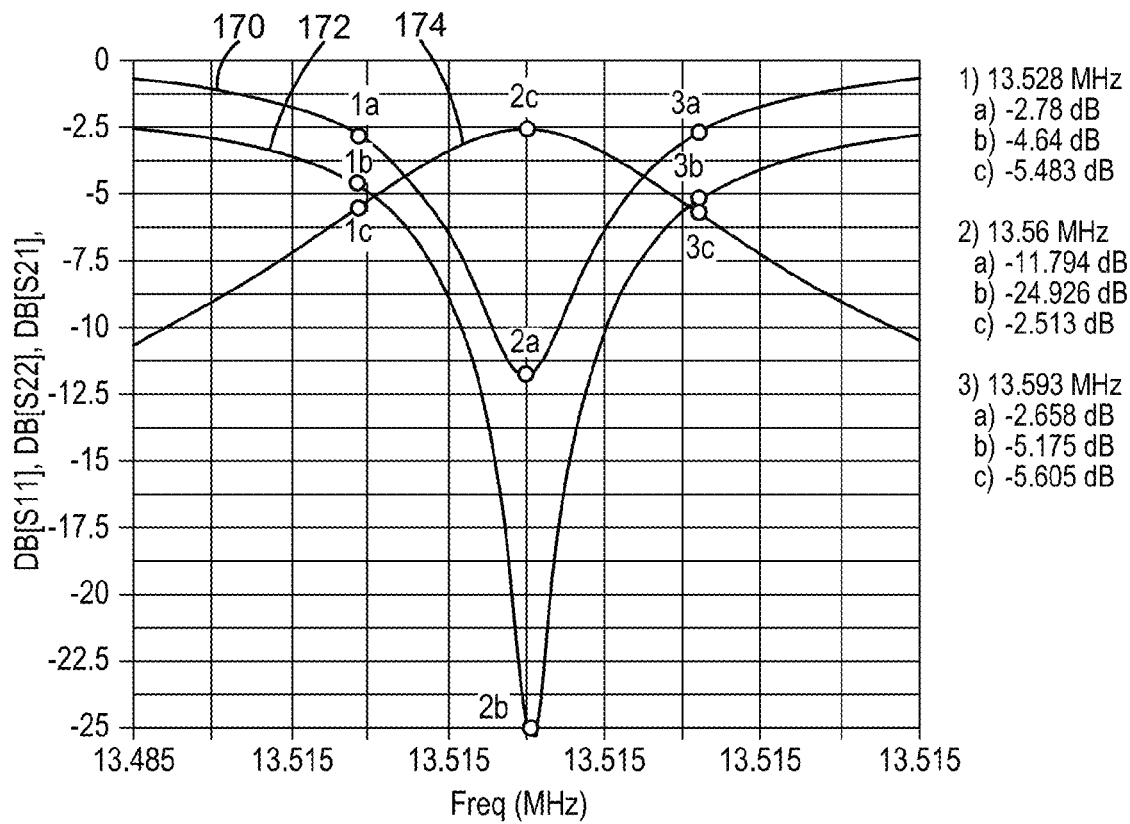
FIG. 4 shows simulation results indicating coupling strength between transmit and receive antennas.

FIG. 4 shows simulation results indicating coupling strength between transmit and receive antennas. Curves 170 and 172 indicate a measure of acceptance of power by the transmit and receive antennas, respectively. In other words, with a large negative number there is a very close impedance match and most of the power is accepted and, as a result, radiated by the transmit antenna. Conversely, a small negative number indicates that much of the power is reflected back from the antenna because there is not a close impedance match at the given frequency. In FIG. 4, the transmit antenna and the receive antenna are tuned to have a resonant frequency of about 13.56 MHz.

Curve 170 illustrates the amount of power transmitted from the transmit antenna at various frequencies. Thus, at points 1a and 3a, corresponding to about 13.528 MHz and 13.593 MHz, much of the power is reflected and not transmitted out of the transmit antenna. However, at point 2a, corresponding to about 13.56 MHz, it can be seen that a large amount of the power is accepted and transmitted out of the antenna.

Similarly, curve 172 illustrates the amount of power received by the receive antenna at various frequencies. Thus, at points 1b and 3b, corresponding to about 13.528 MHz and 13.593 MHz, much of the power is reflected and not conveyed through the receive antenna and into the receiver. However, at point 2b corresponding to about 13.56 MHz, it can be seen that a large amount of the power is accepted by the receive antenna and conveyed into the receiver.

Curve 174 indicates the amount of power received at the receiver after being sent from the transmitter through the transmit antenna, received through the receive antenna and conveyed to the receiver. Thus, at points 1c and 3c, corresponding to about 13.528 MHz and 13.593 MHz, much of the power sent out of the transmitter is not available at the receiver because (1) the transmit antenna rejects much of the power sent to it from the transmitter and (2) the coupling between the transmit antenna and the receive antenna is less efficient as the frequencies move away from the resonant frequency. However, at point 2c corresponding to about 13.56 MHz, it can be seen that a large amount of the power sent from the transmitter is available at the receiver, indicating a high degree of coupling between the transmit antenna and the receive antenna.

FIGS. 5A and 5B show layouts of loop antennas for transmit and receive antennas according to exemplary embodiments of the present invention. Loop antennas may be configured in a number of different ways, with single loops or multiple loops at wide variety of sizes. In addition, the loops may be a number of different shapes, such as, for example only, circular, elliptical, square, and rectangular. FIG. 5A illustrates a large square loop transmit antenna 114S and a small square loop receive antenna 118 placed in the same plane as the transmit antenna 114S and near the center of the transmit antenna 114S. FIG. 5B illustrates a large circular loop transmit antenna 114C and a small square loop receive antenna 118' placed in the same plane as the transmit antenna 114C and near the center of the transmit antenna 114C. The square loop transmit antenna 114S has side lengths of "a" while the circular loop transmit antenna 114C has a diameter of "Φ." For a square loop, it can be shown that there is an equivalent circular loop whose diameter may be defined as: $\Phi_{eq}=4a/\pi$.

FIG. 6 shows simulation results indicating coupling strength between transmit and receive antennas relative to various circumferences for the square and circular transmit antennas illustrated in FIGS. 5A and 5B. Thus, curve 180 shows coupling strength between the circular loop transmit antennas 114C and the receive antenna 118' at various circumference sizes for the circular loop transmit antenna 114C. Similarly, curve 182 shows coupling strength between the square loop transmit antennas 114S and the receive antenna 118 at various equivalent circumference sizes for the square loop transmit antenna 114S.

FIG. 7 shows simulation results indicating coupling strength between transmit and receive antennas relative to various surface areas for the square and circular transmit antennas illustrated in FIGS. 5A and 5B. Thus, curve 190 shows coupling strength between the circular loop transmit antennas 114C and the receive antenna 118' at various surface areas for the circular loop transmit antenna 114C. Similarly, curve 192 shows coupling strength between the square loop transmit antennas 114S and the receive antenna 118 at various surface areas for the square loop transmit antenna 114S.

Figure 8:
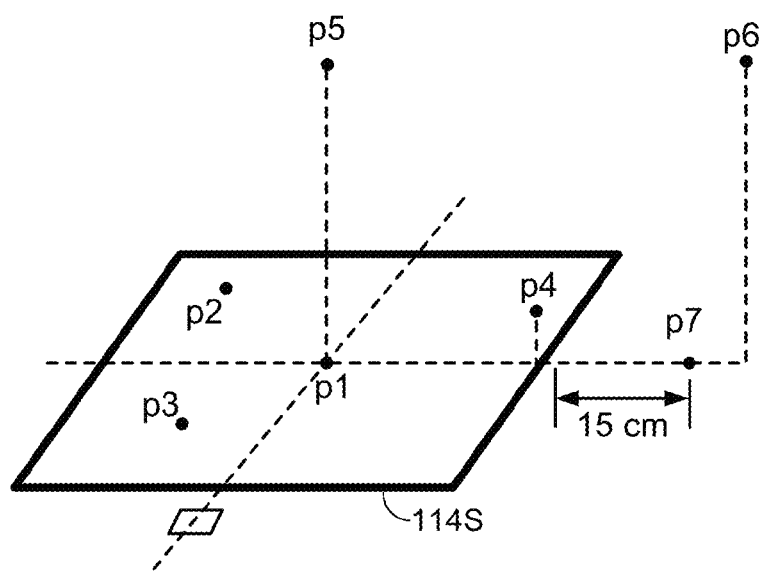
FIG. 8 shows various placement points for a receive antenna relative to a transmit antenna to illustrate coupling strengths in coplanar and coaxial placements.

FIG. 8 shows various placement points for a receive antenna relative to a transmit antenna to illustrate coupling strengths in coplanar and coaxial placements. "Coplanar," as used herein, means that the transmit antenna and receive antenna have planes that are substantially aligned (i.e., have surface normals pointing in substantially the same direction) and with no distance (or a small distance) between the planes of the transmit antenna and the receive antenna. "Coaxial," as used herein, means that the transmit antenna and receive antenna have planes that are substantially aligned (i.e., have surface normals pointing in substantially the same direction) and the distance between the two planes is not trivial and furthermore, the surface normal of the transmit antenna and the receive antenna lie substantially along the same vector, or the two normals are in echelon.

As examples, points p1, p2, p3, and p7 are all coplanar placement points for a receive antenna relative to a transmit antenna. As another example, point p5 and p6 are coaxial placement points for a receive antenna relative to a transmit antenna. The table below shows coupling strength (S21) and coupling efficiency (expressed as a percentage of power transmitted from the transmit antenna that reached the receive antenna) at the various placement points (p1-p7) illustrated in FIG. 8.

TABLE 1

| Position | Distance from plane (cm) | S21 efficiency (%) | Efficiency (TX DC power in to RX DC power out) |
|---|---|---|---|
| p1 | 0 | 46.8 | 28 |
| p2 | 0 | 55.0 | 36 |
| p3 | 0 | 57.5 | 35 |
| p4 | 2.5 | 49.0 | 30 |
| p5 | 17.5 | 24.5 | 15 |
| p6 | 17.5 | 0.3 | 0.2 |
| p7 | 0 | 5.9 | 3.4 |

As can be seen, the coplanar placement points p1, p2, and p3, all show relatively high coupling efficiencies. Placement point p7 is also a coplanar placement point, but is outside of the transmit loop antenna. While placement point p7 does not have a high coupling efficiency, it is clear that there is some coupling and the coupling-mode region extends beyond the perimeter of the transmit loop antenna.

Placement point p5 is coaxial with the transmit antenna and shows substantial coupling efficiency. The coupling efficiency for placement point p5 is not as high as the coupling efficiencies for the coplanar placement points. However, the coupling efficiency for placement point p5 is high enough that substantial power can be conveyed between the transmit antenna and a receive antenna in a coaxial placement.

Placement point p4 is within the circumference of the transmit antenna but at a slight distance above the plane of the transmit antenna in a position that may be referred to as an offset coaxial placement (i.e., with surface normals in substantially the same direction but at different locations) or offset coplanar (i.e., with surface normals in substantially the same direction but with planes that are offset relative to each other). From the table it can be seen that with an offset distance of 2.5 cm, placement point p4 still has relatively good coupling efficiency.

Placement point p6 illustrates a placement point outside the circumference of the transmit antenna and at a substantial distance above the plane of the transmit antenna. As can be seen from the table, placement point p7 shows little coupling efficiency between the transmit and receive antennas.

Figure 9:
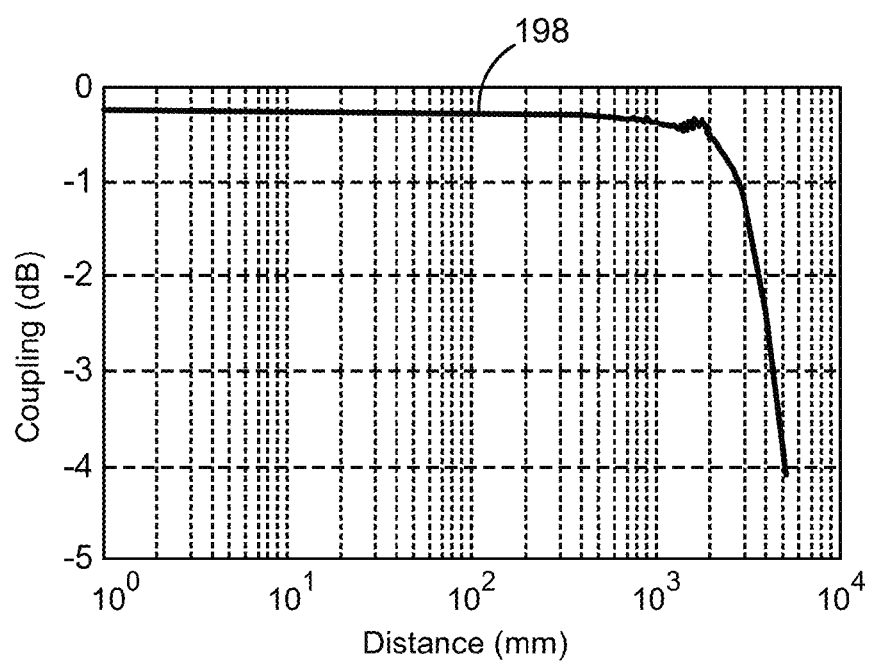
FIG. 9 shows simulation results indicating coupling strength for coaxial placement at various distances between the transmit and receive antennas.

FIG. 9 shows simulation results indicating coupling strength for coaxial placement at various distances between the transmit and receive antennas. The simulations for FIG. 9 are for square transmit and receive antennas in a coaxial placement, both with sides of about 1.2 meters and at a transmit frequency of 10 MHz. It can be seen that the coupling strength remains quite high and uniform at distances of less than about 0.5 meters.

Figure 10:
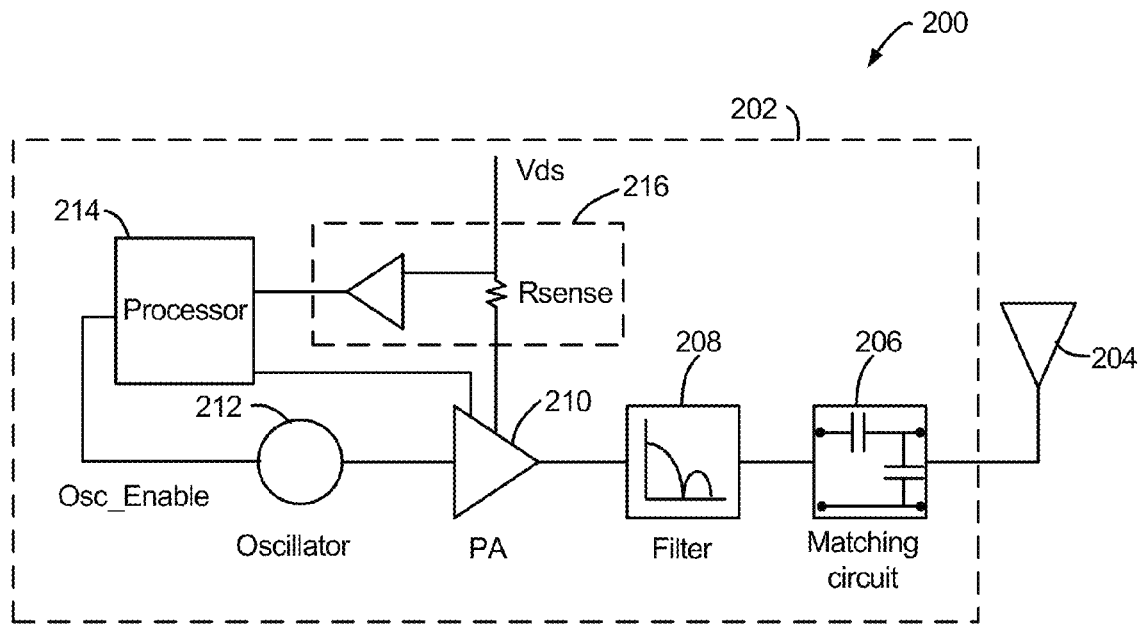
FIG. 10 is a simplified block diagram of a transmitter, in accordance with an exemplary embodiment of the present invention.

FIG. 10 is a simplified block diagram of a transmitter, in accordance with an exemplary embodiment of the present invention. A transmitter 200 includes transmit circuitry 202 and a transmit antenna 204. Generally, transmit circuitry 202 provides RF power to the transmit antenna 204 by providing an oscillating signal resulting in generation of near-field energy about the transmit antenna 204. By way of example, transmitter 200 may operate at the 13.56 MHz ISM band.

Exemplary transmit circuitry 202 includes a fixed impedance matching circuit 206 for matching the impedance of the transmit circuitry 202 (e.g., 50 ohms) to the transmit antenna 204 and a low pass filter (LPF) 208 configured to reduce harmonic emissions to levels to prevent self-jamming of devices coupled to receivers 108 (FIG. 1). Other embodiments may include different filter topologies, including but not limited to, notch filters that attenuate specific frequencies while passing others and may include an adaptive impedance match, that can be varied based on measurable transmit metrics, such as output power to the antenna or DC current draw by the power amplifier. Transmit circuitry 202 further includes a power amplifier 210 configured to drive an RF signal as determined by an oscillator 212. The transmit circuitry may be comprised of discrete devices or circuits, or alternately, may be comprised of an integrated assembly. An exemplary RF power output from transmit antenna 204 may be on the order of 2.5 Watts.

Transmit circuitry 202 further includes a processor 214 for enabling the oscillator 212 during transmit phases (or duty cycles) for specific receivers, for adjusting the frequency of the oscillator, and for adjusting the output power level for implementing a communication protocol for interacting with neighboring devices through their attached receivers.

The transmit circuitry 202 may further include a load sensing circuit 216 for detecting the presence or absence of active receivers in the vicinity of the near-field generated by transmit antenna 204. By way of example, a load sensing circuit 216 monitors the current flowing to the power amplifier 210, which is affected by the presence or absence of active receivers in the vicinity of the near-field generated by transmit antenna 204. Detection of changes to the loading on the power amplifier 210 are monitored by processor 214 for use in determining whether to enable the oscillator 212 for transmitting energy to communicate with an active receiver.

Transmit antenna 204 may be implemented as an antenna strip with the thickness, width and metal type selected to keep resistive losses low. In a conventional implementation, the transmit antenna 204 can generally be configured for association with a larger structure such as a table, mat, lamp or other less portable configuration. Accordingly, the transmit antenna 204 generally will not need "turns" in order to be of a practical dimension. An exemplary implementation of a transmit antenna 204 may be "electrically small" (i.e., fraction of the wavelength) and tuned to resonate at lower usable frequencies by using capacitors to define the resonant frequency. In an exemplary application where the transmit antenna 204 may be larger in diameter, or length of side if a square loop, (e.g., 0.50 meters) relative to the receive antenna, the transmit antenna 204 will not necessarily need a large number of turns to obtain a reasonable capacitance.

Figure 11:
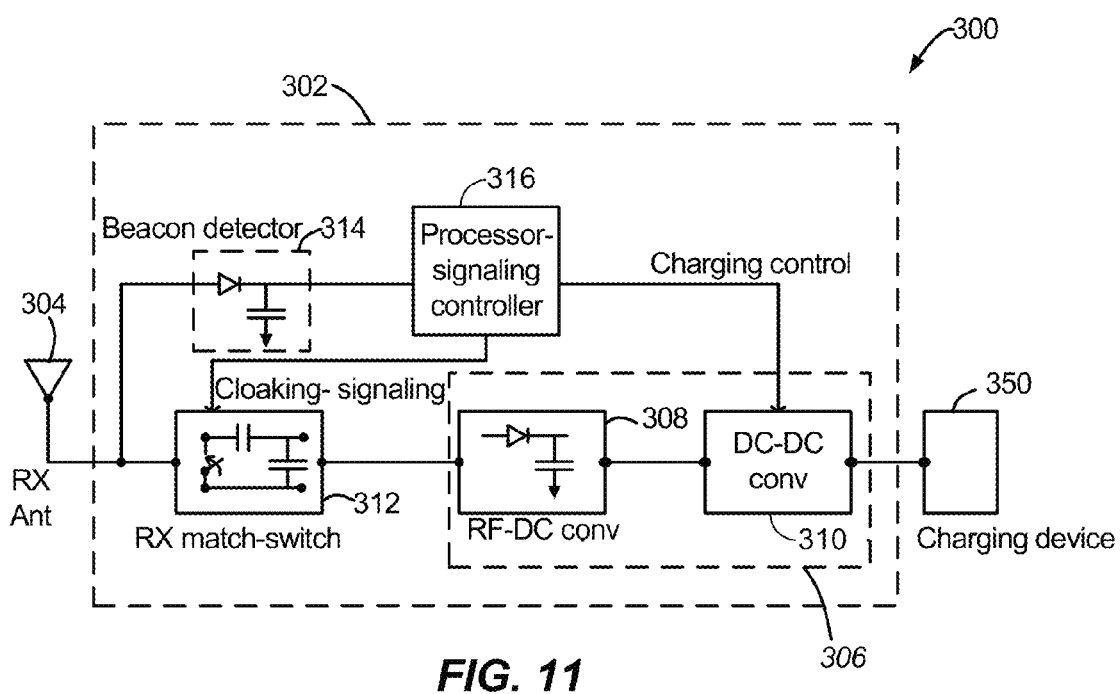
FIG. 11 is a simplified block diagram of a receiver, in accordance with an exemplary embodiment of the present invention.

FIG. 11 is a block diagram of a receiver, in accordance with an exemplary embodiment of the present invention. A receiver 300 includes receive circuitry 302 and a receive antenna 304. Receiver 300 further couples to device 350 for providing received power thereto. It should be noted that receiver 300 is illustrated as being external to device 350 but may be integrated into device 350. Generally, energy is propagated wirelessly to receive antenna 304 and then coupled through receive circuitry 302 to device 350.

Receive antenna 304 is tuned to resonate at the same frequency, or near the same frequency, as transmit antenna 204 (FIG. 10). Receive antenna 304 may be similarly dimensioned with transmit antenna 204 or may be differently sized based upon the dimensions of an associated device 350. By way of example, device 350 may be a portable electronic device having diametric or length dimension smaller that the diameter of length of transmit antenna 204. In such an example, receive antenna 304 may be implemented as a multi-turn antenna in order to reduce the capacitance value of a tuning capacitor (not shown) and increase the receive antenna's impedance. By way of example, receive antenna 304 may be placed around the substantial circumference of device 350 in order to maximize the antenna diameter and reduce the number of loop turns (i.e., windings) of the receive antenna and the inter-winding capacitance.

Receive circuitry 302 provides an impedance match to the receive antenna 304. Receive circuitry 302 includes power conversion circuitry 306 for converting a received RF energy source into charging power for use by device 350. Power conversion circuitry 306 includes an RF-to-DC converter 308 and may also in include a DC-to-DC converter 310. RF-to-DC converter 308 rectifies the RF energy signal received at receive antenna 304 into a non-alternating power while DC-to-DC converter 310 converts the rectified RF energy signal into an energy potential (e.g., voltage) that is compatible with device 350. Various RF-to-DC converters are contemplated including partial and full rectifiers, regulators, bridges, doublers, as well as linear and switching converters.

Receive circuitry 302 may further include switching circuitry 312 for connecting receive antenna 304 to the power conversion circuitry 306 or alternatively for disconnecting the power conversion circuitry 306. Disconnecting receive antenna 304 from power conversion circuitry 306 not only suspends charging of device 350, but also changes the "load" as "seen" by the transmitter 200 (FIG. 2) as is explained more fully below. As disclosed above, transmitter 200 includes load sensing circuit 216 which detects fluctuations in the bias current provided to transmitter power amplifier 210. Accordingly, transmitter 200 has a mechanism for determining when receivers are present in the transmitter's near-field.

When multiple receivers 300 are present in a transmitter's near-field, it may be desirable to time-multiplex the loading and unloading of one or more receivers to enable other receivers to more efficiently couple to the transmitter. A receiver may also be cloaked in order to eliminate coupling to other nearby receivers or to reduce loading on nearby transmitters. This "unloading" of a receiver is also known herein as a "cloaking". Furthermore, this switching between unloading and loading controlled by receiver 300 and detected by transmitter 200 provides a communication mechanism from receiver 300 to transmitter 200 as is explained more fully below. Additionally, a protocol can be associated with the switching which enables the sending of a message from receiver 300 to transmitter 200. By way of example, a switching speed may be on the order of 100 μsec.

In an exemplary embodiment, communication between the transmitter and the receiver refers to a device sensing and charging control mechanism, rather than conventional two-way communication. In other words, the transmitter uses on/off keying of the transmitted signal to adjust whether energy is available in the near-filed. The receivers interpret these changes in energy as a message from the transmitter. From the receiver side, the receiver uses tuning and de-tuning of the receive antenna to adjust how much power is being accepted from the near-field. The transmitter can detect this difference in power used from the near field and interpret these changes as a message from the receiver.

Receive circuitry 302 may further include signaling detector and beacon circuitry 314 used to identify received energy fluctuations, which may correspond to informational signaling from the transmitter to the receiver. Furthermore, signaling and beacon circuitry 314 may also be used to detect the transmission of a reduced RF signal energy (i.e., a beacon signal) and to rectify the reduced RF signal energy into a nominal power for awakening either un-powered or power-depleted circuits within receive circuitry 302 in order to configure receive circuitry 302 for wireless charging.

Receive circuitry 302 further includes processor 316 for coordinating the processes of receiver 300 described herein including the control of switching circuitry 312 described herein. Cloaking of receiver 300 may also occur upon the occurrence of other events including detection of an external wired charging source (e.g., wall/USB power) providing charging power to device 350. Processor 316, in addition to controlling the cloaking of the receiver, may also monitor beacon circuitry 314 to determine a beacon state and extract messages sent from the transmitter. Processor 316 may also adjust DC-to-DC converter 310 for improved performance.

Figure 12:
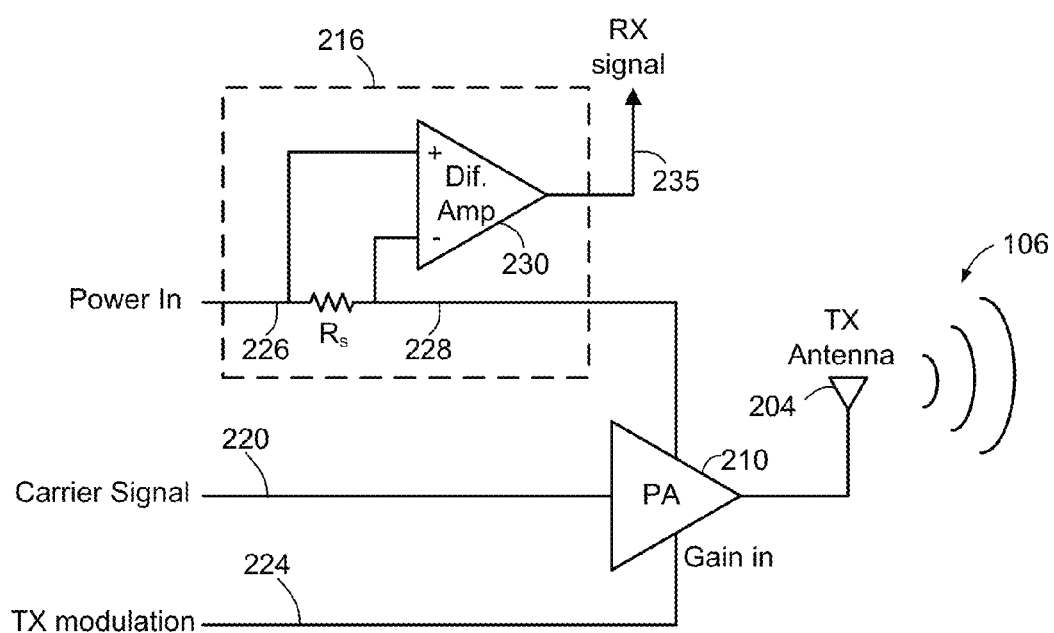
FIG. 12 shows a simplified schematic of a portion of transmit circuitry for carrying out messaging between a transmitter and a receiver.

FIG. 12 shows a simplified schematic of a portion of transmit circuitry for carrying out messaging between a transmitter and a receiver. In some exemplary embodiments of the present invention, a means for communication may be enabled between the transmitter and the receiver. In FIG. 12 a power amplifier 210 drives the transmit antenna 204 to generate the radiated field. The power amplifier is driven by a carrier signal 220 that is oscillating at a desired frequency for the transmit antenna 204. A transmit modulation signal 224 is used to control the output of the power amplifier 210.

The transmit circuitry can send signals to receivers by using an ON/OFF keying process on the power amplifier 210. In other words, when the transmit modulation signal 224 is asserted, the power amplifier 210 will drive the frequency of the carrier signal 220 out on the transmit antenna 204. When the transmit modulation signal 224 is negated, the power amplifier will not drive out any frequency on the transmit antenna 204.

The transmit circuitry of FIG. 12 also includes a load sensing circuit 216 that supplies power to the power amplifier 210 and generates a receive signal 235 output. In the load sensing circuit 216 a voltage drop across resistor $R_s$ develops between the power in signal 226 and the power supply 228 to the power amplifier 210. Any change in the power consumed by the power amplifier 210 will cause a change in the voltage drop that will be amplified by differential amplifier 230. When the transmit antenna is in coupled mode with a receive antenna in a receiver (not shown in FIG. 12) the amount of current drawn by the power amplifier 210 will change. In other words, if no coupled mode resonance exist for the transmit antenna 204, the power required to drive the radiated field will be first amount. If a coupled mode resonance exists, the amount of power consumed by the power amplifier 210 will go up because much of the power is being coupled into the receive antenna. Thus, the receive signal 235 can indicate the presence of a receive antenna coupled to the transmit antenna 204 and can also detect signals sent from the receive antenna, as explained below. Additionally, a change in receiver current draw will be observable in the transmitter's power amplifier current draw, and this change can be used to detect signals from the receive antennas, as explained below.

Figure 13A:
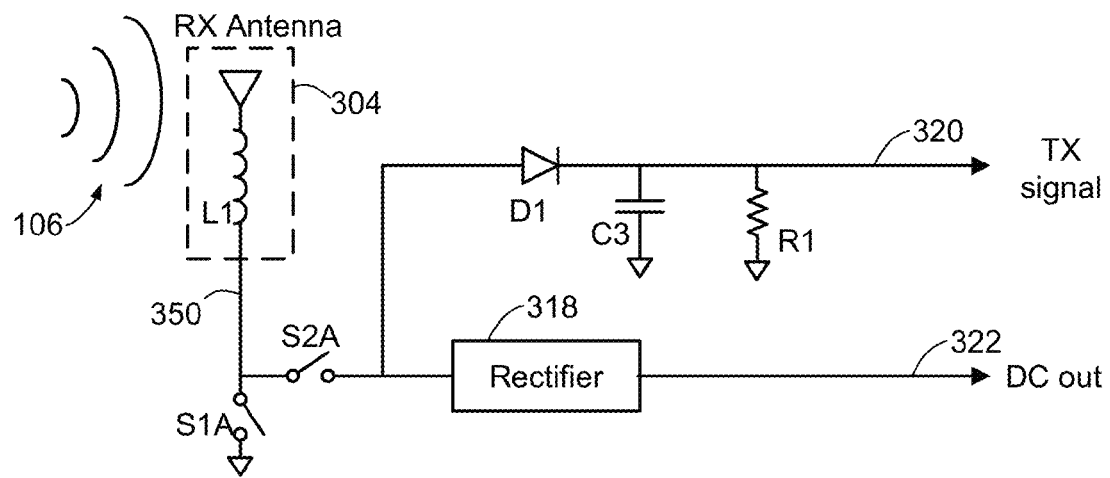
FIGS. 13A-13C shows a simplified schematic of a portion of receive circuitry in various states to illustrate messaging between a receiver and a transmitter.
Figure 13B:
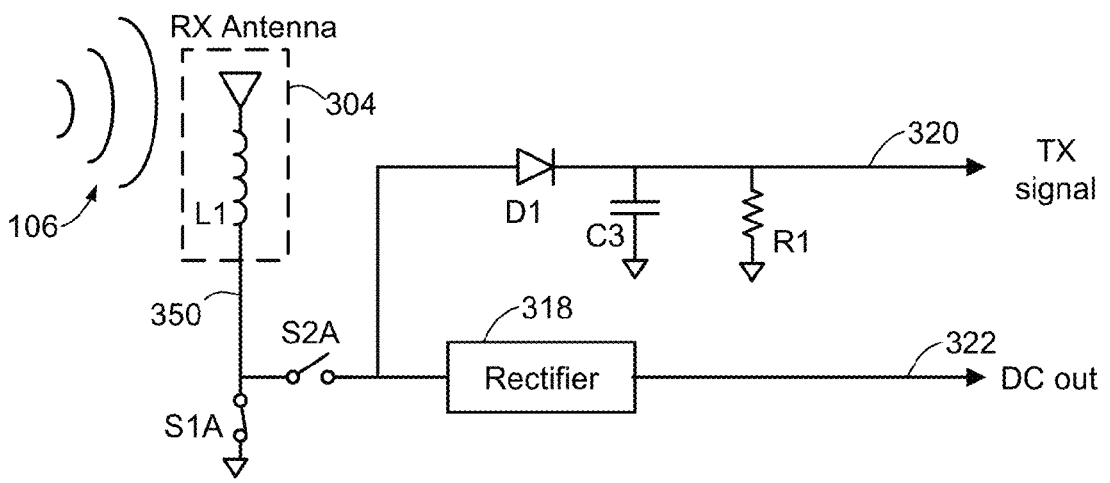
Figure 13C:
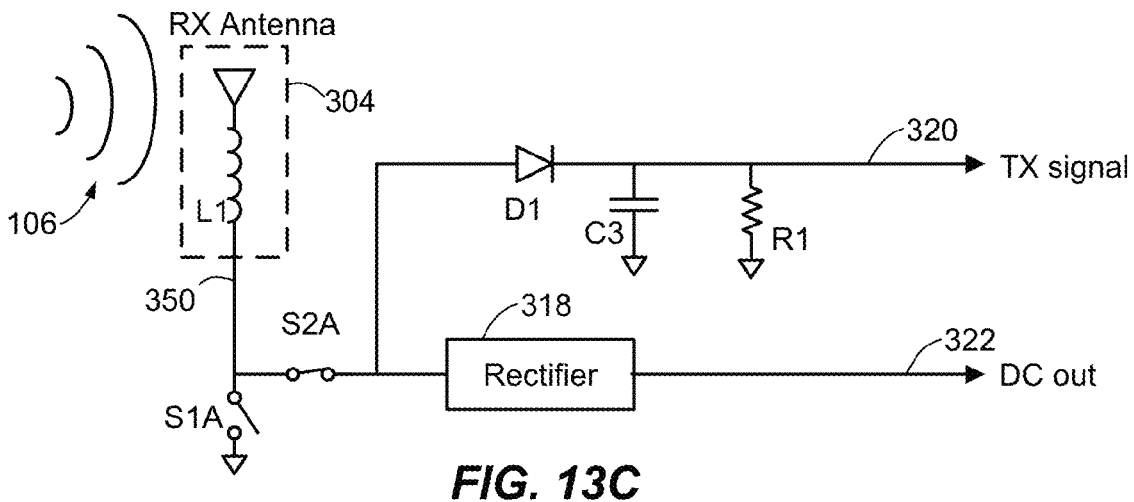

FIGS. 13A-13C shows a simplified schematic of a portion of receive circuitry in various states to illustrate messaging between a receiver and a transmitter. All of FIGS. 13A-13C show the same circuit elements with the difference being state of the various switches. A receive antenna 304 includes a characteristic inductance L1, which drives node 350. Node 350 is selectively coupled to ground through switch S1A. Node 350 is also selectively coupled to diode D1 and rectifier 318 through switch S2A. The rectifier 318 supplies a DC power signal 322 to a receive device (not shown) to power the receive device, charge a battery, or a combination thereof. The diode D1 is coupled to a transmit signal 320 which is filtered to remove harmonics and unwanted frequencies with capacitor C3 and resistor R1. Thus the combination of D1, C3, and R1 can generate a signal on the transmit signal 320 that mimics the transmit modulation generated by the transmit modulation signal 224 discussed above with reference to the transmitter in FIG. 12.

Exemplary embodiments of the invention includes modulation of the receive device's current draw and modulation of the receive antenna's impedance to accomplish reverse link signaling. With reference to both FIG. 13A and FIG. 12, as the power draw of the receive device changes, the load sensing circuit 216 detects the resulting power changes on the transmit antenna and from these changes can generate the receive signal 235.

In the exemplary embodiments of FIGS. 13A-13C, the current draw through the transmitter can be changed by modifying the state of switches S1A and S2A. In FIG. 13A, switch S1A and switch S2A are both open creating a "DC open state" and essentially removing the load from the transmit antenna 204. This reduces the current seen by the transmitter.

In FIG. 13B, switch S1A is closed and switch S2A is open creating a "DC short state" for the receive antenna 304. Thus the state in FIG. 13B can be used to increase the current seen in the transmitter.

In FIG. 13C, switch S1A is open and switch S2A is closed creating a normal receive mode (also referred to herein as a "DC operating state") wherein power can be supplied by the DC out signal 322 and a transmit signal 320 can be detected. In the state shown in FIG. 13C the receiver receives a normal amount of power, thus consuming more or less power from the transmit antenna than the DC open state or the DC short state.

Reverse link signaling may be accomplished by switching between the DC operating state (FIG. 13C) and the DC short state (FIG. 13B). Reverse link signaling also may be accomplished by switching between the DC operating state (FIG. 13C) and the DC open state (FIG. 13A).

Figure 14A:
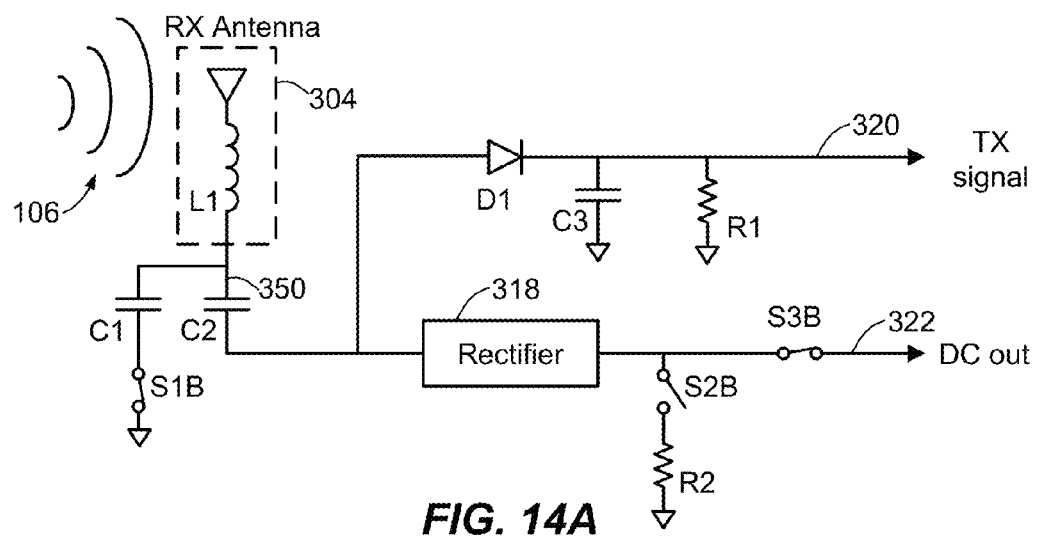
FIGS. 14A-14C shows a simplified schematic of a portion of alternative receive circuitry in various states to illustrate messaging between a receiver and a transmitter.
Figure 14B:
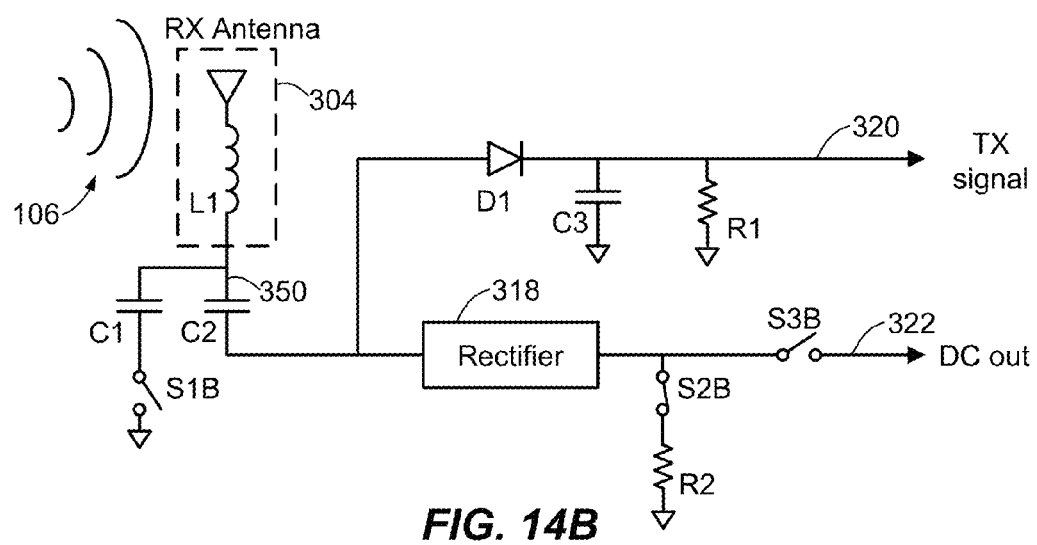
Figure 14C:
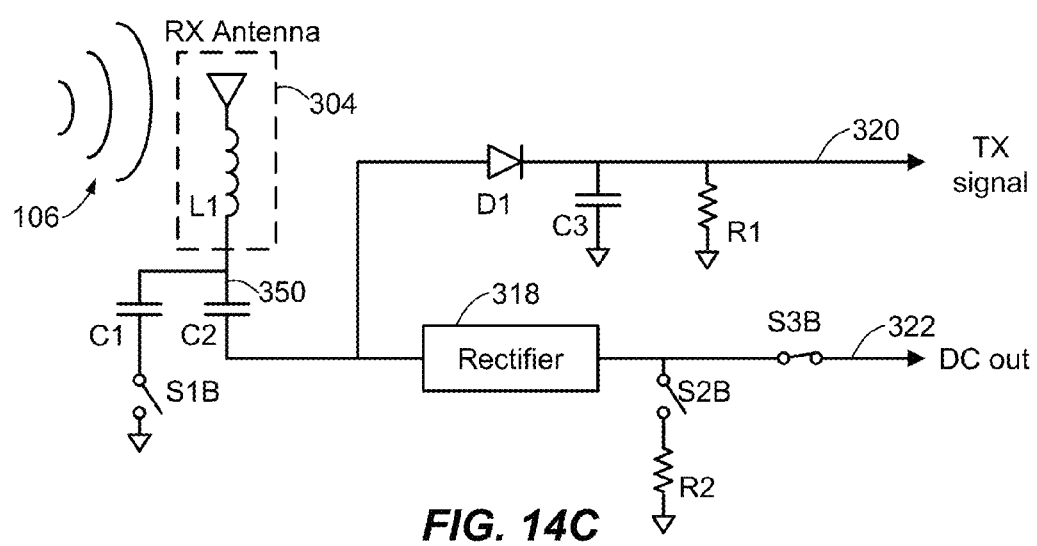

FIGS. 14A-14C shows a simplified schematic of a portion of alternative receive circuitry in various states to illustrate messaging between a receiver and a transmitter.

All of FIGS. 14A-14C show the same circuit elements with the difference being state of the various switches. A receive antenna 304 includes a characteristic inductance L1, which drives node 350. Node 350 is selectively coupled to ground through capacitor C1 and switch SIB. Node 350 is also AC coupled to diode D1 and rectifier 318 through capacitor C2. The diode D1 is coupled to a transmit signal 320 which is filtered to remove harmonics and unwanted frequencies with capacitor C3 and resistor R1. Thus the combination of D1, C3, and R1 can generate a signal on the transmit signal 320 that mimics the transmit modulation generated by the transmit modulation signal 224 discussed above with reference to the transmitter in FIG. 12.

The rectifier 318 is connected to switch S2B, which is connected in series with resistor R2 and ground. The rectifier 318 also is connected to switch S3B. The other side of switch S3B supplies a DC power signal 322 to a receive device (not shown) to power the receive device, charge a battery, or a combination thereof.

In FIGS. 13A-13C the DC impedance of the receive antenna 304 is changed by selectively coupling the receive antenna to ground through switch S1B. In contrast, in the exemplary embodiments of FIGS. 14A-14C, the impedance of the antenna can be modified to generate the reverse link signaling by modifying the state of switches S1B, S2B, and S3B to change the AC impedance of the receive antenna 304. In FIGS. 14A-14C the resonant frequency of the receive antenna 304 may be tuned with capacitor C2. Thus, the AC impedance of the receive antenna 304 may be changed by selectively coupling the receive antenna 304 through capacitor C1 using switch S1B, essentially changing the resonance circuit to a different frequency that will be outside of a range that will optimally couple with the transmit antenna. If the resonance frequency of the receive antenna 304 is near the resonant frequency of the transmit antenna, and the receive antenna 304 is in the near-field of the transmit antenna, a coupling mode may develop wherein the receiver can draw significant power from the radiated field 106.

In FIG. 14A, switch S1B is closed, which de-tunes the antenna and creates an "AC cloaking state," essentially "cloaking" the receive antenna 304 from detection by the transmit antenna 204 because the receive antenna does not resonate at the transmit antenna's frequency. Since the receive antenna will not be in a coupled mode, the state of switches S2B and S3B are not particularly important to the present discussion.

In FIG. 14B, switch S1B is open, switch S2B is closed, and switch S3B is open, creating a "tuned dummy-load state" for the receive antenna 304. Because switch S1B is open, capacitor C1 does not contribute to the resonance circuit and the receive antenna 304 in combination with capacitor C2 will be in a resonance frequency that may match with the resonant frequency of the transmit antenna. The combination of switch S3B open and switch S2B closed creates a relatively high current dummy load for the rectifier, which will draw more power through the receive antenna 304, which can be sensed by the transmit antenna. In addition, the transmit signal 320 can be detected since the receive antenna is in a state to receive power from the transmit antenna.

In FIG. 14C, switch S1B is open, switch S2B is open, and switch S3B is closed, creating a "tuned operating state" for the receive antenna 304. Because switch S1B is open, capacitor C1 does not contribute to the resonance circuit and the receive antenna 304 in combination with capacitor C2 will be in a resonance frequency that may match with the resonant frequency of the transmit antenna. The combination of switch S2B open and switch S3B closed creates a normal operating state wherein power can be supplied by the DC out signal 322 and a transmit signal 320 can be detected.

Reverse link signaling may be accomplished by switching between the tuned operating state (FIG. 14C) and the AC cloaking state (FIG. 14A). Reverse link signaling also may be accomplished by switching between the tuned dummy-load state (FIG. 14B) and the AC cloaking state (FIG. 14A). Reverse link signaling also may be accomplished by switching between the tuned operating state (FIG. 14C) and the tuned dummy-load state (FIG. 14B) because there will be a difference in the amount of power consumed by the receiver, which can be detected by the load sensing circuit in the transmitter.

Of course, those of ordinary skill in the art will recognize that other combinations of switches S1B, S2B, and S3B may be used to create cloaking, generate reverse link signaling and supplying power to the receive device. In addition, the switches S1A and S1B may be added to the circuits of FIGS. 14A-14C to create other possible combinations for cloaking, reverse link signaling, and supplying power to the receive device.

Thus, when in a coupled mode signals may be sent from the transmitter to the receiver, as discussed above with reference to FIG. 12. In addition, when in a coupled mode signals may be sent from the receiver to the transmitter, as discussed above with reference to FIGS. 13A-13C and 14A-14C.

Figure 15A:
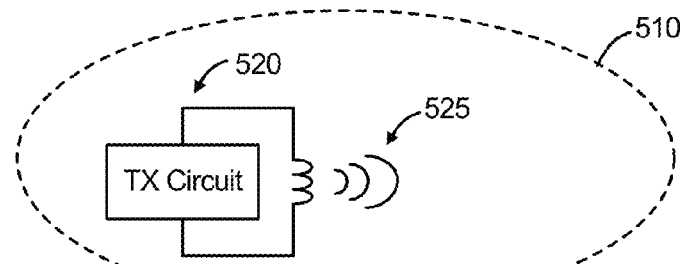
FIGS. 15A-15D are simplified block diagrams illustrating a beacon power mode for transmitting power between a transmitter and a receiver.

FIGS. 15A-15D are simplified block diagrams illustrating a beacon power mode for transmitting power between a transmitter and a one or more receivers. FIG. 15A illustrates a transmitter 520 having a low power "beacon" signal 525 when there are no receive devices in the beacon coupling-mode region 510. The beacon signal 525 may be, as a non-limiting example, such as in the range of ~10 to ~20 mW RF. This signal may be adequate to provide initial power to a device to be charged when it is placed in the coupling-mode region.

Figure 15B:
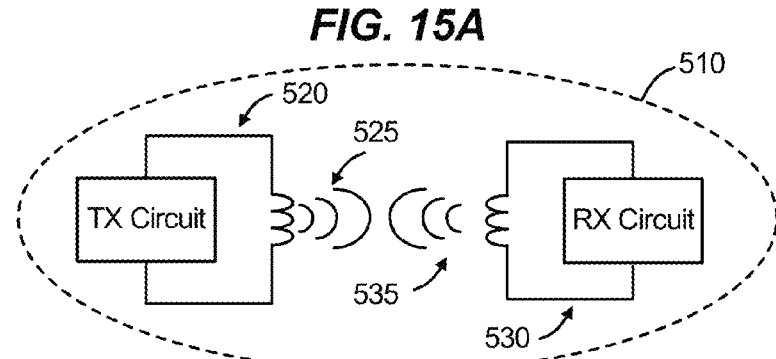

FIG. 15B illustrates a receive device 530 placed within the beacon coupling-mode region 510 of the transmitter 520 transmitting the beacon signal 525. If the receive device 530 is on and develops a coupling with the transmitter it will generate a reverse link coupling 535, which is really just the receiver accepting power from the beacon signal 525. This additional power, may be sensed by the load sensing circuit 216 (FIG. 12) of the transmitter. As a result, the transmitter may go into a high power mode.

Figure 15C:
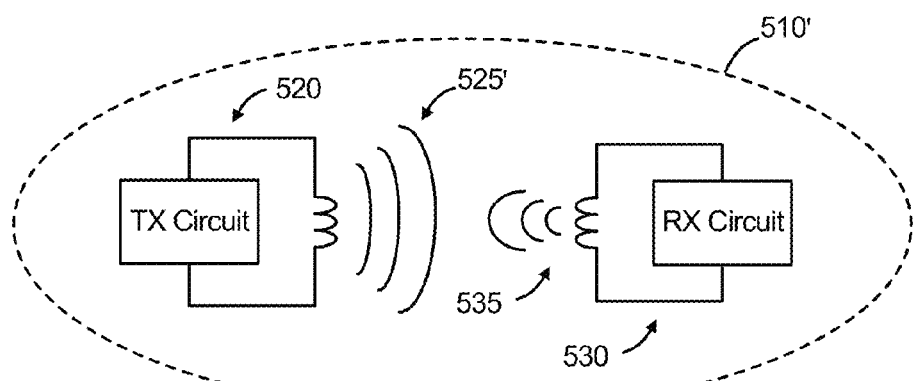

FIG. 15C illustrates the transmitter 520 generating a high power signal 525' resulting in a high power coupling-mode region 510'. As long as the receive device 530 is accepting power and, as a result, generating the reverse link coupling 535, the transmitter will remain in the high power state. While only one receive device 530 is illustrated, multiple receive devices 530 may be present in the coupling-mode region 510. If there are multiple receive device 530 they will share the amount of power transmitted by the transmitter based on how well each receive device 530 is coupled. For example, the coupling efficiency may be different for each receive device 530 depending on where the device is placed within the coupling-mode region 510 as was explained above with reference to FIGS. 8 and 9.

Figure 15D:
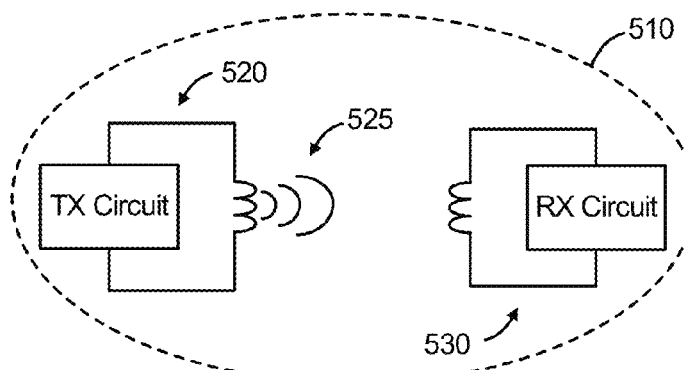

FIG. 15D illustrates the transmitter 520 generating the beacon signal 525 even when a receive device 530 is in the beacon coupling-mode region 510. This state may occur when the receive device 530 is shut off, or the device cloaks itself, perhaps because it does not need any more power.

The receiver and transmitter may communicate on a separate communication channel (e.g., Bluetooth, zigbee, etc). With a separate communication channel, the transmitter may determine when to switch between beacon mode and high power mode, or create multiple power levels, based on the number of receive devices in the coupling-mode region 510 and their respective power requirements.

Exemplary embodiments of the invention include enhancing the coupling between a relatively large transmit antenna and a small receive antenna in the near field power transfer between two antennas through introduction of additional antennas into the system of coupled antennas that will act as repeaters and will enhance the flow of power from the transmitting antenna toward the receiving antenna.

In exemplary embodiments, one or more extra antennas are used that couple to the transmit antenna and receive antenna in the system. These extra antennas comprise repeater antennas, such as active or passive antennas. A passive antenna may include simply the antenna loop and a capacitive element for tuning a resonant frequency of the antenna. An active element may include, in addition to the antenna loop and one or more tuning capacitors, an amplifier for increasing the strength of a repeated near field radiation.

The combination of the transmit antenna and the repeater antennas in the power transfer system may be optimized such that coupling of power to very small receive antennas is enhanced based on factors such as termination loads, tuning components, resonant frequencies, and placement of the repeater antennas relative to the transmit antenna.

A single transmit antenna exhibits a finite near field coupling mode region. Accordingly, a user of a device charging through a receiver in the transmit antenna's near field coupling mode region may require a considerable user access space that would be prohibitive or at least inconvenient. Furthermore, the coupling mode region may diminish quickly as a receive antenna moves away from the transmit antenna.

A repeater antenna may refocus and reshape a coupling mode region from a transmit antenna to create a second coupling mode region around the repeater antenna, which may be better suited for coupling energy to a receive antenna. Discussed below in FIGS. 16A-19B are some non-limiting examples of embodiments including repeater antennas.

Figure 16A:
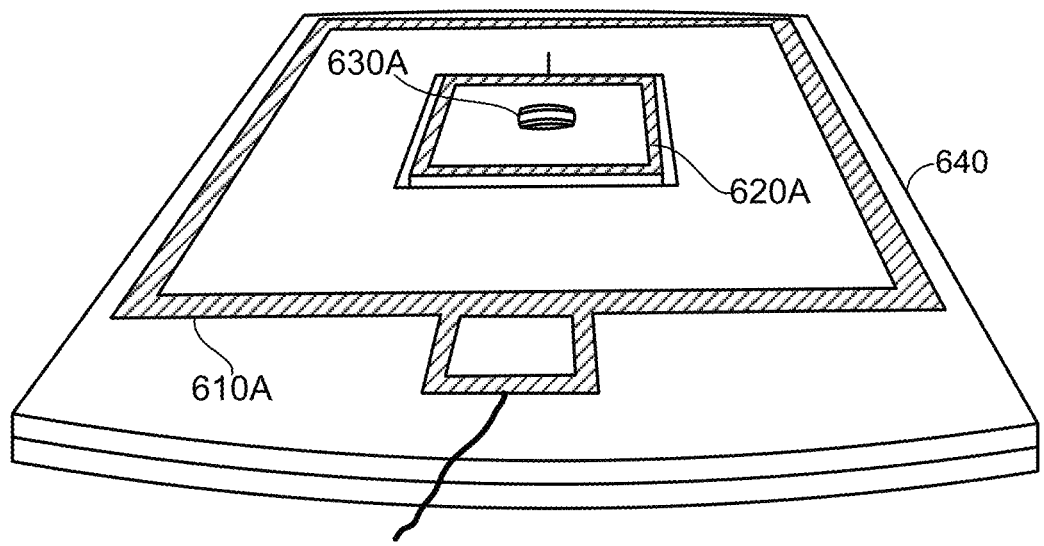
FIG. 16A illustrates a large transmit antenna with a smaller repeater antenna disposed coplanar with, and coaxial with, the transmit antenna.

FIG. 16A illustrates a large transmit antenna 610A with a smaller repeater antenna 620A disposed coplanar with, and within a perimeter of, the transmit antenna 610A. The transmit antenna 610A and repeater antenna 620A are both formed on a table 640, as a non-limiting example. A device including a receive antenna 630A is placed within the perimeter of the repeater antenna 620A. With very large antennas, there may be areas of the coupling mode region that are relatively weak near the center of the transmit antenna 610A. Presence of this weak region may be particularly noticeable when attempting to couple to a very small receive antenna 630A. The repeater antenna 620A placed coplanar with the transmit antenna 610A, but with a smaller size, may be able to refocus the coupling mode region generated by the transmit antenna 610A into a smaller and stronger repeated coupling mode region around the repeater antenna 620A. As a result, a relatively strong repeated near-field radiation is available for the receive antenna 630A.

Figure 16B:
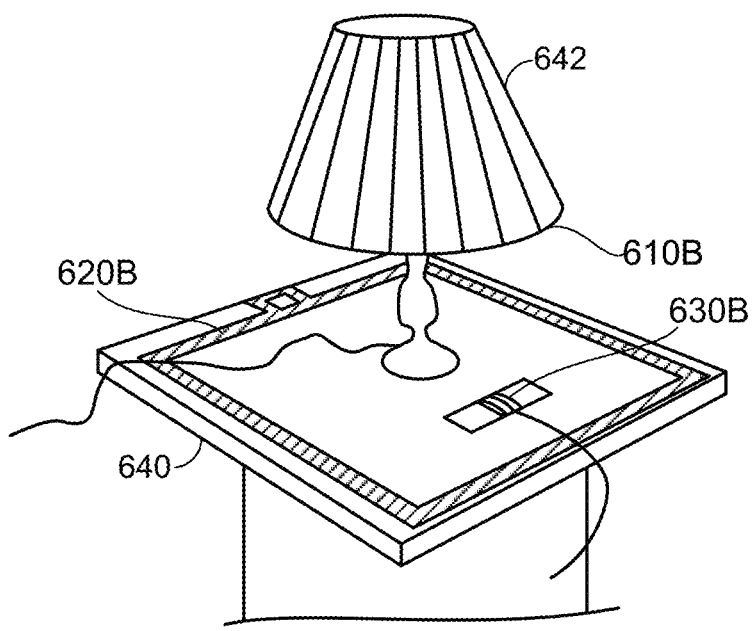
FIG. 16B illustrates a transmit antenna with a larger repeater antenna with a coaxial placement relative to the transmit antenna.

FIG. 16B illustrates a transmit antenna 610B with a larger repeater antenna 620B with a coaxial placement relative to the transmit antenna 610B. A device including a receive antenna 630B is placed within the perimeter of the repeater antenna 620B. The transmit antenna 610B is formed around the lower edge circumference of a lamp shade 642, while the repeater antenna 620B is disposed on a table 640. Recall that with coaxial placements, the near field radiation may diminish relatively quickly relative to distance away from the plane of an antenna. As a result, the small receive antenna 630B placed in a coaxial placement relative to the transmit antenna 610B may be in a weak coupling mode region. However, the large repeater antenna 620B placed coaxially with the transmit antenna 610B may be able to reshape the coupled mode region of the transmit antenna 610B to another coupled mode region in a different place around the repeater antenna 620B. As a result, a relatively strong repeated near field radiation is available for the receive antenna 630B placed coplanar with the repeater antenna 620B.

FIG. 17A illustrates a large transmit antenna 610C with three smaller repeater antennas 620C disposed coplanar with, and within a perimeter of, the transmit antenna 610C. The transmit antenna 610C and repeater antennas 620C are formed on a table 640. Various devices including receive antennas 630C are placed at various locations within the transmit antenna 610C and repeater antennas 620C. As with the exemplary embodiment illustrated in FIG. 16A, the exemplary embodiment of FIG. 17A may be able to refocus the coupling mode region generated by the transmit antenna 610C into smaller and stronger repeated coupling mode regions around each of the repeater antennas 620C. As a result, a relatively strong repeated near field radiation is available for the receive antennas 630C. Some of the receive antennas are placed outside of any repeater antennas 620C. Recall that the coupled mode region may extend somewhat outside the perimeter of an antenna. Therefore, receive antennas 630C may be able to receive power from the near field radiation of the transmit antenna 610C as well as any nearby repeater antennas 620C. As a result, receive antennas placed outside of any repeater antennas 620C, may be still be able to receive power from the near field radiation of the transmit antenna 610C as well as any nearby repeater antennas 620C.

FIG. 17B illustrates a large transmit antenna 610D with smaller repeater antennas 620D with offset coaxial placements and offset coplanar placements relative to the transmit antenna 610D. A device including a receive antenna 630D is placed within the perimeter of one of the repeater antennas 620D. As a non-limiting example, the transmit antenna 610D may be disposed on a ceiling 646, while the repeater antennas 620D may be disposed on a table 640. As with the exemplary embodiment of FIG. 16B, the repeater antennas 620D in an offset coaxial placement may be able to reshape and enhance the near field radiation from the transmitter antenna 610D to repeated near field radiation around the repeater antennas 620D. As a result, a relatively strong repeated near field radiation is available for the receive antenna 630D placed coplanar with the repeater antennas 620D.

While the various transmit antennas and repeater antennas have been shown in general on surfaces, these antennas may also be disposed under surfaces (e.g., under a table, under a floor, behind a wall, or behind a ceiling), or within surfaces (e.g., a table top, a wall, a floor, or a ceiling).

Figure 18:
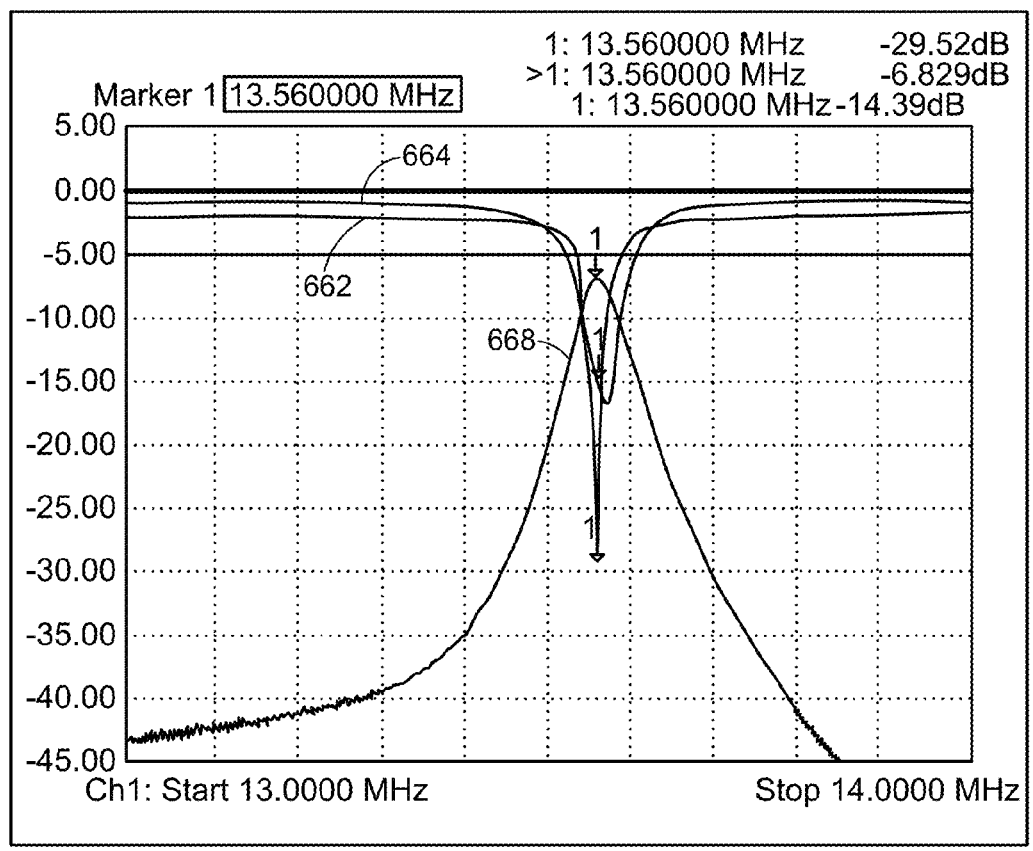
FIG. 18 shows simulation results indicating coupling strength between a transmit antenna, a repeater antenna and a receive antenna.

FIG. 18 shows simulation results indicating coupling strength between a transmit antenna, a repeater antenna and a receive antenna. The transmit antenna, the repeater antenna, and the receive antenna are tuned to have a resonant frequency of about 13.56 MHz.

Curve 662 illustrates a measure for the amount of power transmitted from the transmit antenna out of the total power fed to the transmit antenna at various frequencies. Similarly, curve 664 illustrates a measure for the amount of power received by the receive antenna through the repeater antenna out of the total power available in the vicinity of its terminals at various frequencies. Finally, Curve 668 illustrates the amount of power actually coupled between the transmit antenna, through the repeater antenna and into the receive antenna at various frequencies.

At the peak of curve 668, corresponding to about 13.56 MHz, it can be seen that a large amount of the power sent from the transmitter is available at the receiver, indicating a high degree of coupling between the combination of the transmit antenna, the repeater antenna and the receive antenna.

Figure 19A:
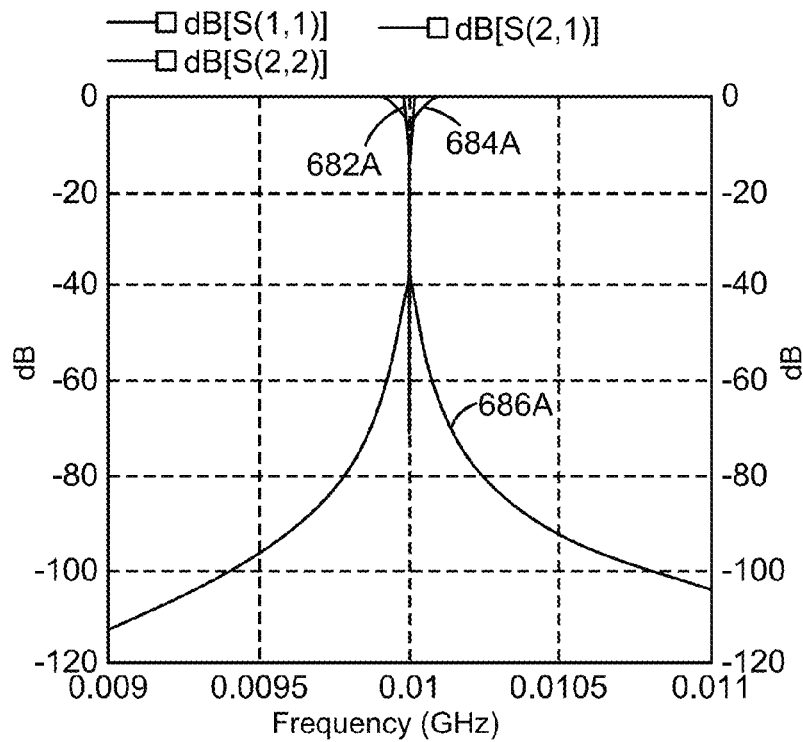
FIG. 19A shows simulation results indicating coupling strength between a transmit antenna and receive antenna with no repeater antennas.

FIG. 19A show simulation results indicating coupling strength between a transmit antenna and receive antenna disposed in a coaxial placement relative to the transmit antenna with no repeater antennas. The transmit antenna and the receive antenna are tuned to have a resonant frequency of about 10 MHz. The transmit antenna in this simulation is about 1.3 meters on a side and the receive antenna is a multi-loop antenna at about 30 mm on a side. The receive antenna is placed at about 2 meters away from the plane of the transmit antenna. Curve 682A illustrates a measure for the amount of power transmitted from the transmit antenna out of the total power fed to its terminals at various frequencies. Similarly, curve 684A illustrates a measure of the amount of power received by the receive antenna out of the total power available in the vicinity of its terminals at various frequencies. Finally, Curve 686A illustrates the amount of power actually coupled between the transmit antenna and the receive antenna at various frequencies.

Figure 19B:
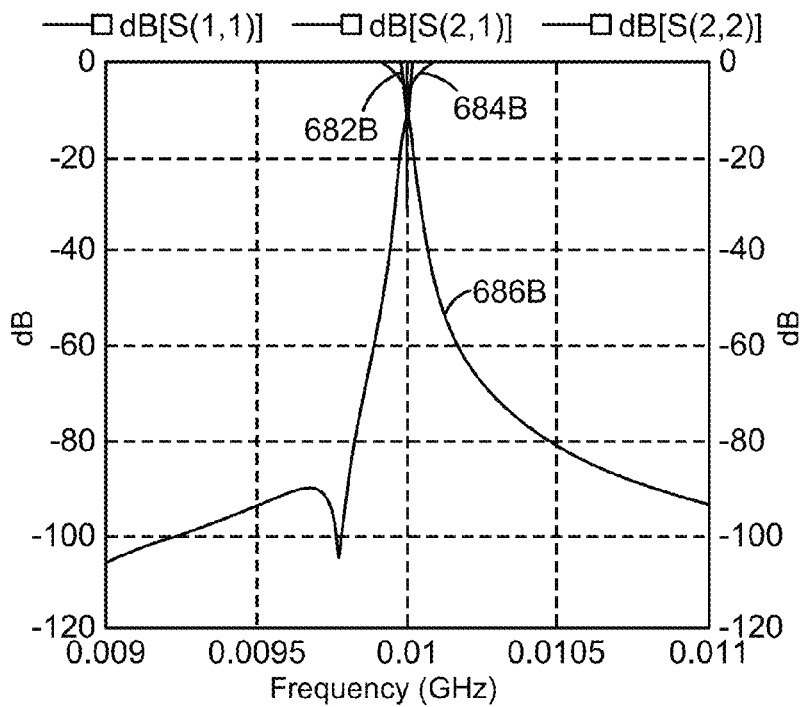
FIG. 19B shows simulation results indicating coupling strength between a transmit antenna and receive antenna with a repeater antenna.

FIG. 19B show simulation results indicating coupling strength between the transmit and receive antennas of FIG. 19A when a repeater antenna is included in the system. The transmit antenna and receive antenna are the same size and placement as in FIG. 19A. The repeater antenna is about 28 cm on a side and placed coplanar with the receive antenna (i.e., about 0.1 meters away from the plane of the transmit antenna). In FIG. 19B, Curve 682B illustrates a measure of the amount of power transmitted from the transmit antenna out of the total power fed to its terminals at various frequencies. Curve 684B illustrates the amount of power received by the receive antenna through the repeater antenna out of the total power available in the vicinity of its terminals at various frequencies. Finally, Curve 686B illustrates the amount of power actually coupled between the transmit antenna, through the repeater antenna and into the receive antenna at various frequencies.

When comparing the coupled power (686A and 686B) from FIGS. 19A and 19B it can be seen that without a repeater antenna the coupled power 686A peaks at about −36 dB. Whereas, with a repeater antenna the coupled power 686B peaks at about −5 dB. Thus, near the resonant frequency, there is a significant increase in the amount of power available to the receive antenna due to the inclusion of a repeater antenna.

Exemplary embodiments of the invention include low cost unobtrusive ways to properly manage how the transmitter radiates to single and multiple devices and device types in order to optimize the efficiency by which the transmitter conveys charging power to the individual devices.

Figure 20:
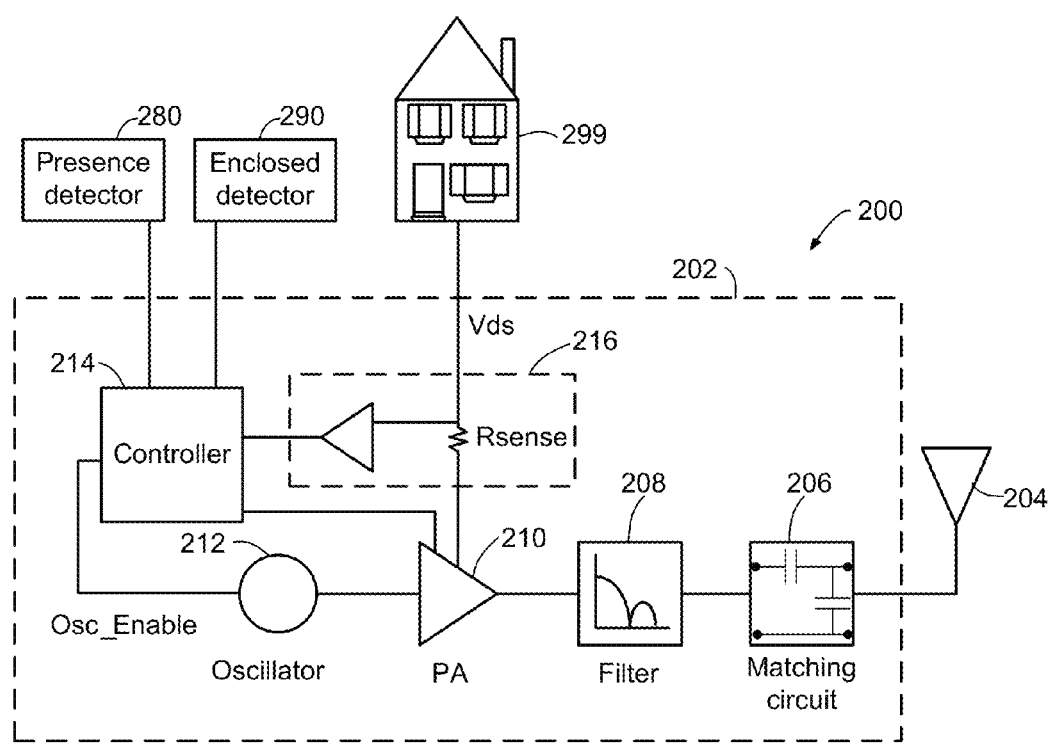
FIG. 20 is a simplified block diagram of a transmitter according to one or more exemplary embodiments of the present invention.

FIG. 20 is a simplified block diagram of a transmitter 200 for use in furniture and buildings. The transmitter is similar to that of FIG. 10 and, therefore, does not need to be explained again. However, in FIG. 20 the transmitter 200 may include a presence detector 280, and enclosed detector 290, or a combination thereof, connected to the controller 214 (also referred to as a processor herein). The controller 214 can adjust an amount of power delivered by the amplifier 210 in response to presence signals from the presence detector 280 and enclosed detector 290. The transmitter may receive power through an AC-DC converter (not shown) to convert conventional AC power present in a building 299.

As a non-limiting example, the presence detector 280 may be a motion detector utilized to sense the initial presence of a device to be charged that is inserted into the coverage area of the transmitter. After detection, the transmitter is turned on and the RF power received by the device is used to toggle a switch on the Rx device in a pre-determined manner, which in turn results in changes to the driving point impedance of the transmitter.

As another non-limiting example, the presence detector 280 may be a detector capable of detecting a human, for example, by infrared detection, motion detection, or other suitable means. In some exemplary embodiments, there may be regulations limiting the amount of power that a transmit antenna may transmit at a specific frequency. In some cases, these regulations are meant to protect humans from electromagnetic radiation. However, there may be environments where transmit antennas are placed in areas not occupied by humans, or occupied infrequently by humans, such as, for example, garages, factory floors, shops, and the like. If these environments are free from humans, it may be permissible to increase the power output of the transmit antennas above the normal power restrictions regulations. In other words, the controller 214 may adjust the power output of the transmit antenna 204 to a regulatory level or lower in response to human presence and adjust the power output of the transmit antenna 204 to a level above the regulatory level when a human is outside a regulatory distance from the electromagnetic field of the transmit antenna 204.

As a non-limiting example, the enclosed detector 290 (may also be referred to herein as a enclosed furnishing detector) may be a device such as a sense switch for determining when an enclosure is in a closed or open state, as is explained more fully below. In many of the examples below, only one guest device is shown being charged. In practice, a multiplicity of the devices can be charged from a hot spot generated by each host.

In exemplary embodiments, a method by which the Tx circuit does not remain on indefinitely may be used. In this case, the Tx circuit may be programmed to shut off after a user-determined amount of time. This feature prevents the Tx circuit, notably the power amplifier, from running long after the wireless devices in its perimeter are fully charged. This event may be due to the failure of the circuit to detect the signal sent from either the repeater or the Rx coil that a device is fully charged. To prevent the Tx circuit from automatically shutting down if another device is placed in its perimeter, the Tx circuit automatic shut off feature may be activated only after a set period of no motion detected in its perimeter. The user may be able to determine the inactivity time interval, and change it as desired. As a non-limiting example, the time interval may be longer than that needed to fully charge a specific type of wireless device under the assumption of the device being initially fully discharged.

Exemplary embodiments of the invention include using furnishing and elements in buildings such as walls, ceilings, and floors to bear power transmitting devices housing totally, or partially, the transmit antenna and other circuitry necessary for wireless transfer of power to other often smaller devices.

The power transmitting devices may be partially or fully embedded in the aforementioned furnishings and building elements, such as at the time of manufacture. Such furnishings and building elements are referred to herein as host furnishings.

The power transmitting devices may also be retrofitted into existing furnishings and building elements by attaching the transmit antenna thereto. Such furnishings and building elements are referred to herein as existing furniture items. In this context, attachment may mean affixing the antenna to a furnishing or building element, such as, for example, a wall or the underside of a shelf so the transmit antenna is held in place. Attachment may also mean simply placing the transmit antenna in a position where it will naturally be held in place, such as, for example, in the bottom of a drawer or on a shelf.

Electrically small antennas have low efficiency, often no more than a few percent as explained by the theory of small antennas. The smaller the electric size of an antenna, the lower is its efficiency. The wireless power transfer can become a viable technique replacing wired connection to the electric grid in industrial, commercial, and household applications if power can be sent over meaningful distances to the devices that are in the receiving end of such power transfer system. While this distance is application dependent, a few tens of a centimeter to a few meters can be deemed a suitable range for most applications. Generally, this range reduces the effective frequency for the electric power in the interval between 5 MHz to 100 MHz.

Exemplary embodiments of the invention include converting a variety of the furnishings and building elements around the house, in the office, and in other buildings to hosts that can transfer electric power wirelessly to guest devices either to charge their rechargeable batteries or to directly feed them.

Figure 21:
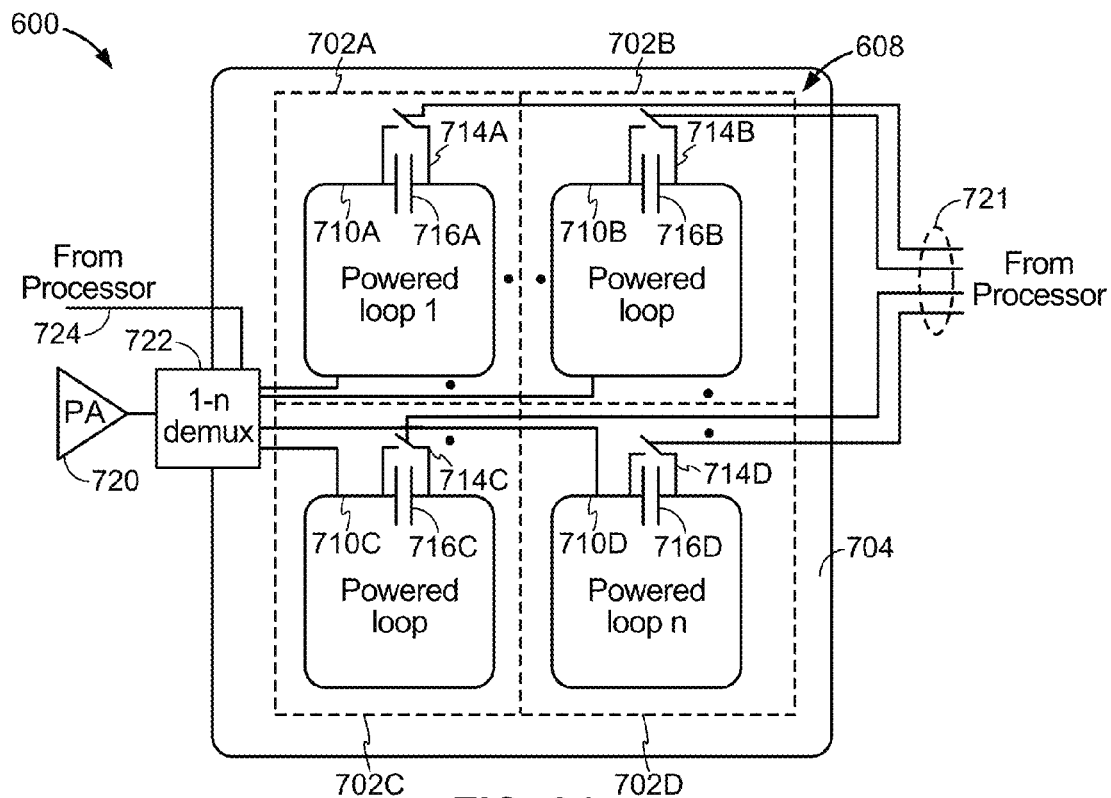
FIG. 21 is a simplified block diagram of a multiple transmit antenna wireless charging apparatus, in accordance with an exemplary embodiment of the present invention.
Figure 22:
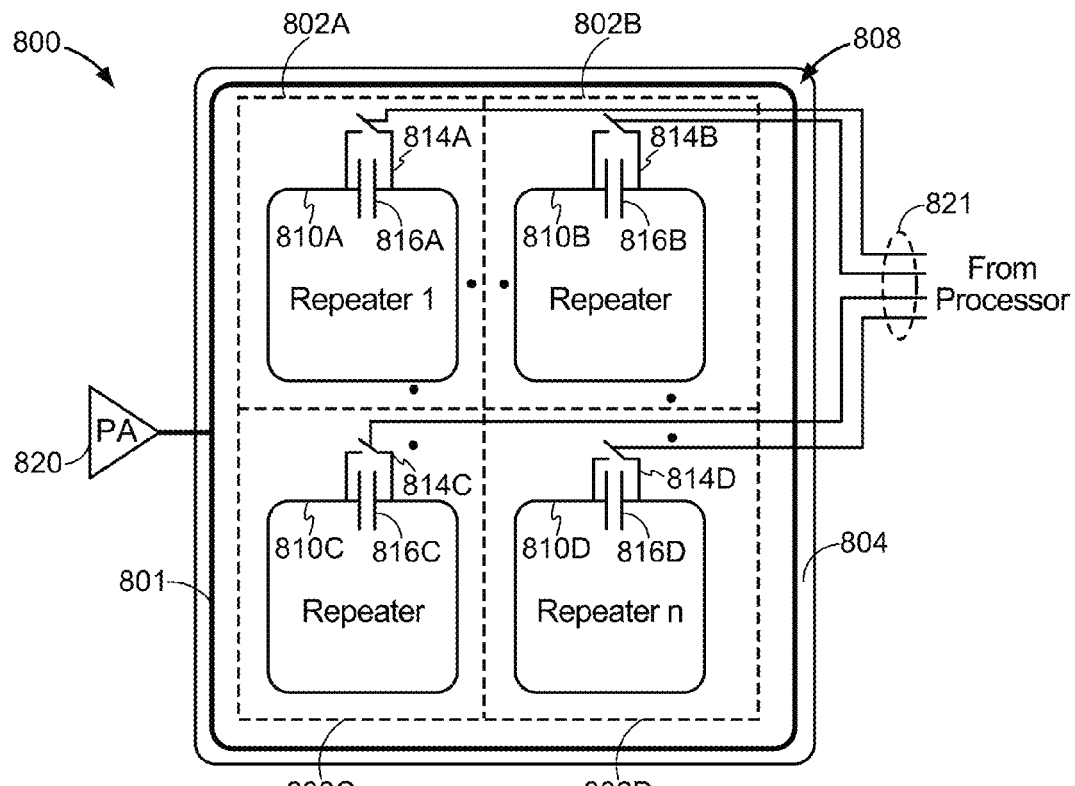
FIG. 22 is a simplified block diagram of a multiple transmit antenna wireless charging apparatus, in accordance with another exemplary embodiment of the present invention.

FIGS. 21 and 22 are plan views of block diagrams of a multiple transmit antenna wireless charging apparatus, in accordance with exemplary embodiments. As stated, locating a receiver in a near field coupling mode region of a transmitter for engaging the receiver in wireless charging may be unduly burdensome by requiring accurate positioning of the receiver in the transmit antenna's near field coupling mode region. Furthermore, locating a receiver in the near field coupling mode region of a fixed-location transmit antenna may also be inaccessible by a user of a device coupled to the receiver especially when multiple receivers are respectively coupled to multiple user accessible devices (e.g., laptops, PDAs, wireless devices) where users need concurrent physical access to the devices. For example, a single transmit antenna exhibits a finite near field coupling mode region.

Accordingly, a user of a device charging through a receiver in the transmit antenna's near field coupling mode region may require a considerable user access space that would be prohibitive or at least inconvenient for another user of another device to also wirelessly charge within the same transmit antenna's near field coupling mode region and also require separate user access space. For example, two adjacent users of wireless chargeable devices seated at a conference table configured with a single transmit antenna may be inconvenienced or prohibited from accessing their respective devices due to the local nature of the transmitters near field coupling mode region and the considerable user access space required to interact with the respective devices. Additionally, requiring a specific wireless charging device and its user to be specifically located may also inconvenience a user of the device.

Referring to FIG. 21, an exemplary embodiment of a multiple transmit antenna wireless charging apparatus 700 provides for placement of a plurality of adjacently located transmit antenna circuits 702A-702D to define an enlarged wireless charging region 608. By way of example and not limitation, a transmit antenna circuit includes a transmit antenna 710 having a diameter or side dimension, for example, of around 30-40 centimeters for providing uniform coupling to an receive antenna (not shown) that is associated with or fits in an electronic device (e.g., wireless device, handset, PDA, laptop, etc.). By considering the transmit antenna circuit 702 as a unit or cell of the multiple transmit antenna wireless charging apparatus 700, stacking or adjacently tiling these transmit antenna circuits 702A-702D next to each other, for example, on substantially a single planar surface 704 (e.g., on a table top) allows for reorienting or increasing the charging region. The enlarged wireless charging region 608 results in an increased charging region for one or more devices.

The multiple transmit antenna wireless charging apparatus 700 further includes a transmit power amplifier 720 for providing the driving signal to transmit antennas 710. In configurations where the near field coupling mode region of one transmit antenna 710 interferes with the near field coupling mode regions of other transmit antennas 710, the interfering adjacent transmit antennas 710 are "cloaked" to allow improved wireless charging efficiency of the activated transmit antenna 710.

The sequencing of activation of transmit antennas 710 in multiple transmit antenna wireless charging apparatus 700 may occur according to a time-domain based sequence. The output of transmit power amplifier 720 is coupled to a multiplexer 722 which time-multiplexes, according to control signal 724 from the transmitter processor, the output signal from the transmit power amplifier 720 to each of the transmit antennas 710.

In order to inhibit inducing resonance in adjacent inactive transmit antenna 710 when the power amplifier 720 is driving the active transmit antenna, the inactive antennas may be "cloaked" by altering the resonant frequency of that transmit antenna by, for example, activating the cloaking circuit 714. By way of implementation, concurrent operation of directly or nearly adjacent transmit antenna circuits 702 may result in interfering effects between concurrently activated and physically nearby or adjacent other transmit antenna circuits 702. Accordingly, transmit antenna circuit 702 may further include a transmitter cloaking circuit 714 for altering the resonant frequency of transmit antennas 710.

The transmitter cloaking circuit may be configured as a switching means (e.g. a switch) for shorting-out or altering the value of reactive elements, for example capacitor 716, of the transmit antenna 710. The switching means may be controlled by control signals 721 from the transmitter's processor. In operation, one of the transmit antennas 710 is activated and allowed to resonate while other of transmit antennas 710 are inhibited from resonating, and therefore inhibited from adjacently interfering with the activated transmit antenna 710. Accordingly, by shorting-out or altering the capacitance of a transmit antenna 710, the resonant frequency of transmit antenna 710 is altered to prevent resonant coupling from other transmit antennas 710. Other techniques for altering the resonant frequency are also contemplated.

In another exemplary embodiment, each of the transmit antenna circuits 702 can determine the presence or absence of receivers within their respective near field coupling mode regions with the transmitter processor choosing to activate ones of the transmit antenna circuits 702 when receivers are present and ready for wireless charging or forego activating ones of the transmit antenna circuits 702 when receivers are not present or not ready for wireless charging in the respective near field coupling mode regions. The detection of present or ready receivers may occur according to the receiver detection signaling protocol described herein or may occur according to physical sensing of receivers such as motion sensing, pressure sensing, image sensing or other sensing techniques for determining the presence of a receiver within a transmit antenna's near field coupling mode region. Furthermore, preferential activation of one or more transmit antenna circuits by providing an enhanced proportional duty cycle to at least one of the plurality of antenna circuits is also contemplated to be within the scope of the present invention.

Referring to FIG. 22, an exemplary embodiment of a multiple transmit antenna wireless charging apparatus 800 provides for placement of a plurality of adjacently located repeater antenna circuits 802A-802D inside of a transmit antenna 801 defining an enlarged wireless charging region 808. Transmit antenna 801, when driven by transmit power amplifier 820, induces resonant coupling to each of the repeater antennas 810A-810D. By way of example and not limitation, a repeater antenna 810 having a diameter or side dimension, for example, of around 30-40 centimeters provides uniform coupling to a receive antenna (not shown) that is associated with or affixed to an electronic device. By considering the repeater antenna circuit 802 as a unit or cell of the multiple transmit antenna wireless charging apparatus 800, stacking or adjacently tiling these repeater antenna circuits 802A-802D next to each other on substantially a single planar surface 804 (e.g., on a table top) allows for increasing or enlarging the charging region. The enlarged wireless charging region 808 results in an increased charging space for one or more devices.

The multiple transmit antenna wireless charging apparatus 800 includes transmit power amplifier 820 for providing the driving signal to transmit antenna 801. In configurations where the near field coupling mode region of one repeater antenna 810 interferes with the near field coupling mode regions of other repeater antennas 810, the interfering adjacent repeater antennas 810 are "cloaked" to allow improved wireless charging efficiency of the activated repeater antenna 810.

The sequencing of activation of repeater antennas 810 in multiple transmit antenna wireless charging apparatus 800 may occur according to a time-domain based sequence. The output of transmit power amplifier 820 is generally constantly coupled (except during receiver signaling as described herein) to transmit antenna 801. In the present exemplary embodiment, the repeater antennas 810 are time-multiplexed according to control signals 821 from the transmitter processor. By way of implementation, concurrent operation of directly or nearly adjacent repeater antenna circuits 802 may result in interfering effects between concurrently activated and physically nearby or adjacent other repeater antennas circuits 802. Accordingly, repeater antenna circuit 802 my further include a repeater cloaking circuit 814 for altering the resonant frequency of repeater antennas 810.

The repeater cloaking circuit may be configured as a switching means (e.g. a switch) for shorting-out or altering the value of reactive elements, for example capacitor 816, of the repeater antenna 810. The switching means may be controlled by control signals 821 from the transmitter's processor. In operation, one of the repeater antennas 810 is activated and allowed to resonate while other of repeater antennas 810 are inhibited from resonating, and therefore adjacently interfering with the activated repeater antenna 810. Accordingly, by shorting-out or altering the capacitance of a repeater antenna 810, the resonant frequency of repeater antenna 810 is altered to prevent resonant coupling from other repeater antennas 810. Other techniques for altering the resonant frequency are also contemplated.

In another exemplary embodiment, each of the repeater antenna circuits 802 can determine the presence or absence of receivers within their respective near field coupling mode regions with the transmitter processor choosing to activate ones of the repeater antenna circuits 802 when receivers are present and ready for wireless charging or forego activating ones of the repeater antenna circuits 802 when receivers are not present or not ready for wireless charging in the respective near field coupling mode regions. The detection of present or ready receivers may occur according to the receiver detection signaling protocol described herein or may occur according to physical sensing of receivers such as motion sensing, pressure sensing, image sensing or other sensing techniques for determining a receiver to be within a repeater antenna's near field coupling mode region.

The various exemplary embodiments of the multiple transmit antenna wireless charging apparatus 700 and 800 may further include time domain multiplexing of the input signal being coupled to transmit/repeater antennas 710, 810 based upon asymmetrically allocating activation time slots to the transmit/repeater antennas based upon factors such as priority charging of certain receivers, varying quantities of receivers in different antennas' near field coupling mode regions, power requirements of specific devices coupled to the receivers as well as other factors.

As stated, efficient transfer of energy between the transmitter and receiver occurs during matched or nearly matched resonance between the transmitter and the receiver. However, even when resonance between the transmitter and receiver are not matched, energy may be transferred at a lower efficiency. Transfer of energy occurs by coupling energy from the near-field of the transmitting antenna to the receiving antenna residing in the neighborhood where this near-field is established rather than propagating the energy from the transmitting antenna into free space.

It should be noted that the foregoing approach is applicable to variety of communication standards such as CDMA, WCDMA, OFDM etc Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

FIGS. 21 and 22 illustrate multiple loops in a charging region that is substantially planar. However, embodiments of the present invention are not so limited. In the exemplary embodiments described herein, multi-dimensional regions with multiple antennas may be performed by the techniques described herein. In addition, multi-dimensional wireless powering and charging may be employed, such as the means described in U.S. patent application Ser. No. 12/567,339, entitled "SYSTEMS AND METHOD RELATING TO MULTI-DIMENSIONAL WIRELESS CHARGING" filed on Sep. 25, 2009, the contents of which are hereby incorporated by reference in its entirety for all purposes.

When placing one or more devices in a wireless charging apparatus (e.g. near-field magnetic resonance, inductive coupling, etc.) the orientation between the receiver and the wireless charging apparatus transmit antenna(s) may vary. For example, when charging a medical device while disinfecting it in a solution bath or when charging tools while working under water. When a device is dropped into a container with fluid inside, the angle in which the device lands on the bottom of the container would depend on the way its mass is distributed. As another non-limiting example, when the wireless charging apparatus takes the form of a box or a bowl, careless placement of the device, while convenient, may not guarantee the useful positioning of the device with respect to the wireless charging apparatus. The wireless charging apparatus may also be integrated into a large container or cabinet that can hold many devices, such as a tool storage chest, a toy chest, or an enclosure designed specifically for wireless charging. The receiver integration into these devices may be inconsistent because the devices have different form factors and may be placed in different orientations relative to the wireless power transmitter.

Existing designs of wireless charging apparatus may perform best under a predefined orientation and deliver lower power levels if the orientation between the wireless charging apparatus and the receiver is different. In addition, when the charged device is placed in a position where only a portion of the wireless power can be delivered, charging times may increase. Some solutions may design the wireless charging apparatus in a way that requires a user to place the device in a special cradle or holder that positions the device to be charged in an advantageous orientation, resulting in a loss of convenience to the user.

Other approaches are based on inductive coupling between a transmit antenna embedded, for example, in a "charging" mat or surface and a receive antenna plus rectifying circuit embedded in the host device to be charged. In this approach the spacing between transmit and receive antennas generally must be very close (e.g., several millimeters).

In addition, it is desirable to have wireless power available in places most used by the users for placement of their device to be charged, to enable users to charge their device more conveniently. Many users prefer storing objects in containers or inside furniture as part of maintaining their home or workplace organized. Sometimes they put the devices in the storage space while they are inside a bag, a pocket or a package (e.g. in a retail store). However, given the need to maintain the devices charged the user has to deal with taking them out and charging them. The user may also forget to charge these devices and be subject to delay when the devices are actually needed.

Figure 23A:
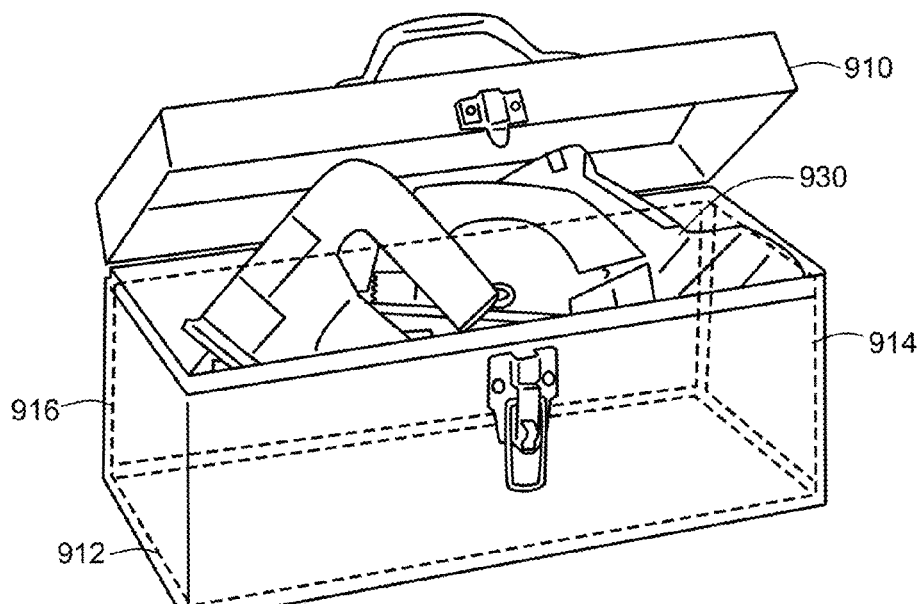
FIGS. 23A-23C illustrate an exemplary embodiment of an item bearing transmit antennas oriented in multiple directions.
Figure 23B:
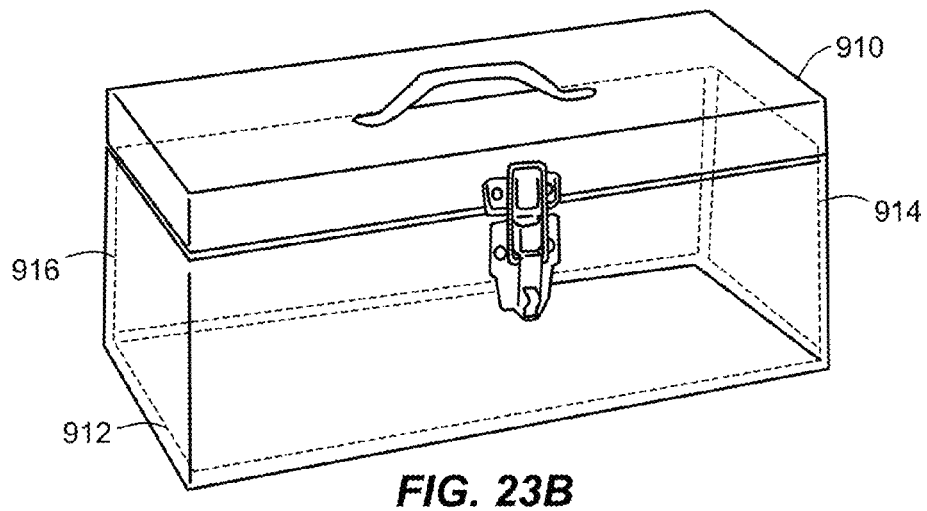
Figure 23C:
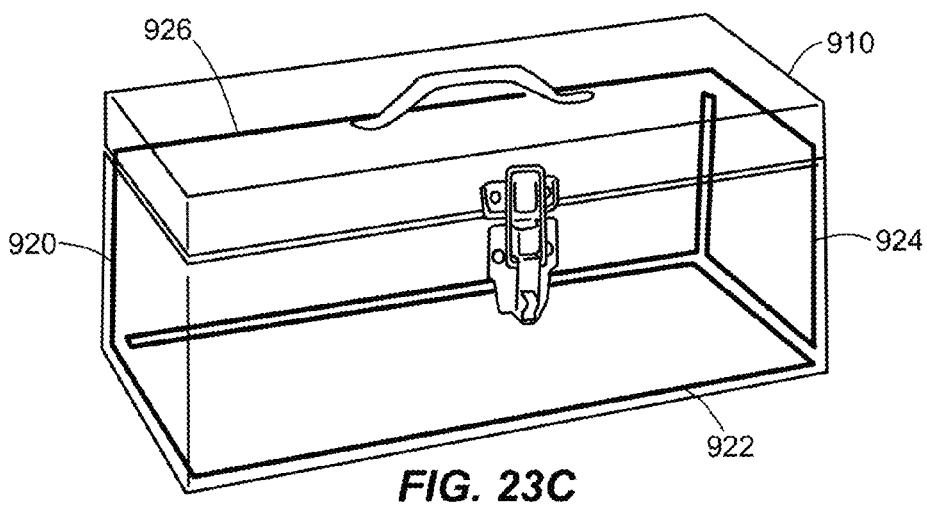

FIGS. 23A-23C illustrate an exemplary embodiment of an item bearing transmit antennas oriented in multiple directions. This multi-dimension orientation may increase the power that can be delivered to the receiver positioned in various orientations in respect to the multiple dimensions of the transmit antenna(s).

In FIGS. 23A-23C, a three-dimensional wireless charging apparatus is shown in which the transmit antenna(s) are embedded in approximately orthogonal surfaces along the X, Y, and Z axes. The surfaces can be for example, three sides of a rectangular enclosure. Flexibility is provided so that any one of the three Tx antennas, any pair of them, or all three at once can be used to wirelessly provide RF power to the Rx antenna in a device placed within the enclosure. A means such as that discussed above with respect to FIGS. 21 and 22 may be used for selecting and multiplexing between the differently oriented antennas.

In FIGS. 23A-23C, an exemplary tool 930 is disposed in a tool box 910. A first-orientation transmit antenna 912 is disposed on a bottom of the tool box 910. A second-orientation transmit antenna 914 is disposed on a first side of the tool box 910 and a third-orientation transmit antenna 916 is disposed on a second side of the tool box 910 and substantially orthogonal to the second-orientation transmit antenna 914. FIG. 23A illustrates the tool box 910 with the lid open to show the tool 930 disposed therein. FIG. 23B illustrates the tool box 910 with the lid closed.

FIG. 23C illustrates an alternate configuration of a continuous loop transmit antenna 920 that includes multiple facets in substantially orthogonal directions. If the exemplary embodiment of FIG. 23C, the continuous loop transmit antenna 920 includes a first facet 922 along the bottom of the tool box 910, a second facet 924 along a side of the tool box 910, and a third facet 926 along the back of the tool box 910.

In a small wireless charging apparatus, there maybe only one transmitter in each dimension. In a large wireless charging apparatus, where the parallel panels are sufficiently far from each other to prevent interference, a transmitter may be set on the opposite panels so that devices placed in the middle between them can get power from both directions.

Figure 24A:
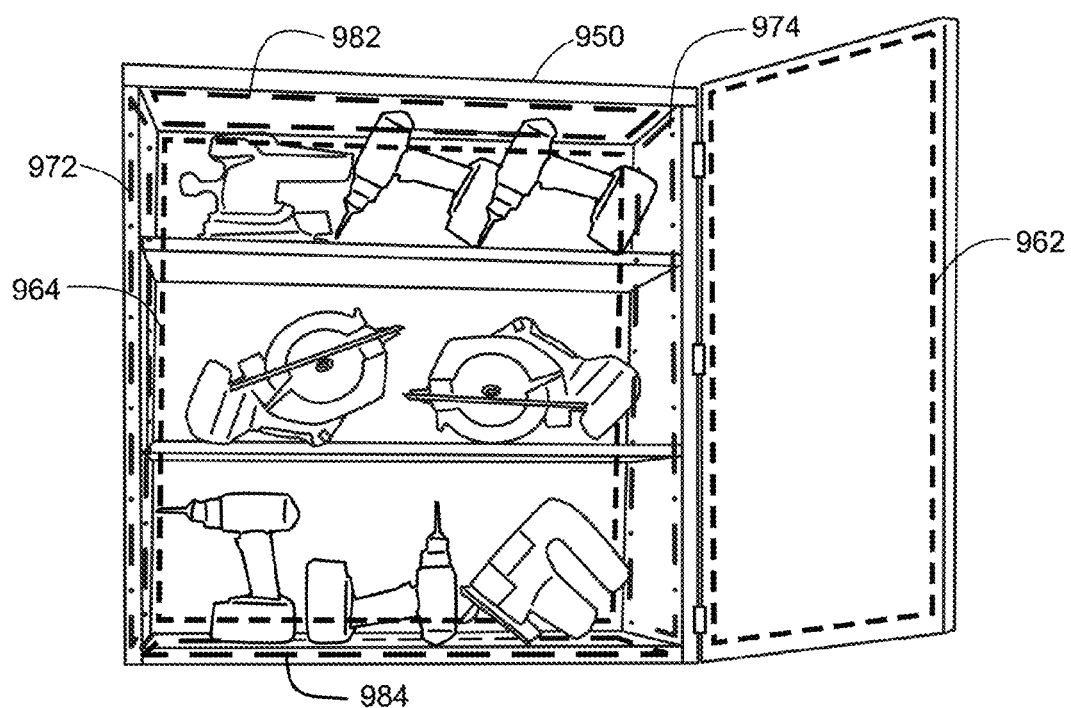
FIGS. 24A and 24B illustrate an exemplary embodiment of a cabinet bearing transmit antennas oriented in multiple directions.
Figure 24B:
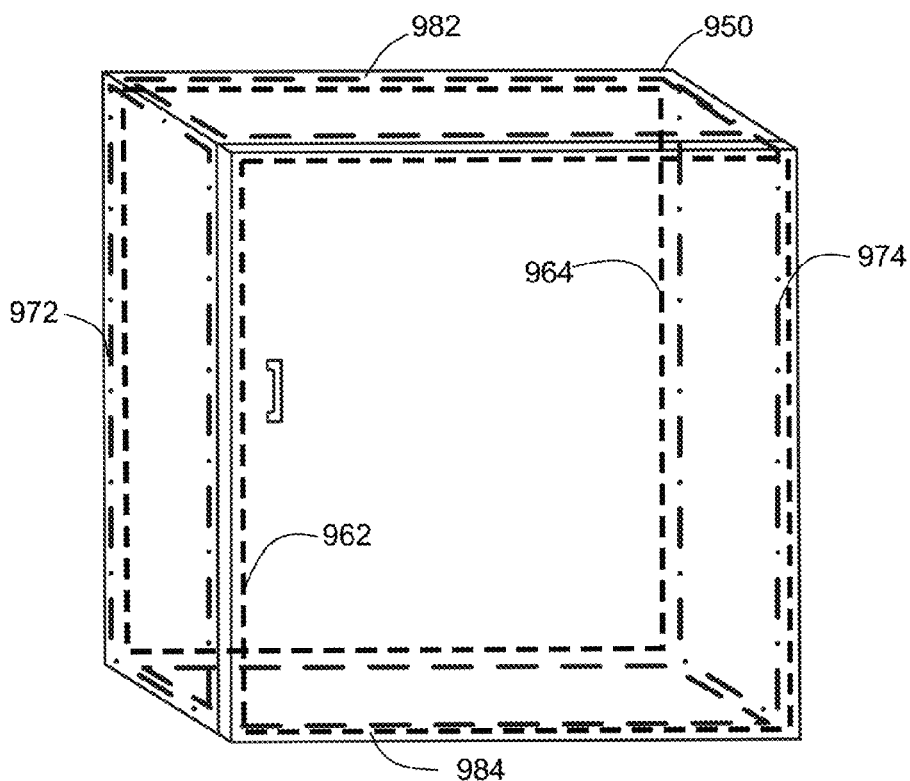

FIGS. 24A and 24B illustrate an exemplary embodiment of a cabinet 950 bearing transmit antennas oriented in multiple directions with transmit antennas in opposite panels. FIG. 24A shows the cabinet 950 with an open door and FIG. 24B shows the cabinet 950 with the door closed.

Transmit antennas 972 and 974 are on opposing sides (i.e., the left and the right respectively) of the cabinet 950. Transmit antennas 962 and 964 are on opposing sides (i.e., the door and the back respectively) of the cabinet 950. Transmit antennas 982 and 984 are on opposing sides (i.e., the top and the bottom respectively) of the cabinet 950.

Referring to FIGS. 23A-24B, a self-calibrating method that defines the optimal selection of Tx antennas leading to the highest power received by the device may be provided. If multiple devices are to be charged in the same enclosure, a means to assign a different selection of Tx antennas to each device is possible by assigning different time slots to each device.

In an exemplary embodiment, the frequency of operations is chosen to be low enough such the reasonably-sized Tx antennas are within the near field regions of each other. This allows for much higher coupling levels (−1.5 to −3 dB) than would be possible if the antennas were spaced farther apart. The orthogonality of the surfaces the embedded Tx antennas results in the electromagnetic fields radiated by them to be approximately orthogonally polarized which in turn improves the isolation between them so that the power lost due to unwanted coupling is reduced. Allowing the power transmitted from each Tx antenna to be intelligently selectable allows for the reduction efficiency losses due to polarization mismatch between the ensemble of Tx and the arbitrarily placed Rx antenna.

In an exemplary embodiment, each Rx device and Tx antenna may utilize techniques for signaling between them described in above with respect to FIGS. 13A-15D. In addition, more sophisticated signaling means may be employed, such as the means described in U.S. patent application Ser. No. 12/249,866, entitled "SIGNALING CHARGING IN WIRELESS POWER ENVIRONMENT" filed on Oct. 10, 2008, the contents of which is hereby incorporated herein in its entirety by reference.

These signaling methods can be used during a "calibration period," in which power is transmitted for all each possible combination of Tx antennas in sequence and the Rx signals back which results the highest power received. The Tx system can then begin the charging period using this optimum combination of Tx antennas. For charging multiple, arbitrarily-oriented devices in the same enclosure, the signaling scheme allows the Tx system to assign a device a time slot of duration of 1/N times T where N is the number of units being charged and T is the charging period. During its time slot, the Rx device can determine the optimum combination of Tx antennas for best power transfer, independent of the combination desired for the other Rx devices. This is not to say that time slotting is required for optimum power transfer to multiple devices. It is possible for instance, that the relative orientations of two Rx devices are such that the polarizations of their antennas are orthogonal to each other (e.g., X-Y plane for device A, Y-Z plane for device B). In this case, the optimum Tx antenna configuration would be to use the Tx antenna oriented in the X-Y plane for device A and the Tx antenna in the Y-Z plane for device B. Due to the inherent isolation between the two Tx antennas, it may be possible to charge them simultaneously. The intelligent nature of the Tx antenna selection by each Rx device allows for such a circumstance.

Exemplary embodiments of the invention include converting a variety of the equipment around the house, office, and other buildings to hosts with transmitters, repeaters, or a combination thereof that can transfer electric power wirelessly to guest devices with receivers either to charge their rechargeable batteries or to directly feed them. This equipment may be generally referred to herein as host furnishings and existing furniture items. Thus, these host furnishings can provide several hot spots in the environment where the hosts are located for wireless transfer of power to guest devices without having to establish independent infrastructure for wireless transmission of electric power. These exemplary embodiments may not require a large transmit antenna, which is often more difficult to blend into the décor of the environment and may not be as esthetically acceptable. In addition, larger antennas may generate larger electromagnetic (EM) fields and it may be harder to comply with safety issues.

Exemplary embodiments disclosed may use transmit antennas in host furnishings as well as extra antennas such as repeaters in the same or other host furnishings. These repeaters could be fed with electric power or they could be passively terminated. The combination of the repeaters and the coupled antennas in the power transfer system can be optimized such that coupling of power to very small Rx antennas is enhanced. The termination load and tuning component in the repeaters could also be used to optimize the power transfers in a system.

Exemplary embodiments of the disclosure include means for charging low power receiver devices such as: eBooks, wireless digital photo frames, smoke alarms and remote controls. This device may charge at a very low power level when left in a users home, office or any location that power transmitting devices may be found. These receiver devices can be charged for a long period of time with a low level of wireless power and always have sufficient power to operate. Thus, a wireless digital photo frame may be enabled that hung on a wall without any wired power provided. In the exemplary embodiment of a smoke alarms, these devices could be charged in the same way as above with no need for hard wired electrical power. In the exemplary embodiment of remote controls: As above these devices could be charged anywhere where the wireless power could penetrate at a low rate. Other low power devices found in the home, office, work environment, public areas, etc could use the same methodology.

FIGS. 25-32 illustrate exemplary furnishings, storage spaces, and building elements in which exemplary embodiments of the invention can be practiced. For exemplary purposes, furniture such as tables, shelves, drawers, etc is used herein, as well as containers such as closets, cupboards, cubby holes, drawers, locker, etc but it is understood that the exemplary embodiments of the invention are not limited to such.

The wireless charging can be implemented, for example, using inductive coupling, near field magnetic resonance power energy transfer, etc. The transmitter can be integrated (built in), laid over or attached to one or more internal surfaces (shelf, side panel, back panel, upper panel, etc). The receiver is connected to the electronic device as an accessory or is integrated into it.

In the inductive coupling implementation, there may be a designated spot, active area, slot, shelf, groove or holder where a primary coil is integrated or set using an overlaying pad attached to the internal panel of the storage area. The charged device is placed in this designated location to align the receiving coil with the transmitting coil.

In the near field magnetic resonance implementation, the transmitting loop can be added to one or multiple internal surfaces of the storage area. When adding to one surface the charged device can be placed in parallel to that surface and may be charged within a short distance from it (depending on the power level that is transmitted). For example a charging pad can be laid on the bottom of the top drawer or top shelf and charge devices placed in the top drawer or on top shelf and in the drawer or shelf below it, depending on how far below they are and the level of power transmitted. The charged device with the receiver can be placed anywhere within the transmitting loop boundaries. The transmitting loop layout in the storage area may be such that it would prevent users from placing the charged device on its boundaries. Adding to multiple surfaces provides further flexibility in the orientation of the charged device as explained above with reference to FIGS. 23A-24B. These multi-orientation transmit antennas may be especially helpful if the receiver device is placed inside a storage area that contains other items on top of each other (e.g. a drawer) or inside a bag (e.g. in a cubby hole or a locker).

Figure 25:
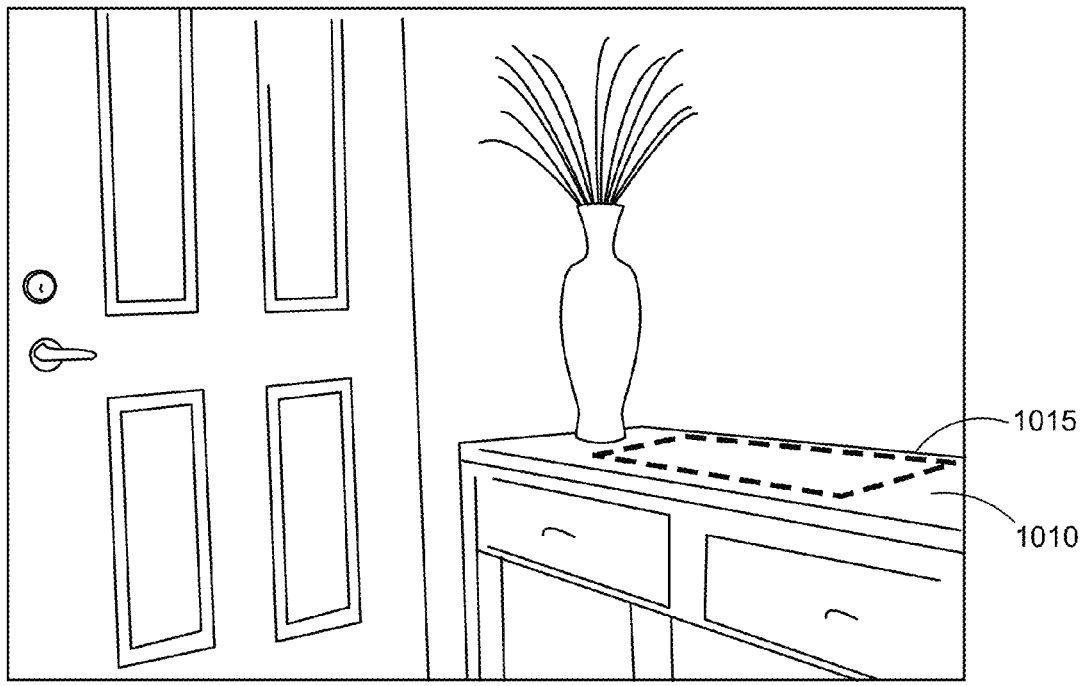
FIG. 25 illustrates an exemplary embodiment of a transmitter disposed in or on a table.
Figure 26:
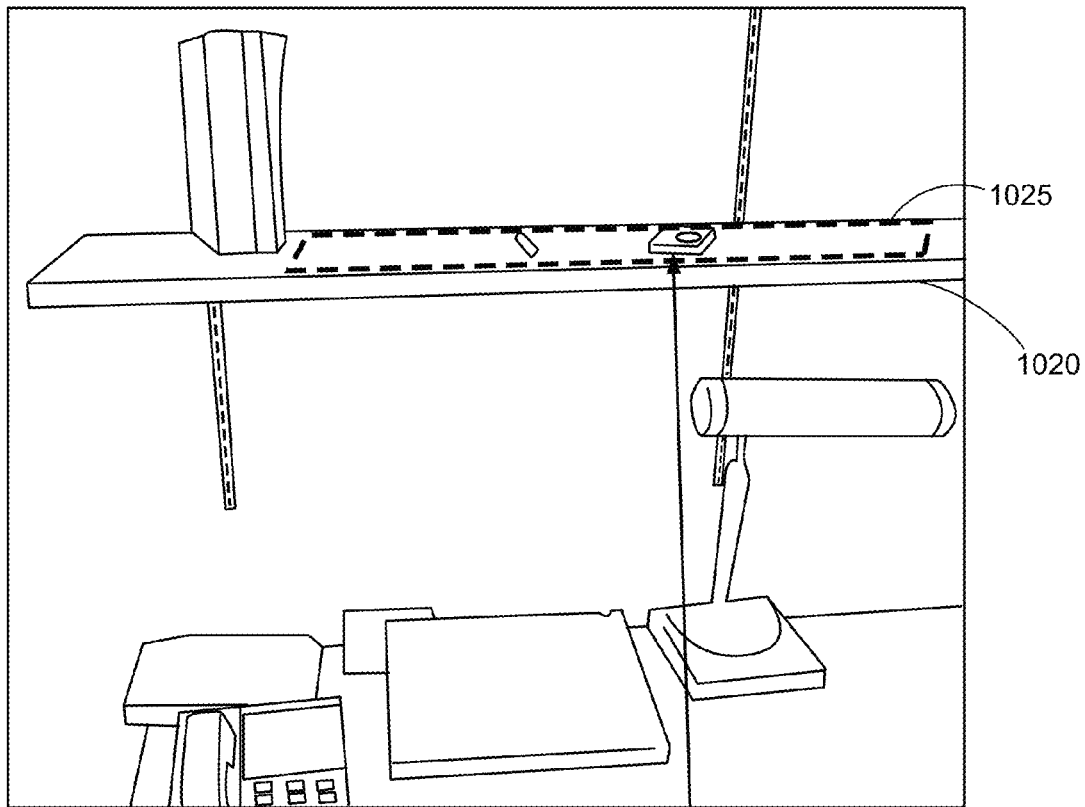
FIG. 26 illustrates an exemplary embodiment of a transmitter in or on a shelf.

FIGS. 25 and 26 illustrate a wirelessly charging surface, such as on a table using an omni-directional transmit antenna where a wireless charging apparatus with one coil charges devices both above and below the coil. For example, such a wireless charging apparatus could charge devices both on or near the surface of a nightstand and within the top drawer of the nightstand simultaneously. Omni-directional charging would allow more devices to charge simultaneously than a uni-directional wireless charging apparatus. This omni-directional charging solution broadens the likelihood of a match between user behavior and the operation of a wireless charging apparatus. Any of these exemplary embodiments and other embodiments within the scope of the present invention may use the presence detector 280 discussed above with reference to FIG. 20.

In addition, any of these exemplary embodiments and other embodiments within the scope of the present invention that have an enclosed region may use the enclosed detector 290 discussed above with reference to FIG. 20 for determining whether the furnishing is in an enclosed state or an open state. When in an enclosed state, enhanced power levels may be possible. The enclosed detector 290 may be any sensor capable of detecting an enclosed state, such as, for example, a switch on a door or drawer.

The wireless charging apparatus may receive power from a standard home electrical outlet. The wireless charging apparatus transmit antenna would be placed underneath or within the topmost surface of a table or similar type of furniture. Such an omni-directional charging mechanism could reduce the number of wireless charging apparatus a household needs to purchase and make wireless charging more cost effective for consumers. A wireless charging shelf would allow consumers to charge consumer electronic devices, capable of receiving a wireless charge, simply by leaving the consumer electronic device on, or in, the shelf. In addition, the shelf can be retrofit, with a wireless charging apparatus that allows for a RF front end that facilitates changes in the size and shape of the charging antenna-coil so that a wireless charging design can easily be retro-fitted to a variety of existing furniture. By enabling the RF front end to be swapped out, and changed easily, this allows all-kinds of non-metallic furniture and props to become wireless charging apparatus.

Wireless charging antenna-coils (plus the appropriate matching circuitry) may be embodied as transmitting antennas or repeater antennas as discussed above. Thus, the antennas may be used in discrete sizes and shapes enabling normal furniture to be up-graded to become furniture that can wirelessly charge electronic devices. In addition to having a variety of discrete diameter sizes for the antenna coil, the antenna coil could also be made in a number of different shapes so that it fit round/square/rectangular shaped furniture properly. These stick on charging antenna-coils could be stuck on or attached to existing furniture in a manner that is easily accomplished by an end user.

FIG. 25 illustrates an exemplary embodiment of a transmit antenna 1015 disposed in or on a table 1010. In this exemplary embodiment, the transmit antenna 1015 may be originally manufactured as part of the table 1010 (i.e., a host furnishing) or the transmit antenna 1015 may be disposed on the table (for example in a drawer or underneath) afterwards (i.e., an existing furniture item).

FIG. 26 illustrates an exemplary embodiment of a transmit antenna 1025 in or on a shelf 1020 bearing a receiver device 1029. In this exemplary embodiment, the transmit antenna 1025 may be originally manufactured as part of the shelf 1020 (i.e., a host furnishing) or the transmit antenna 1025 may be disposed on the shelf 1020 afterwards (i.e., an existing furniture item).

Figure 27:
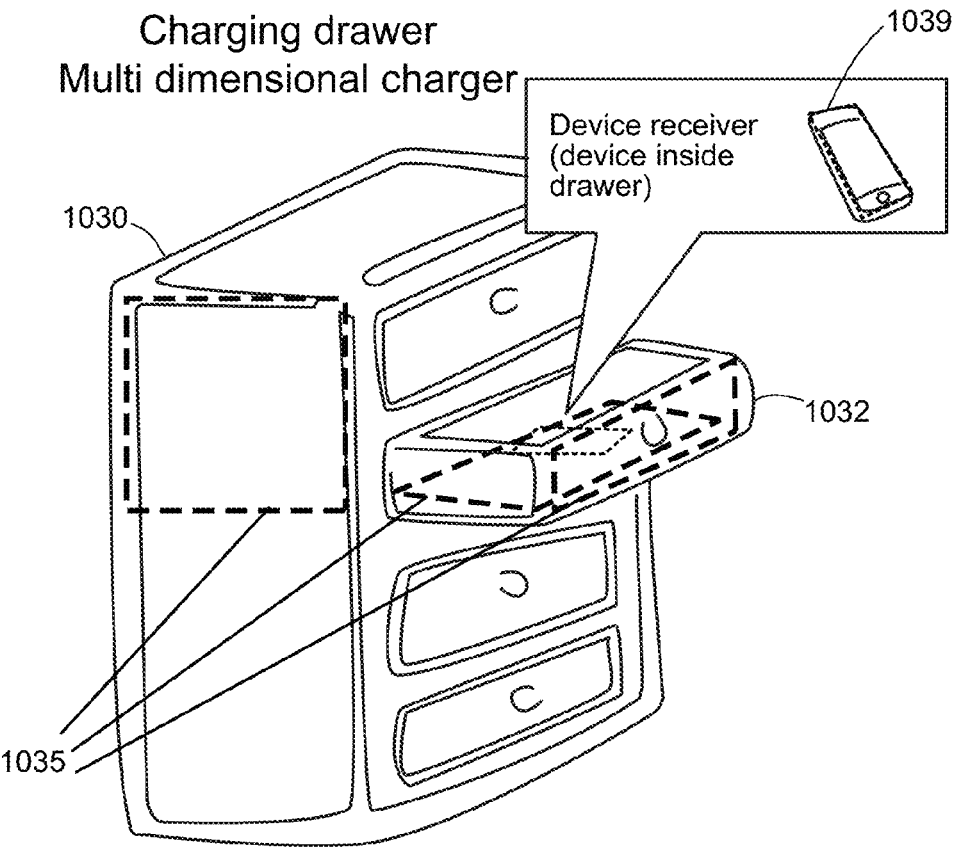
FIG. 27 illustrates an exemplary embodiment of a transmitter disposed in or on a bureau.

FIG. 27 illustrates an exemplary embodiment of one or more transmitters 1035 disposed in or on a bureau 1030. In this exemplary embodiment, the transmit antennas 1035 may be originally manufactured as part of the bureau 1030 (i.e., a host furnishing) or the transmit antennas 1035 may be disposed in or on the bureau 1030 afterwards (i.e., an existing furniture item). As non-limiting examples, the transmit antennas 1035 may be disposed in a bottom of a drawer 1032, on the sides of the drawer 1032, and on the sides of the bureau 1030. With multiple antennas (such as transmit or repeater), the exemplary embodiments discussed above with reference to FIGS. 21-24B can control the multiple antennas depending on whether the antennas are coplanar (such as in FIGS. 21 and 22) or are multi-dimensional (such as in FIGS. 23A-24B). Receiver devices may be charged by haphazard placement of the receiver devices the drawer while closing the drawer may permit the power level to be further increased.

Figure 28:
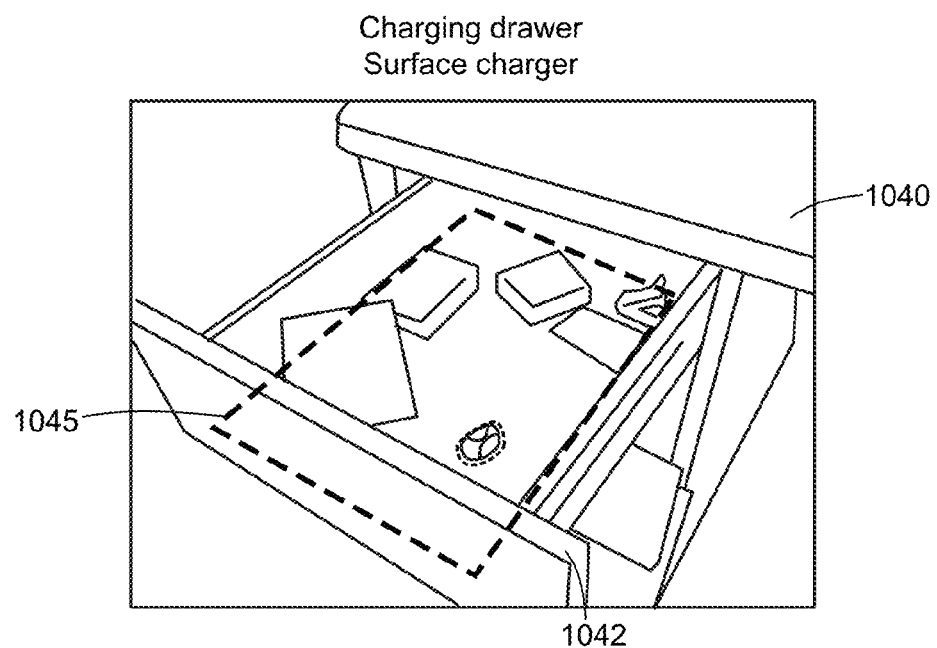
FIG. 28 illustrates an exemplary embodiment of a transmitter disposed in or on a drawer.
Figure 29A:
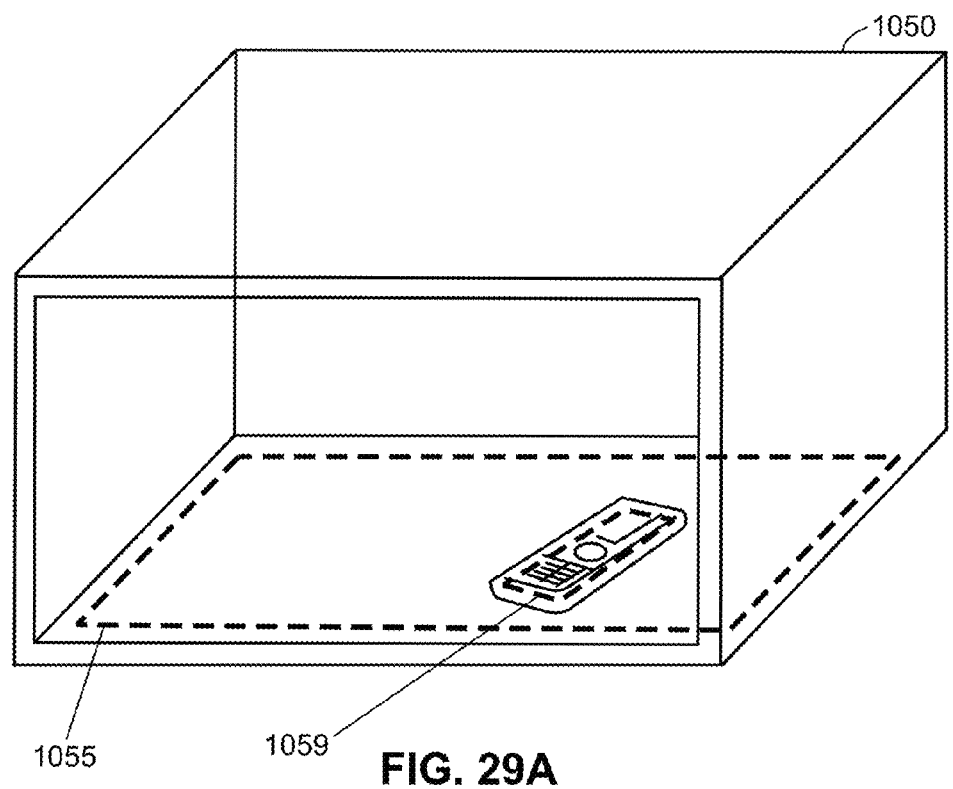
FIGS. 29A-29C illustrates an exemplary embodiment of an enclosure bearing one or more transmitters in various configurations.
Figure 29B:
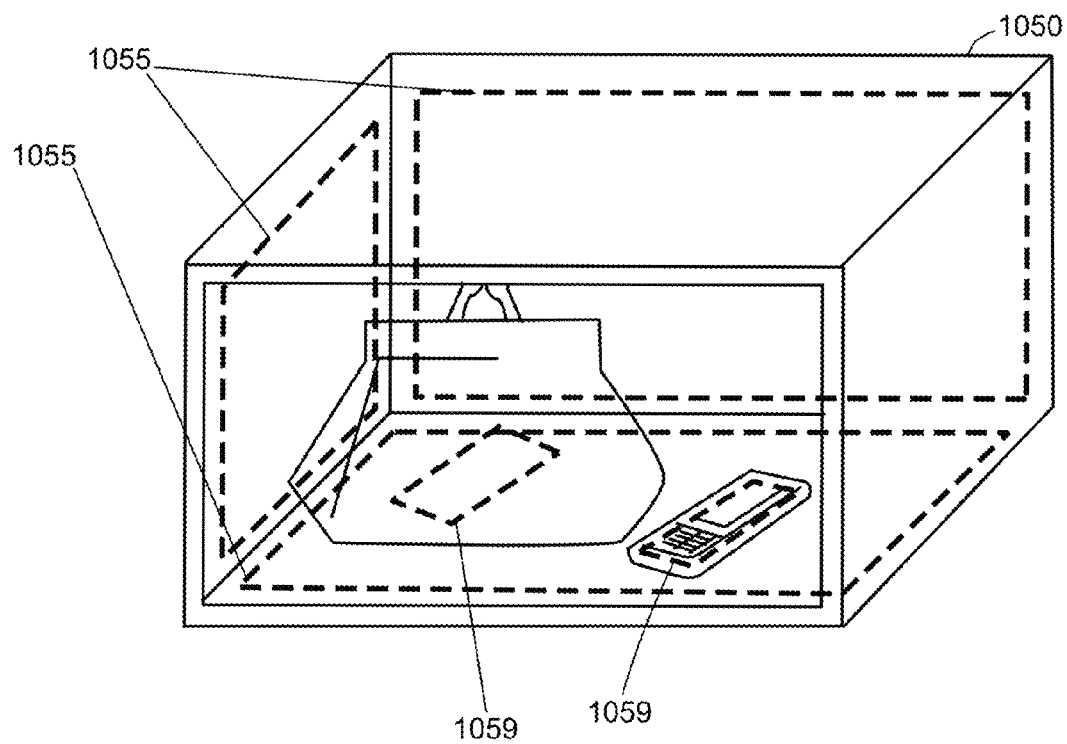
Figure 29C:
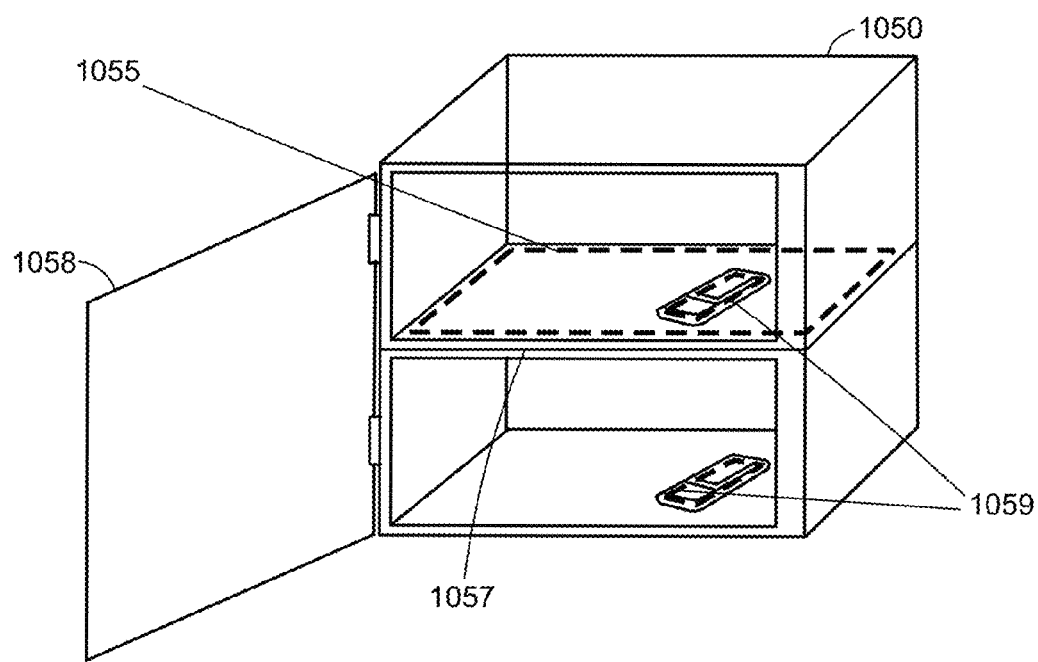

FIG. 28 illustrates an exemplary embodiment of a transmitter antenna 1045 disposed in or on a drawer 1042 of a desk 1040. In this exemplary embodiment, the transmit antenna 1045 may be originally manufactured as part of the bureau 1040 (i.e., a host furnishing) or the transmit antennas 1045 may be disposed in or on the drawer 1042 afterwards (i.e., an existing furniture item). Receiver devices 1049 may be charged by haphazard placement of the receiver devices the drawer 1042 while closing the drawer may permit the power level to be further increased FIGS. 29A-29C illustrates an exemplary embodiment of an enclosure 1050 bearing one or more transmitters 1055 in various configurations. In these exemplary embodiments, the transmit antennas 1055 may be originally manufactured as part of the enclosure 1050 (i.e., a host furnishing) or the transmit antennas 1055 may be disposed in or on the enclosure 1050 afterwards (i.e., an existing furniture item). The enclosure 1050 may be specifically designed as a charging enclosure. However, other multi-function enclosures, such as, for example, school lockers and gym lockers may also be used.

FIG. 29A illustrates a transmit antenna 1055 disposed in a bottom of the enclosure 1050 with a receiver device 1059 within the enclosure 1050. FIG. 29B shows multiple antennas 1055 on various sides of the enclosure 1050 with a receiver device 1059 within the enclosure 1050 and a receiver device 1059, within a handbag, within the enclosure 1050. With multiple antennas (such as transmit or repeater), the exemplary embodiments discussed above with reference to FIGS. 21-24B can control the multiple antennas depending on whether the antennas are coplanar (such as in FIGS. 21 and 22) or are multi-dimensional (such as in FIGS. 23A-24B). Receiver devices 1059 may be charged by haphazard placement of the receiver devices the enclosure 1050.

FIG. 29C shows a transmit antenna 1055 on a shelf 1057 of the enclosure 1050 with receiver devices 1059 to be charged above and below the shelf 1057. The enclosure 1050 shown in FIG. 29C includes a door 1058. Thus, when the door 1058 is closed, an enclosed furnishing detector 290 (FIG. 20) may be used to enhance power transmission to the receiver devices 1059.

Figure 30:
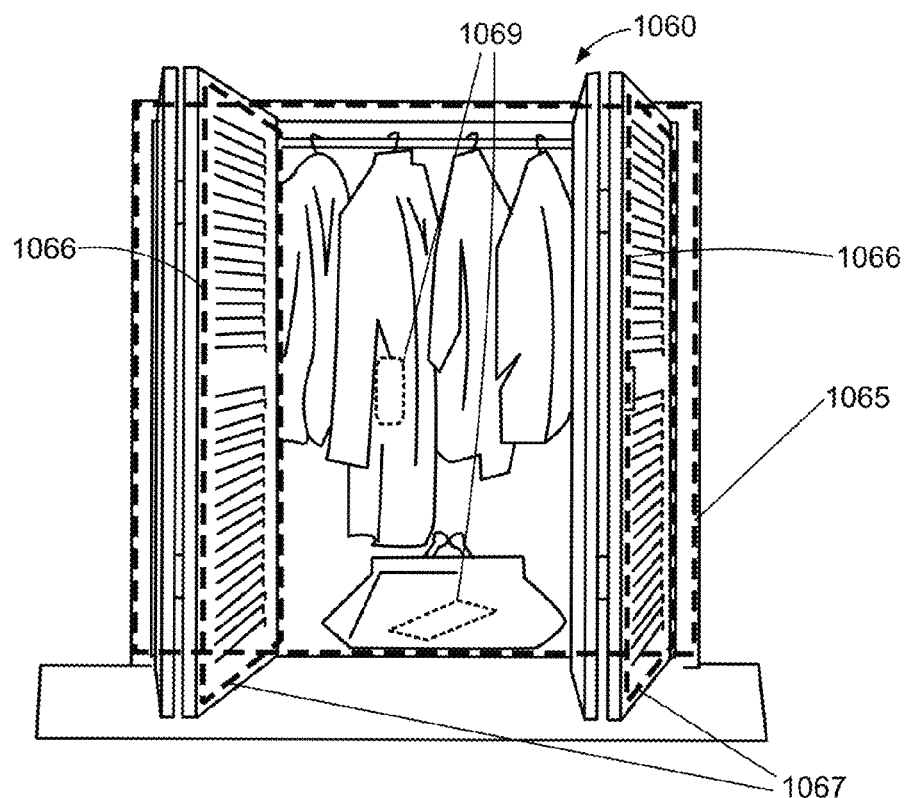
FIG. 30 illustrates an exemplary embodiment of a transmitter disposed in or on a closet.

FIG. 30 illustrates an exemplary embodiment of one or more antennas (1065 and 1066) disposed in or on a closet 1060. As non-limiting examples, receiver devices 1069 are illustrated in a pocket of a coat and in a handbag. In this exemplary embodiment, the antennas (1065 and 1066) may be originally manufactured as part of the closet 1060 (i.e., a host furnishing) or the antennas (1065 and 1066) may be disposed in or on the closet 1060 afterwards (i.e., an existing furniture item). Receiver devices 1069 may be charged by simply tossing them into the closet 1060 or placing articles containing the receiver devices 1069 in the closet 1060. Antenna 1065 is illustrated as within a door frame 1065 of the closet 1060. Other suitable locations may be on interior walls or shelves of the closet 1060. Antennas 1066 are illustrated as in or on the doors of the closet 1060.

The enclosure 1060 includes doors 1067. Thus, when the doors 1067 are closed, an enclosed furnishing detector 290 (FIG. 20) may be used to enhance power transmission to the receiver devices 1059. With multiple antennas (such as transmit or repeater), the exemplary embodiments discussed above with reference to FIGS. 21-24B can control the multiple antennas depending on whether the antennas are coplanar (such as in FIGS. 21 and 22) or are multi-dimensional (such as in FIGS. 23A-24B).

Figure 31:
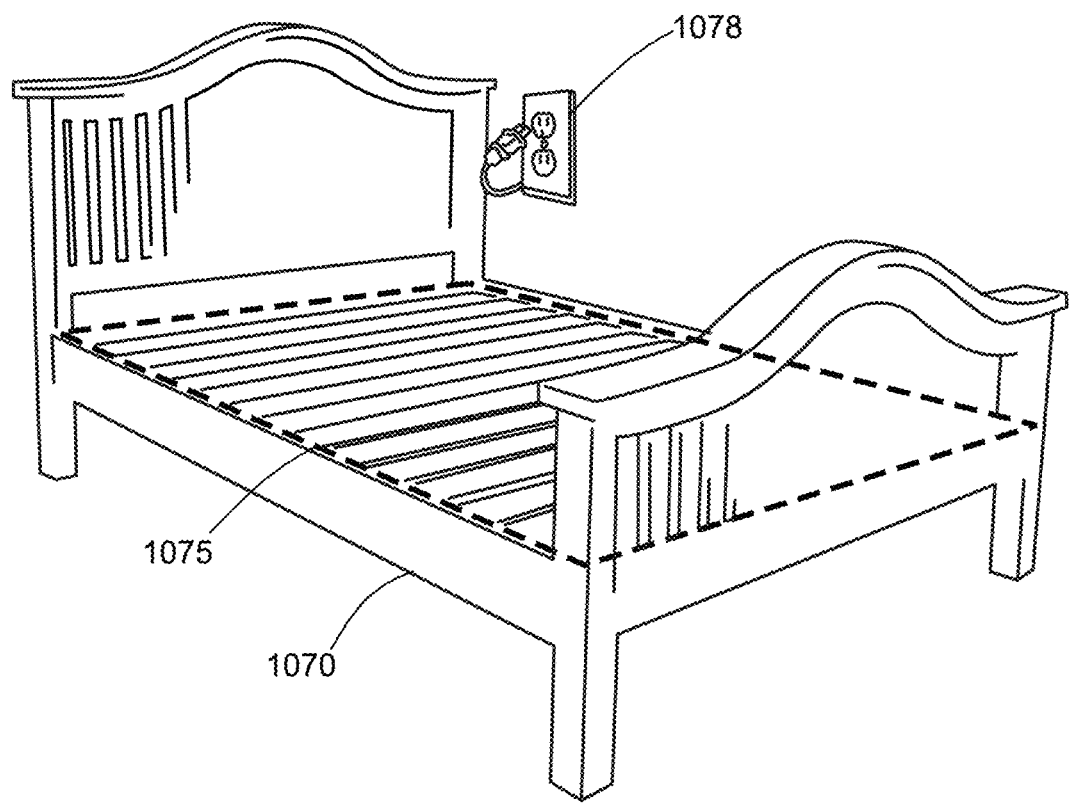
FIG. 31 illustrates an exemplary embodiment of a transmitter disposed in or on a bed.

FIG. 31 illustrates an exemplary embodiment of a transmitter 1075 disposed in or on a bed 1070, In this exemplary embodiment, the transmitter 1075 may be originally manufactured as part of the bed 1070 or the transmitter 1075 may be disposed in or on the closet bed 1070 afterwards (i.e., an existing furniture item). Receiver devices (not shown) may be charged by placing them on or under the bed 1070 or placing articles containing the receiver devices on or under the bed 1070. The transmitter 1075 may be powered from an AC wall outlet 1078 or other suitable power source.

Figure 32:
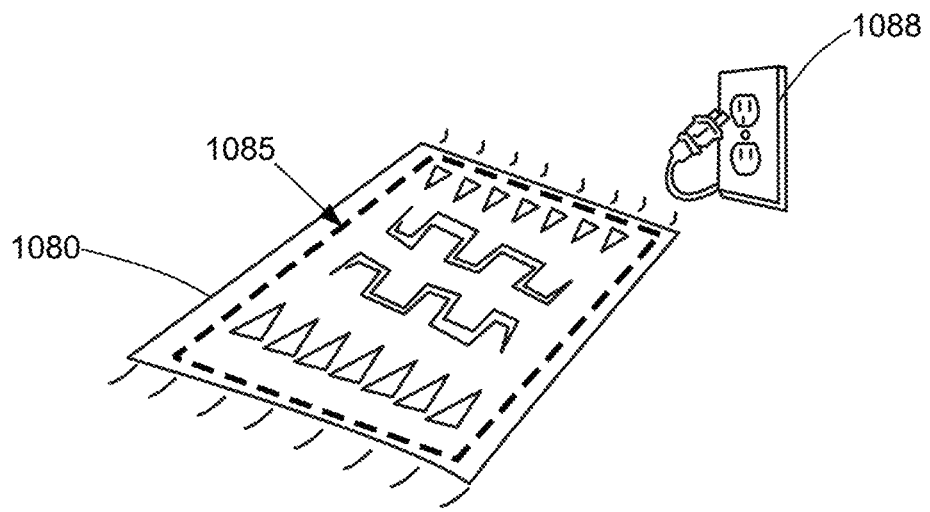
FIG. 32 illustrates an exemplary embodiment of a transmitter disposed in or on a rug.

FIG. 32 illustrates an exemplary embodiment of one or more antennas 1085 disposed in or on a rug 1080, In this exemplary embodiment, the antennas 1085 may be originally manufactured as part of the rug 1080 or the antennas 1085 may be disposed in, on, or under the rug 1080 afterwards (i.e., an existing furniture item). Receiver devices (not shown) may be charged by placing them on rug 1080 or placing articles containing the receiver devices on the rug 1080. The antennas 1085 may be powered from an AC wall outlet 1078 or other suitable power source.

FIG. 30 illustrates an exemplary embodiment of one or more antennas 1085 disposed in or under a rug. In this exemplary embodiment, the antennas (1065 and 1066) may be originally manufactured as part of the closet 1060 (i.e., a host furnishing) or the antennas (1065 and 1066) may be disposed in or on the closet 1060 afterwards (i.e., an existing furniture item). Receiver devices 1069 may be charged by simply tossing them into the closet 1060 or placing articles containing the receiver devices 1069 in the closet 1060. Antenna 1065 is illustrated as within a door frame 1065 of the closet 1060. Other suitable locations may be on interior walls or shelves of the closet 1060. Antennas 1066 are illustrated as in or on the doors of the closet 1060.

Figure 33:
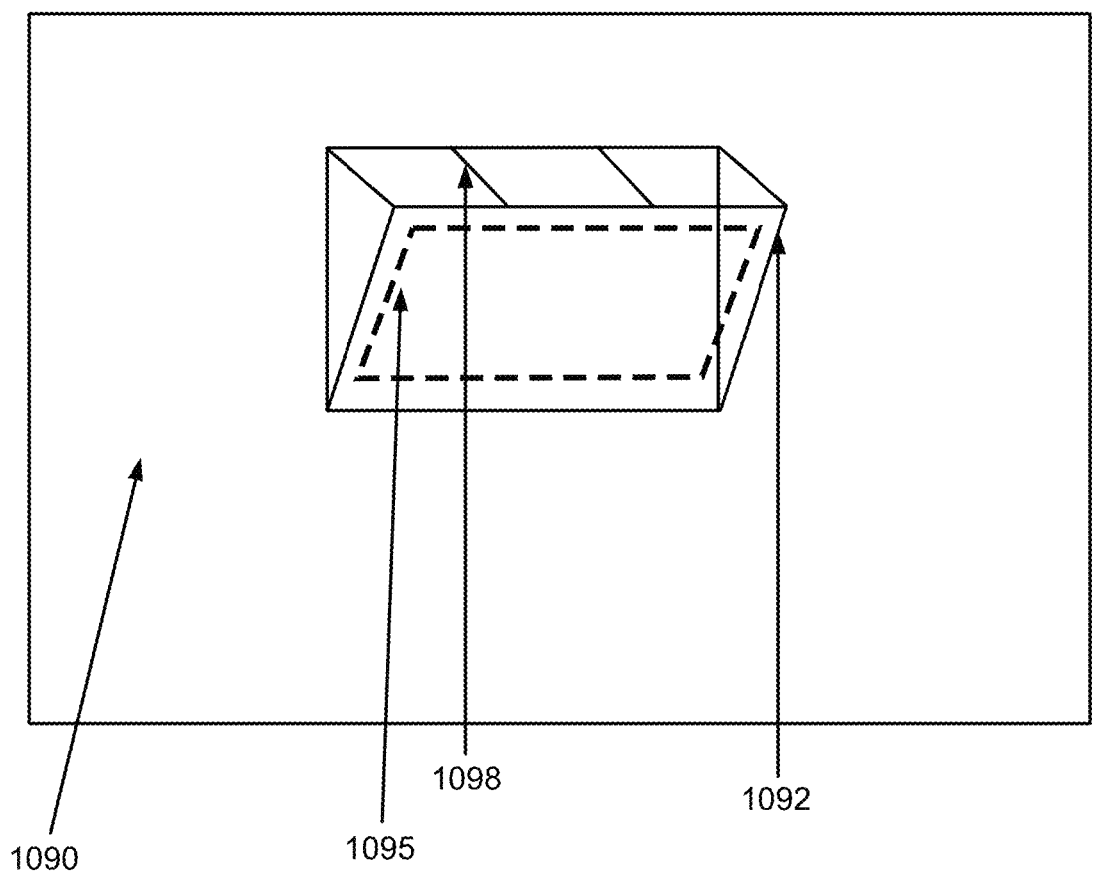
FIG. 33 illustrates an exemplary embodiment of a wall-mounted receptacle bearing a transmitter and for holding one or more receiver devices.

FIG. 33 illustrates an exemplary embodiment of a wall-mounted receptacle 1092 on a wall 1090 bearing a transmitter 1095 and for holding one or more receiver devices (not shown). The wall-mounted receptacle 1092 may include an aligner 1098 to physically aid the alignment of devices placed within the field of the wireless charging apparatus. This alignment aid may make the wall-mounted receptacle 1092 particularly useful for inductive coupling applications as well as near-field coupling applications. While not shown, the wall-mounted receptacle 1092 may include multiple antennas, perhaps in multiple orientations. With multiple antennas (such as transmit or repeater), the exemplary embodiments discussed above with reference to FIGS. 21-24B can control the multiple antennas depending on whether the antennas are coplanar (such as in FIGS. 21 and 22) or are multi-dimensional (such as in FIGS. 23A-24B). The receptacle 1092 is illustrated as wall-mounted. However, other receptacles 1092 with aligners 1098 are contemplated as within the scope of the present invention, such as, for example, a desktop receptacle.

Figure 34:
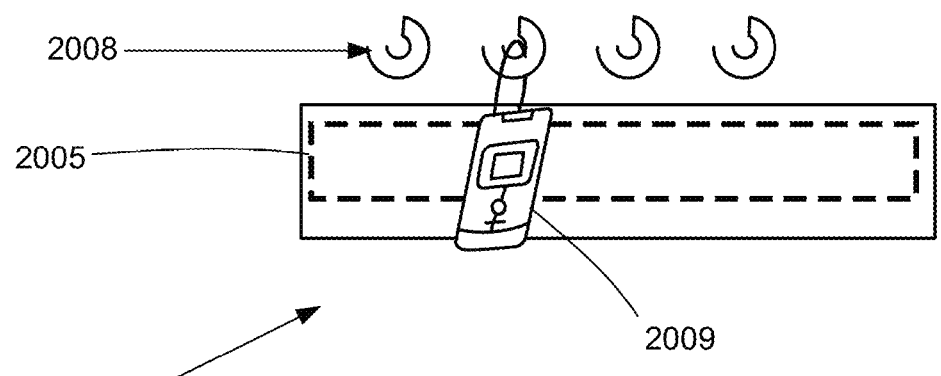
FIG. 34 illustrates an exemplary embodiment of a transmitter disposed on a wall and one or receiver device holders for holding one or more receiver devices in a coupling-mode region of the transmitter.

FIG. 34 illustrates an exemplary embodiment of a transmit antenna 2005 disposed on a wall 2000 and a receiver device 2009 hanging from a receiver device holder 2008 (e.g., a hook) such that the receiver device 2009 is in a coupling-mode region of the transmit antenna 2005. This configuration also allows receiver devices contained within secondary containers such as jeans, purses, or backpacks to receive charge while the clothing or bags are hung on the hooks 2008 above the transmit antenna 2005.

Figure 35:
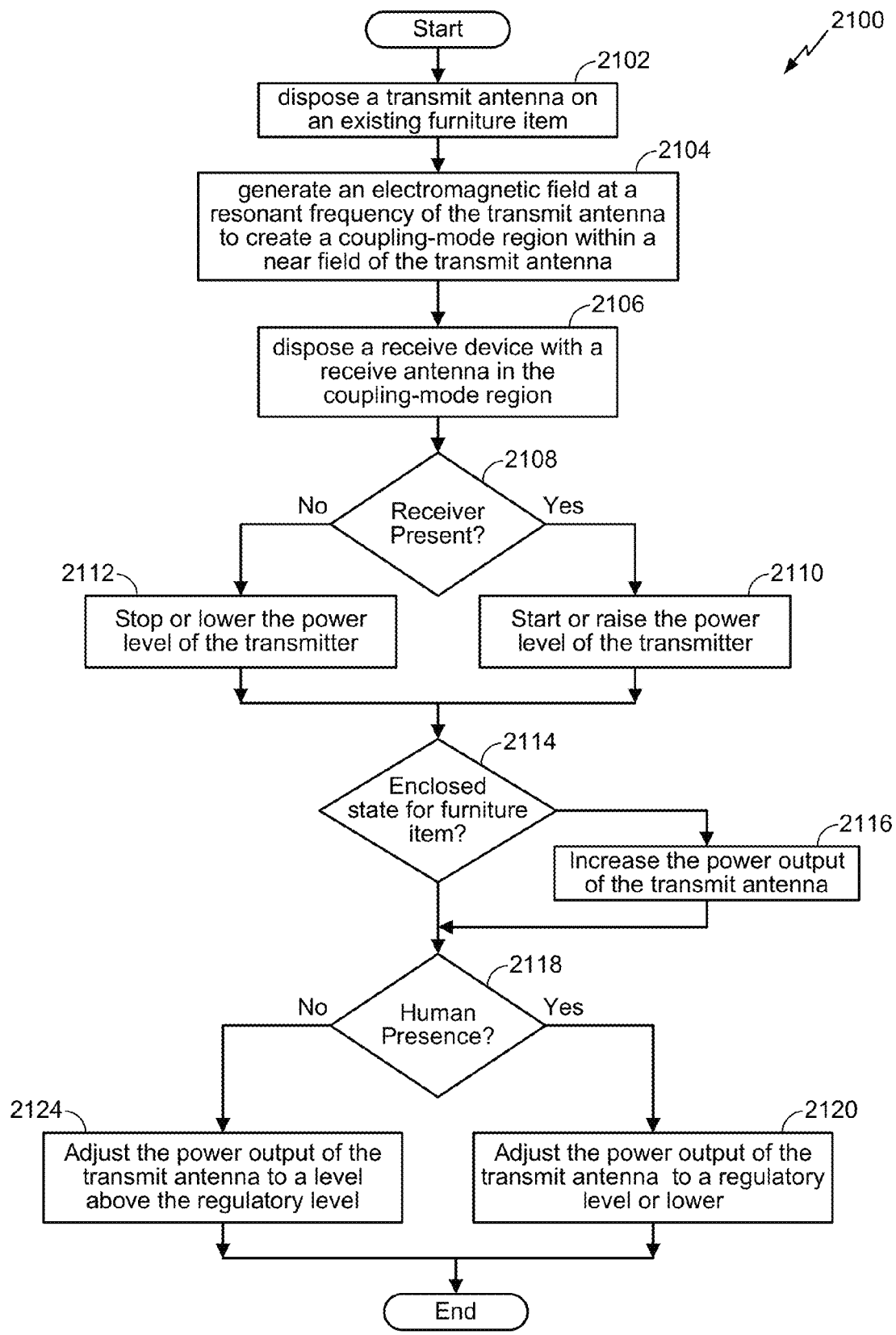
FIG. 35 is a simplified flow chart illustrating acts that may be performed in one or more exemplary embodiments of the present invention.

FIG. 35 is a simplified flow chart 2100 illustrating acts that may be performed in one or more exemplary embodiments of the present invention. Various exemplary embodiments may include some or all of the acts illustrated in FIG. 35, as well as other acts not illustrated. In operation 2102, a wireless charging apparatus including one or more transmit antennas, one or more repeater antennas, or a combination thereof may be disposed on or in a host furnishing or an existing furniture item. In operation 2104, an electromagnetic field at a resonant frequency of the transmit antenna may be generated to create a coupling-mode region within a near field of the transmit antenna. In operation 2106, a receive device with a receive antenna may be disposed in the coupling-mode region.

In operation 2108, the process may check to see if a receiver is present in the coupling-mode region. If so, in operation 2110 the wireless charging apparatus may apply power, or increase power, to the transmit antenna. If not, in operation 2112 the wireless charging apparatus may remove power from, or decrease power to, the transmit antenna.

In operation 2114, the process may check to see if the furniture item is in an enclosed state. If so, in operation 2116 the wireless charging apparatus may increase the power to the transmit antenna to a level that is compatible with an enclosed state of the furniture item.

In operation 2118, the process may check to see if a human is present in or near the coupling-mode region. If so, in operation 2120 the wireless charging apparatus may adjust the power output of the transmit antenna to a regulatory level or lower. If not, in operation 2124 the wireless charging apparatus may adjust the power output of the transmit antenna above the regulatory level.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the exemplary embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A power transmitting apparatus for transferring wireless power to a receiver, comprising:

a power source configured to generate a driving signal;

a transmit antenna coupled to the power source and configured to receive the driving signal and transfer a first level of power, via a wireless power field, to detect the receiver, and transfer a second level of power greater than the first level of power, via the wireless field, to the receiver based on detecting the receiver utilizing the first level of power the transmit antenna built into a furnishing;

a tuning capacitor configured to tune a resonant frequency of the transmit antenna;

a detector configured to detect a closed state of the furnishing and generate a detection signal; and a controller, coupled to the detector and the power source, and configured to adjust a power output of the transmit antenna in response to the detection signal.

2. The apparatus of claim 1, wherein the furnishing includes a planar portion of the transmit antenna.

3. The apparatus of claim 1, wherein a portion of the transmit antenna is associated with, embedded in, retrofitted into, affixed to, or formed on a portion of the furnishing.

4. The apparatus of claim 1, further comprising:
a plurality of transmitters integrated as part of the furnishing; and
a controller, coupled to the plurality of transmitters, configured to control activation of the plurality of transmitters.

5. The apparatus of claim 4, wherein the controller is configured to:
receive a signal indicative of the power received by the receiver from the plurality of transmitters; and
adjust an output of the plurality of transmitters based on the received signal.

6. The apparatus of claim 4, wherein one of the plurality of transmitters includes the transmit antenna.

7. The apparatus of claim 4, further comprising:
a multiplexer coupled to the controller and configured to apply a common driving signal from the power source to each of the plurality of transmitters.

8. The apparatus of claim 4, wherein the controller controls activation of the plurality of transmitters according to a time-domain sequence.

9. The apparatus of claim 8, wherein the controller optimizes the activation of the plurality of transmitters to maximize the power transmitted to the receiver.

10. The apparatus of claim 4, wherein the transmit antenna of each of the plurality of transmitters is positioned in planes substantially orthogonal to the transmit antenna.

11. The apparatus of claim 1, wherein the transmit antenna comprises a continuous loop transmit antenna including a plurality of facets oriented in a plurality of directions.

12. The apparatus of claim 11, wherein the plurality of directions are substantially orthogonal.

13. The apparatus of claim 11, further comprising:
a presence detector configured to detect the presence of the receiver and generate a presence signal; and
a controller, coupled to the presence detector, and configured to adjust the power output of the power source in response to the presence signal.

14. The apparatus of claim 11, further comprising:
a detector configured to detect a closed state and generate a signal indicative of the closed state; and
a controller, coupled to the detector, the controller being configured to:
adjust the power output of the power source to a power level above a level when the signal indicates the closed state.

15. The apparatus of claim 1, wherein the furnishing comprises an enclosure for accepting a plurality of receivers.

16. The apparatus of claim 1, wherein the furnishing is selected from the group consisting of a wall a ceiling, a floor, a cabinet, a cubby, a locker, a table, a desk, a drawer, a bureau, a shelf, a door, a rug, a lampshade, and a bed.

17. The apparatus of claim 1, wherein the transmit antenna is configured to transfer the power, via the wireless power field, to the receiver for wirelessly charging a battery of the receiver.

18. The apparatus of claim 1, wherein the wireless field substantially encompasses a surface of the furnishing, the surface capable of supporting the receiver.

19. The apparatus of claim 1, wherein the transmit antenna is configured to be unobtrusively secured by the furnishing.

20. The apparatus of claim 1, further comprising a compartment in the furnishing configured to substantially conceal the transmit antenna.

21. The apparatus of claim 20, wherein the compartment comprises a recessed portion of the furnishing.

22. The apparatus of claim 1, wherein the transmit antenna is configured to have a transmit loop having a defined boundary, and wherein the furnishing is configured to prevent placement of a receiver based on the boundary.

23. The apparatus of claim 1, wherein the transmit antenna is configured to generate the electromagnetic field having a region for transferring power to the receiver, and wherein the region corresponds to a distance defined by the furnishing.

24. The apparatus of claim 1, further comprising a tunable circuit configured to adjust a characteristic of the transmit antenna based on a dimension of the furnishing.

25. A method of transmitting power, comprising:
generating an electromagnetic field at a first level of power by a transmit antenna, the electromagnetic field having a region for detecting a receiver;
generating the electromagnetic field at a second level of power greater than the first level of power based on detecting the receiver utilizing the first level of power, the electromagnetic field having a region for transferring power from the transmit antenna to the receiver, the transmit antenna configured to be built into a furnishing;
tuning a resonant frequency of the transmit antenna;
detecting a closed state of the furnishing; and
adjusting a power output of the transmit antenna in response to the closed state of the furnishing.

26. The method of claim 25, wherein a portion of the transmit antenna is associated with, embedded in, retrofitted into, affixed to, or formed on a portion of the furnishing.

27. The method of claim 25, further comprising:
detecting a human presence within a distance of the region;
adjusting a power output of the transmit antenna in response to detection of human presence to a level at or below a regulatory level; and
adjusting the power output of the transmit antenna in response to the absence of a human to a level above the regulatory level.

28. The method of claim 25, further comprising:
detecting the absence of the receiver; and
stopping the generating when the detecting indicates the absence of the receiver.

29. The method of claim 25, further comprising:
generating an electromagnetic field having a region for transferring the power from a plurality of transmitters to the receiver, the plurality of transmitters each including a transmit antenna configured to be integrated as part of the furnishing; and controlling the power output from the plurality of transmitters to maximize the power transmitted to the receive device.

30. The method of claim 25, further comprising adjusting a characteristic of the transmit antenna based on a dimension of the furnishing to maximize the power transferred to the receiver.

31. A wireless power transfer apparatus, comprising:
a power source configured to generate a driving signal;
means for generating an electromagnetic field at a first level of power, coupled to the power source to receive the driving signal, the electromagnetic field having a region for detecting a receiver;
means for generating the electromagnetic field at a second level of power greater than the first level of power based on detecting the receiver utilizing the first level of power, the electromagnetic field having a region for transferring power to the receiver, the means for generating the electromagnetic field configured to be built into a furnishing;
means for tuning a resonant frequency of the means for generating the electromagnetic field comprising at least one tuning capacitor;
means for detecting a closed state of the furnishing; and
means for adjusting the power output of the transmit antenna responsive to the closed state of the furnishing.

32. The apparatus of claim 31, wherein the means for generating the electromagnetic field comprises a transmit antenna.

33. The apparatus of claim 31, wherein a portion of the means for generating the electromagnetic field is associated with, embedded in, retrofitted into, affixed to, or formed on a portion of the furnishing.

34. The apparatus of claim 31, further comprising:
means for detecting human presence within a distance of the region;
means for adjusting the power output of the transmit antenna responsive to detection of human presence to a level at or below a regulator level; and
means for adjusting the power output of the transmit antenna in response to human absence to a level above the regulatory level.

* * * * *